(12) United States Patent
Li et al.

(10) Patent No.: US 10,212,783 B2
(45) Date of Patent: Feb. 19, 2019

(54) SYSTEMS AND METHODS FOR OVERVOLTAGE PROTECTION FOR LED LIGHTING

(71) Applicant: ON-BRIGHT ELECTRONICS (SHANGHAI) CO., LTD., Shanghai (CN)

(72) Inventors: Zhuoyan Li, Shanghai (CN); Liqiang Zhu, Shanghai (CN); Jiqing Yang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/235,046

(22) Filed: Aug. 11, 2016

(65) Prior Publication Data

US 2017/0290108 A1    Oct. 5, 2017

Related U.S. Application Data

(63) Continuation of application No. 15/140,347, filed on Apr. 27, 2016, now Pat. No. 9,780,672.

(30) Foreign Application Priority Data

Mar. 29, 2016    (CN) .......................... 2016 1 0190128

(51) Int. Cl.
*H02M 3/335*    (2006.01)
*H05B 33/08*    (2006.01)
(Continued)

(52) U.S. Cl.
CPC ......... *H05B 33/089* (2013.01); *H02H 1/0007* (2013.01); *H02H 3/202* (2013.01);
(Continued)

(58) Field of Classification Search
CPC ............. H05B 33/089; H05B 33/0815; H02M 3/33515; H02M 3/156; H02M 3/3351;
(Continued)

(56) References Cited

U.S. PATENT DOCUMENTS 8,324,822 B2 *  12/2012  Peng .................. H05B 33/0815
                                                315/172
8,917,527 B2    12/2014  Fang et al.
(Continued)

FOREIGN PATENT DOCUMENTS

CN    203884058 U    10/2014
CN    204350419 U    5/2015
(Continued)

OTHER PUBLICATIONS

United States Patent and Trademeark Office, Notice of Allowance dated Apr. 24, 2017, in U.S. Appl. No. 15/140,347.
(Continued)

*Primary Examiner* — Fred E Finch, III
*Assistant Examiner* — Demetries A Gibson
(74) *Attorney, Agent, or Firm* — Faegre Baker Daniels LLP

(57) ABSTRACT

System controller and method for a power converter. For example, a system controller for a power converter includes a logic controller configured to generate a modulation signal, and a driver configured to receive the modulation signal, generate a drive signal based at least in part on the modulation signal, and output the drive signal to a switch to affect a current flowing through an inductive winding for a power converter. Additionally, the system controller includes a voltage-to-voltage converter configured to receive a first voltage signal, the modulation signal, and a demagnetization
(Continued)

signal, and to generate a second voltage signal based at least in part on the first voltage signal, the modulation signal, and the demagnetization signal.

30 Claims, 19 Drawing Sheets

(51) Int. Cl.
 *H02H 7/12* (2006.01)
 *H02H 3/20* (2006.01)
 *H02H 1/00* (2006.01)
 *H02M 3/156* (2006.01)
(52) U.S. Cl.
 CPC .......... *H02H 7/1213* (2013.01); *H02M 3/156* (2013.01); *H02M 3/33515* (2013.01); *H05B 33/0815* (2013.01); *Y02B 20/341* (2013.01)
(58) Field of Classification Search
 CPC .... H02H 7/1213; H02H 1/0007; H02H 3/202; Y02B 20/341
 See application file for complete search history.

(56) References Cited

U.S. PATENT DOCUMENTS

| | | | |
|---|---|---|---|
| 8,994,281 B2 | 3/2015 | Hwang et al. | |
| 9,048,752 B2* | 6/2015 | Capilla | H02M 1/4225 |
| 9,084,317 B2 | 7/2015 | Fang et al. | |
| 9,093,910 B1 | 7/2015 | Ankamreddi et al. | |
| 9,154,030 B2 | 10/2015 | Bianco et al. | |
| 9,461,558 B2 | 10/2016 | Bianco et al. | |
| 9,564,811 B2* | 2/2017 | Zhai | H05B 33/0815 |
| 9,584,017 B1* | 2/2017 | Sundararaj | H02H 3/202 |
| 9,755,421 B2* | 9/2017 | Chang | H02H 5/042 |
| 9,780,672 B1 | 10/2017 | Li et al. | |
| 2010/0164443 A1 | 7/2010 | Tumminaro et al. | |
| 2012/0250367 A1 | 10/2012 | Desimone et al. | |
| 2012/0262132 A1* | 10/2012 | Park | H02M 1/4225 323/207 |
| 2013/0135775 A1 | 5/2013 | Yao et al. | |
| 2013/0147379 A1* | 6/2013 | Zhou | H05B 33/0815 315/210 |
| 2013/0182476 A1 | 7/2013 | Yang et al. | |
| 2013/0223107 A1 | 8/2013 | Zhang et al. | |
| 2014/0029315 A1 | 1/2014 | Zhang et al. | |
| 2014/0126250 A1 | 5/2014 | Lan et al. | |
| 2014/0160801 A1 | 6/2014 | Stamm | |
| 2014/0160809 A1* | 6/2014 | Lin | H02M 3/33523 363/21.16 |
| 2014/0362610 A1 | 12/2014 | Stracquadaini | |
| 2015/0311804 A1* | 10/2015 | Fang | H02M 3/156 363/16 |
| 2015/0334798 A1 | 11/2015 | Jung et al. | |
| 2016/0226239 A1* | 8/2016 | Yang | H02M 1/32 |
| 2016/0291682 A1* | 10/2016 | Herfurth | H05B 33/0803 |
| 2017/0025958 A1* | 1/2017 | Yu | H02M 3/33515 |
| 2017/0163026 A1* | 6/2017 | Yang | H02H 7/125 |
| 2017/0194869 A1* | 7/2017 | Yao | H02M 3/33515 |
| 2017/0214328 A1* | 7/2017 | Zhu | H02M 3/33507 |
| 2017/0290107 A1 | 10/2017 | Li et al. | |
| 2018/0069418 A1* | 3/2018 | Tian | H02J 7/022 |
| 2018/0132312 A1 | 5/2018 | Li et al. | |

FOREIGN PATENT DOCUMENTS

| | | |
|---|---|---|
| CN | 204465968 U | 7/2015 |
| CN | 104918392 A | 9/2015 |
| CN | 105392231 A | 3/2016 |
| TW | 201128891 A | 8/2011 |
| TW | 201530999 A | 8/2015 |
| TW | 201541837 A | 11/2015 |

OTHER PUBLICATIONS

Taiwan Patent Office, Office Action dated Jan. 4, 2017, in Application No. 105115090.
China Patent Office, Office Action dated Oct. 10, 2017, in Application No. 201610190128.8.
United States Patent and Trademark Office, Office Action dated Feb. 7, 2018, in U.S. Appl. No. 15/653,395.
United States Patent and Trademark Office, Notice of Allowance dated Nov. 19, 2018, in U.S. Appl. No. 15/653,395.

* cited by examiner

SYSTEMS AND METHODS FOR OVERVOLTAGE PROTECTION FOR LED LIGHTING

1. CROSS-REFERENCES TO RELATED APPLICATIONS

This application is a continuation of U.S. patent application Ser. No. 15/140,347, filed Apr. 27, 2016, which claims priority to Chinese Patent Application No. 201610190128.8, filed Mar. 29, 2016, both of these applications being incorporated by reference herein for all purposes.

2. BACKGROUND OF THE INVENTION

Certain embodiments of the present invention are directed to integrated circuits. More particularly, some embodiments of the invention provide systems and methods for overvoltage protection. Merely by way of example, some embodiments of the invention have been applied to LED lighting. But it would be recognized that the invention has a much broader range of applicability.

Conventional power conversion systems with primary-side regulation (PSR) and buck-boost mechanism have been widely used for light emitting diode (LED) lighting. FIG. 1 is a simplified diagram showing a conventional AC-to-DC power conversion system with primary-side regulation (PSR) and buck-boost mechanism for LED lighting. The AC-to-DC power conversion system 100 (e.g., a power converter) includes resistors 110 and 118, capacitors 112, 114, and 116, a pulse-width-modulation (PWM) controller 120, a switch 140, an inductive winding 142, and a diode 144.

For example, the AC-to-DC power conversion system 100 includes only one inductive winding (e.g., the inductive winding 142). In another example, the pulse-width-modulation (PWM) controller 120 includes a terminal 122 (e.g., pin VDD), a terminal 124 (e.g., pin COMP), a terminal 126 (e.g., pin GATE), a terminal 128 (e.g., pin CS), and a terminal 130 (e.g., pin GND).

As shown in FIG. 1, an AC input voltage 150 (e.g., VAC) is received and processed with full-wave rectification to generate a rectified voltage 152 (e.g., $V_{in}$). For example, the rectified voltage 152 does not fall below 0 volt. In another example, the rectified voltage 152 charges the capacitor 112 (e.g., C2) through the resistor 110 (e.g., R2) in order to increase a voltage 154 in magnitude. The voltage 154 is received by the PWM controller 120 through the terminal 122. If the voltage 154 becomes larger than an undervoltage-lockout (UVLO) threshold, the PWM controller 120 starts the normal operation.

Under normal operation, the PWM controller 120 generates a drive signal 156 with pulse-width modulation. For example, the PWM controller 120, after detecting the end of a demagnetization process, uses an error amplifier as part of the PWM controller 120 to control charging and discharging of the capacitor 116 (e.g., C3) through the terminal 124. In another example, the resistor 118 is used to sense the current flowing through the inductive winding 142 and to provide the sensing voltage to the PWM controller 120 through the terminal 128. In response, the PWM controller 120 processes the sensing voltage on a cycle-by-cycle basis by sampling the peak magnitude of the sensing voltage and sending the sampled peak magnitude to the error amplifier as part of the PWM controller 120.

The PWM controller 120 outputs the drive signal 156 to the switch 140 through the terminal 126. For example, the drive signal 156 has a frequency and also a duty cycle. In another example, the drive signal 156 opens (e.g., turns off) and closes (e.g., turns on) the switch 140. Additionally, the capacitor 114 (e.g., C5) is used to support an output voltage 160 (e.g., $V_o$) of the power conversion system 100. For example, the power conversion system 100 provides a constant output current to one or more light emitting diodes (LEDs) 190. In another example, the inductive winding 142 includes winding terminals 141 and 143, and the diode 144 includes diode terminals 145 and 147. For example, the winding terminal 143 is coupled to the diode terminal 145. In another example, a voltage difference between the diode terminal 147 and the winding terminal 141 is equal to an output voltage 160 (e.g., $V_o$) of the power converter 100.

As shown in FIG. 1, the AC-to-DC power conversion system 100 with primary-side regulation (PSR) and buck-boost mechanism includes only one inductive winding (e.g., the inductive winding 142). The AC-to-DC power conversion system 100 includes a conventional single-inductive-winding buck-boost structure. The conventional single-inductive-winding buck-boost structure often has certain advantages as well as some weaknesses in comparison with conventional buck-boost structures that include two or more inductive windings. For example, the conventional single-inductive-winding buck-boost structure can reduce external bill of materials (BOM) and also cost of the power conversion system. In another example, the conventional single-inductive-winding buck-boost structure does not include a secondary winding, so the conventional single-inductive-winding buck-boost structure usually cannot directly measure and/or precisely determine a magnitude of the output voltage. This lack of precise determination of the output voltage magnitude usually causes the conventional power conversion system not able to timely turn off the switch and/or effectively perform the function of overvoltage protection (OVP). As a result, the output capacitor (e.g., the capacitor 114) can be damaged by the excessive output voltage.

Hence, it is highly desirable to improve techniques for overvoltage protection of a power conversion system.

3. BRIEF SUMMARY OF THE INVENTION

Certain embodiments of the present invention are directed to integrated circuits. More particularly, some embodiments of the invention provide systems and methods for overvoltage protection. Merely by way of example, some embodiments of the invention have been applied to LED lighting. But it would be recognized that the invention has a much broader range of applicability.

According to one embodiment, a system controller for a power converter includes a logic controller configured to generate a modulation signal, and a driver configured to receive the modulation signal, generate a drive signal based at least in part on the modulation signal, and output the drive signal to a switch to affect a current flowing through an inductive winding for a power converter. Additionally, the system controller includes a voltage-to-voltage converter configured to receive a first voltage signal, the modulation signal, and a demagnetization signal, and to generate a second voltage signal based at least in part on the first voltage signal, the modulation signal, and the demagnetization signal. Moreover, the system controller includes a comparator configured to receive a first threshold signal, generate a comparison signal based on at least information associated with the second voltage signal and the first threshold signal, and output the comparison signal to the logic controller. The modulation signal indicates an on-time period for the switch, and the demagnetization signal indicates a demagnetization period for the inductive winding. The second voltage signal is approximately equal to the first voltage signal multiplied by a ratio of the on-time period to a sum of the on-time period and the demagnetization period in magnitude.

According to another embodiment, a system controller for a power converter includes a logic controller configured to generate a modulation signal, and a driver configured to receive the modulation signal, generate a drive signal based at least in part on the modulation signal, and output the drive signal to a switch to affect a current flowing through an inductive winding of a power converter. The inductive winding includes a first winding terminal and a second winding terminal. The second winding terminal is at a terminal voltage and coupled to a first diode terminal of a diode, and the diode further includes a second diode terminal. A voltage difference between the second diode terminal and the first winding terminal is, for example, an output voltage of the power converter. Additionally, the system controller further includes an overvoltage-protection detector configured to receive a feedback signal and a demagnetization signal, generate a detection signal based at least in part on the feedback signal and the demagnetization signal, and output the detection signal to the logic controller. The feedback signal is equal to the terminal voltage divided by a predetermined constant. The demagnetization signal indicates a demagnetization period for the inductive winding, and the detection signal indicates whether an overvoltage protection is triggered. The logic controller is configured to, in response to the detection signal indicating the overvoltage protection is triggered, cause the power converter to shut down.

According to yet another embodiment, a system controller for a power converter includes a logic controller configured to generate a modulation signal, and a driver configured to receive the modulation signal, generate a drive signal based at least in part on the modulation signal, and output the drive signal to a switch to affect a current flowing through an inductive winding of a power converter. The inductive winding includes a first winding terminal and a second winding terminal. The first winding terminal is at a terminal voltage, and the second winding terminal is coupled to a first diode terminal of a diode. The diode further includes a second diode terminal. A voltage difference between the second diode terminal and the first winding terminal is, for example, an output voltage of the power converter. Additionally, the system controller includes an overvoltage-protection detector configured to receive an input signal and a demagnetization signal, generate a detection signal based at least in part on the input signal and the demagnetization signal, and output the detection signal to the logic controller. The input signal is equal to the terminal voltage divided by a predetermined constant. The demagnetization signal indicates a demagnetization period for the inductive winding, and the detection signal indicates whether an overvoltage protection is triggered. The logic controller is configured to, in response to the detection signal indicating the overvoltage protection is triggered, cause the power converter to shut down.

According to yet another embodiment, a method for a power converter includes generating a modulation signal, receiving the modulation signal, generating a drive signal based at least in part on the modulation signal, and outputting the drive signal to a switch to affect a current flowing through an inductive winding for a power converter. Additionally, the method includes receiving a first voltage signal, the modulation signal, and a demagnetization signal, generating a second voltage signal based at least in part on the first voltage signal, the modulation signal, and the demagnetization signal, receiving a first threshold signal, generating a comparison signal based on at least information associated with the second voltage signal and the first threshold signal, and outputting the comparison signal. The modulation signal indicates an on-time period for the switch, and the demagnetization signal indicates a demagnetization period for the inductive winding. The second voltage signal is approximately equal to the first voltage signal multiplied by a ratio of the on-time period to a sum of the on-time period and the demagnetization period in magnitude.

According to yet another embodiment, a method for a power converter includes generating a modulation signal, receiving the modulation signal, generating a drive signal based at least in part on the modulation signal, and outputting the drive signal to a switch to affect a current flowing through an inductive winding of a power converter. The inductive winding includes a first winding terminal and a second winding terminal. The second winding terminal is at a terminal voltage and coupled to a first diode terminal of a diode. The diode further includes a second diode terminal. A voltage difference between the second diode terminal and the first winding terminal is, for example, an output voltage of the power converter. Additionally, the method includes receiving a feedback signal and a demagnetization signal. The feedback signal is equal to the terminal voltage divided by a predetermined constant. The demagnetization signal indicates a demagnetization period for the inductive winding. Moreover, the method includes generating a detection signal based at least in part on the feedback signal and the demagnetization signal, and outputting the detection signal. The detection signal indicates whether an overvoltage protection is triggered. Also, the method includes, in response to the detection signal indicating the overvoltage protection is triggered, causing the power converter to shut down.

According to yet another embodiment, a method for a power converter includes generating a modulation signal, receiving the modulation signal, generating a drive signal based at least in part on the modulation signal, and outputting the drive signal to a switch to affect a current flowing through an inductive winding of a power converter. The inductive winding including a first winding terminal and a second winding terminal. The first winding terminal is at a terminal voltage, and the second winding terminal is coupled to a first diode terminal of a diode. The diode further includes a second diode terminal. A voltage difference between the second diode terminal and the first winding terminal is, for example, an output voltage of the power converter. Additionally, the method includes receiving an input signal and a demagnetization signal. The input signal is equal to the terminal voltage divided by a predetermined constant. The demagnetization signal indicates a demagnetization period for the inductive winding. Moreover, the method includes generating a detection signal based at least in part on the input signal and the demagnetization signal, and outputting the detection signal. The detection signal indicates whether an overvoltage protection is triggered. Also, the method includes, in response to the detection signal indicating the overvoltage protection is triggered, causing the power converter to shut down.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide systems and methods for overvoltage protection. Merely by way of example, some embodiments of the invention have been applied to LED lighting. But it would be recognized that the invention has a much broader range of applicability.

Figure 1:
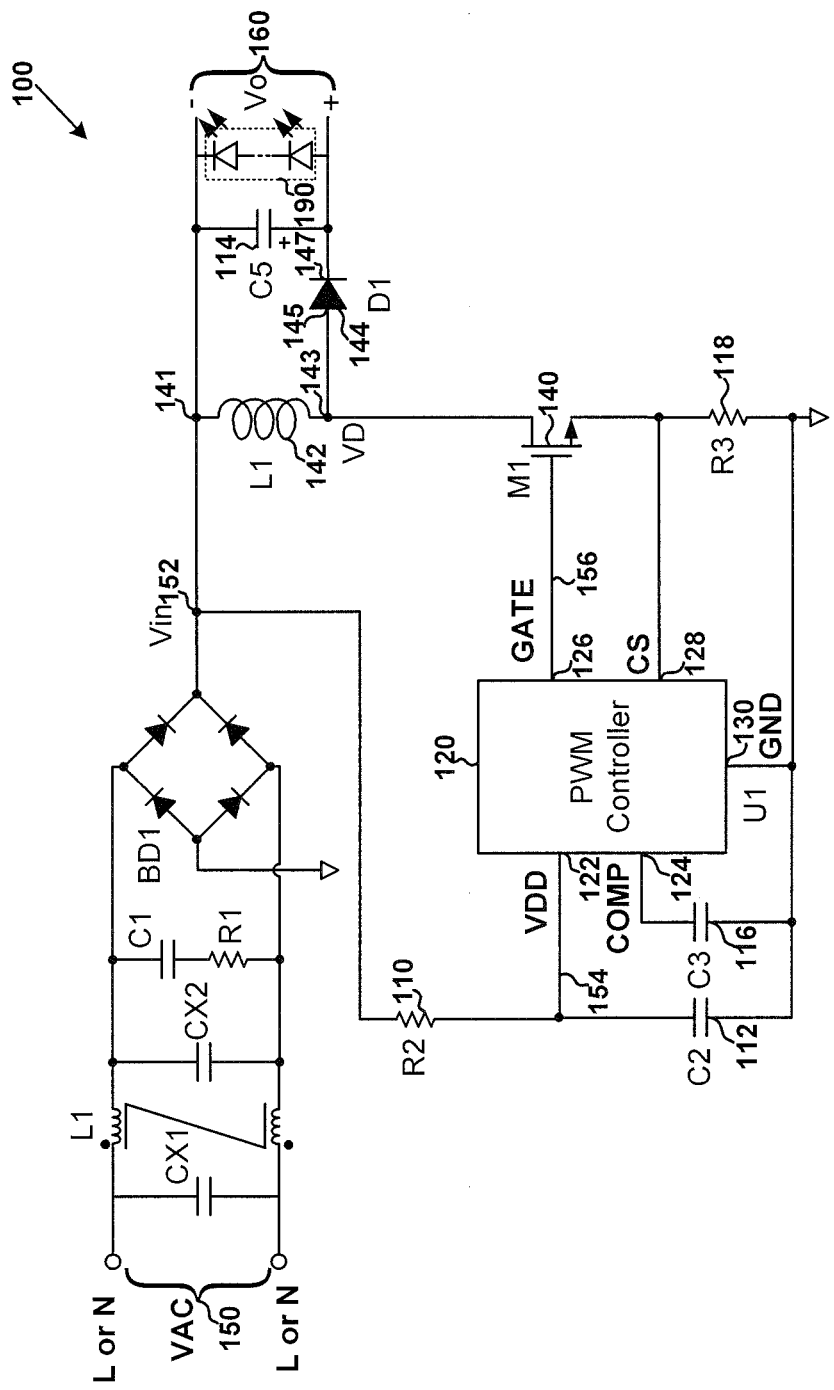
FIG. 1 is a simplified diagram showing a conventional AC-to-DC power conversion system with primary-side regulation (PSR) and buck-boost mechanism for LED lighting.

As shown in FIG. 1, the AC-to-DC power conversion system 100 with primary-side regulation (PSR) and buck-boost mechanism includes only one inductive winding (e.g., the inductive winding 142) without any secondary winding, so the conventional single-inductive-winding buck-boost structure usually-cannot directly measure and/or precisely determine a magnitude of the output voltage.

Figure 2:
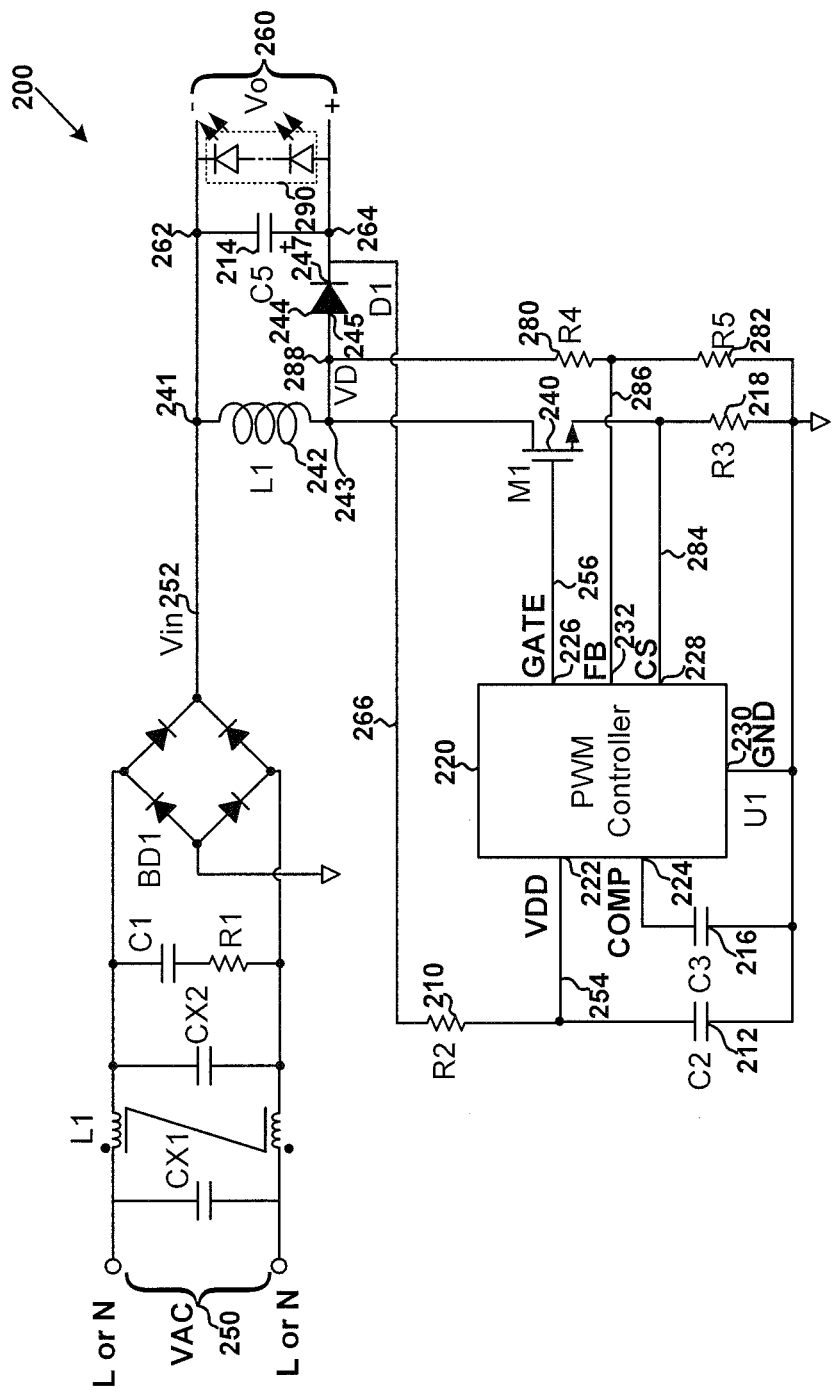
FIG. 2 is a simplified diagram showing an AC-to-DC power conversion system with primary-side regulation (PSR) and buck-boost mechanism for LED lighting according to an embodiment of the present invention.

FIG. 2 is a simplified diagram showing an AC-to-DC power conversion system with primary-side regulation (PSR) and buck-boost mechanism for LED lighting according to an embodiment of the present invention. This diagram is merely an example, which should not unduly limit the scope of the claims. One of ordinary skill in the art would recognize many variations, alternatives, and modifications. The AC-to-DC power conversion system 200 (e.g., a power converter) includes resistors 210, 218, 280 and 282, capacitors 212, 214, and 216, a pulse-width-modulation (PWM) controller 220, a switch 240, an inductive winding 242, and a diode 244. For example, the AC-to-DC power conversion system 200 includes only one inductive winding (e.g., the inductive winding 242). In another example, the pulse-width-modulation (PWM) controller 220 includes a terminal 222 (e.g., pin VDD), a terminal 224 (e.g., pin COMP), a terminal 226 (e.g., pin GATE), a terminal 228 (e.g., pin CS), a terminal 230 (e.g., pin GND), and a terminal 232 (e.g., pin FB).

Figure 3:
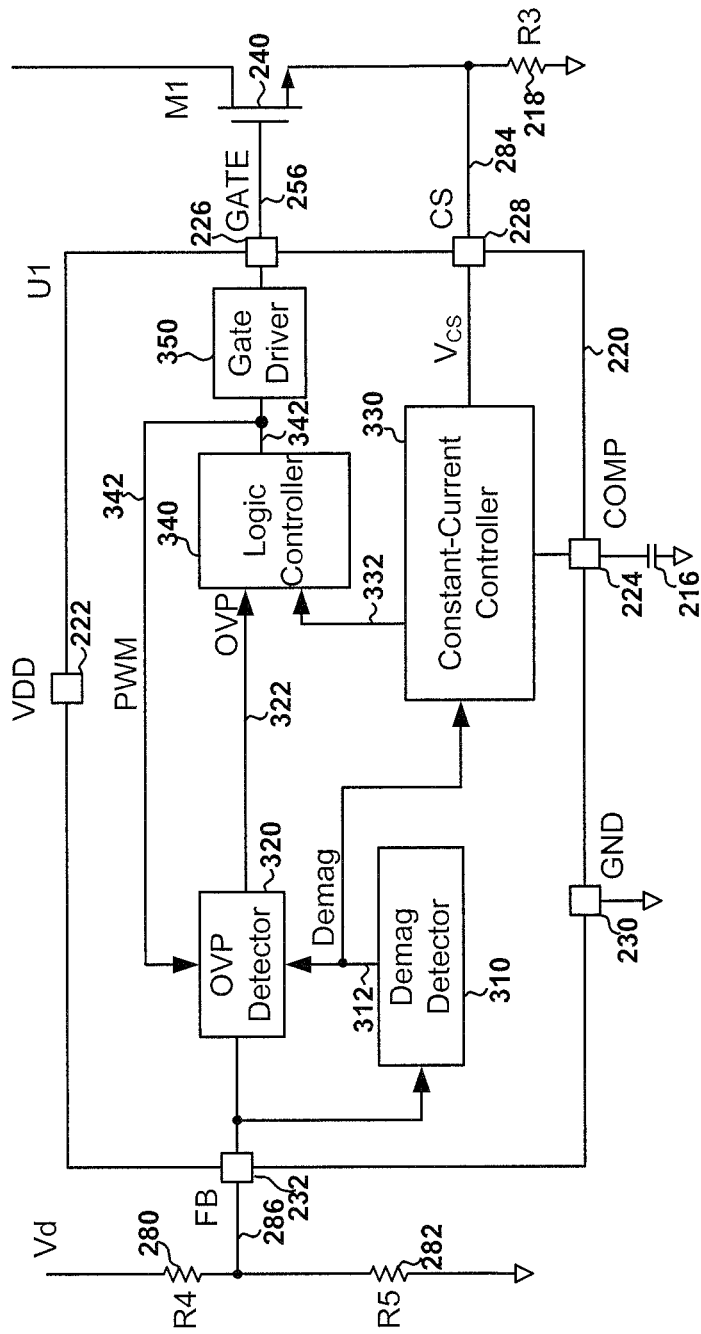
FIG. 3 is a simplified diagram showing certain components of the pulse-width-modulation (PWM) controller as part of the AC-to-DC power conversion system as shown in FIG. 2 according to an embodiment of the present invention.

FIG. 3 is a simplified diagram showing certain components of the pulse-width-modulation (PWM) controller 220 as part of the AC-to-DC power conversion system 200 according to an embodiment of the present invention. This diagram is merely an example, which should not unduly limit the scope of the claims. One of ordinary skill in the art would recognize many variations, alternatives, and modifications. The pulse-width-modulation (PWM) controller 220 includes a demagnetization detector 310, an overvoltage-protection (OVP) detector 320, a constant-current controller 330, a logic controller 340, and a gate driver 350.

As shown in FIG. 2, an AC input voltage 250 (e.g., VAC) is received and rectified (e.g., with full-wave rectification) to generate a rectified voltage 252 (e.g., $V_{in}$) according to one embodiment. For example, the rectified voltage 252 does not fall below the chip ground (e.g., zero volts). According to another embodiment, the inductive winding 242 includes winding terminals 241 and 243, and the diode 244 includes diode terminals 245 and 247. For example, the winding terminal 243 is biased at the voltage signal 288 (e.g., VD) and is coupled to the diode terminal 245. In another example, a voltage difference between the diode terminal 247 and the winding terminal 241 is equal to an output voltage 260 (e.g., $V_o$) of the power converter 200.

In one embodiment, the power conversion system 200 generates the output voltage 260 (e.g., $V_o$). For example, the output voltage 260 represents the voltage difference between nodes 264 and 262, and the node 264 is at a voltage 266. In another example, the voltage 266 charges the capacitor 212 (e.g., C2) through the resistor 210 (e.g., R2) in order to increase a voltage 254 in magnitude. In another embodiment, the voltage 254 is received by the PWM controller 220 through the terminal 222. For example, if the voltage 254 becomes larger than an undervoltage-lockout (UVLO) threshold, the PWM controller 220 starts the normal operation. In another example, under normal operation, the PWM controller 220 generates a drive signal 256 with pulse-width modulation. In yet another example, the resistor 218 is used to sense the current flowing through the inductive winding 242 and to generate the current-sensing voltage signal 284.

As shown in FIG. 3, the demagnetization detector 310 receives the voltage signal 286, detects the end of a demagnetization process for the inductive winding 242, and generates a demagnetization signal 312 according to one embodiment. For example, the demagnetization signal 312 is received by the overvoltage-protection (OVP) detector 320 and the constant-current controller 330. In another example, the constant-current controller 330 receives the current-sensing voltage signal 284 (e.g., $V_{cs}$) through the terminal 228, and controls charging and discharging of the capacitor 216 (e.g., C3) through the terminal 224.

In one embodiment, the constant-current controller 330 processes the current-sensing voltage signal 284 on a cycle-by-cycle basis by sampling the peak magnitude of the current-sensing voltage signal 284 for each cycle and sending the sampled peak magnitude to an error amplifier as part of the constant-current controller 330. For example, the error amplifier receives the sampled peak magnitude, and generates an output current to charge or discharge the capacitor 216 (e.g., C3) through the terminal 224. In another example, the error amplifier and the capacitor 216 together perform the mathematical operation of integration for the sampled peak magnitude over the demagnetization period, and provide loop compensation to the power conversion system 200.

In another embodiment, the constant-current controller 330 generates a signal 332, and the OVP detector 320 generates a signal 322. For example, the signals 322 and 332 are received by the logic controller 340, which in response outputs a pulse-width-modulation (PWM) signal 342. In another example, the PWM signal 342 is received by the OVP detector 320 and the gate driver 350. In yet another embodiment, the gate driver 350 outputs the drive signal 256 to the switch 240 through the terminal 226. For example, the drive signal 256 has a frequency and also a duty cycle. In another example, the drive signal 256 opens (e.g., turns off) and closes (e.g., turns on) the switch 240 (e.g., to affect a current flowing through the inductive winding 242).

In yet another embodiment, the capacitor 214 (e.g., C5) is used to support the output voltage 260 (e.g., $V_o$) of the power conversion system 200. In yet another embodiment, the power conversion system 200 provides a constant output current to one or more light emitting diodes (LEDs) 290.

As shown in FIG. 2, the resistor 280 (e.g., R4) receives a voltage signal 288 (e.g., VD), and in response, the resistor 280 (e.g., R4) and the resistor 282 (e.g., R5) generate a voltage signal 286, which is received by the PWM controller 220 through the terminal 232, according to certain embodiments. For example, during the demagnetization period of the inductive winding 242, the voltage signal 288 is determined as follows:

$$V_{D\_demag} \cong V_{in} + V_o + V_{diode} \cong V_{in} + V_o \qquad \text{(Equation 1)}$$

where $V_{D\_demag}$ represents the voltage signal 288 during the demagnetization period of the inductive winding 242. Additionally, $V_{in}$ represents the rectified voltage 252, and $V_o$ represents the output voltage 260. Moreover, $V_{diode}$ represents the forward voltage of the diode 244 (e.g., 0.8 volt~1 volt).

In another example, the voltage signal 286 is determined as follows:

$$V_{FB} = \frac{V_D}{K} \qquad \text{(Equation 2A)}$$

where $V_{FB}$ represents the voltage signal 286, and $V_D$ represents the voltage signal 288.

In yet another example, the voltage signal 286 is determined as follows:

$$V_{FB\_demag} = \frac{V_{D\_demag}}{K} \qquad \text{(Equation 2B)}$$

where $V_{FB\_demag}$ represents the voltage signal 286 during the demagnetization period of the inductive winding 242, and $V_{D\_demag}$ represents the voltage signal 288 during the demagnetization period of the inductive winding 242.

In yet another example, as shown in Equations 2A and 2B, K represents a constant coefficient as shown below.

$$K = \frac{R_4 + R_5}{R_5} \qquad \text{(Equation 3)}$$

where $R_4$ represents resistance of the resistor 280, and $R_5$ represents resistance of the resistor 282.

In one embodiment, based on Equation 1, Equation 2B is changed to:

$$V_{FB\_demag} = \frac{V_{D\_demag}}{K} \approx \frac{V_{in} + V_o}{K} \qquad \text{(Equation 4)}$$

In another embodiment, the rectified voltage 252 (e.g., $V_{in}$) and the output voltage 260 (e.g., $V_o$) have the following relationship:

$$V_{in} \times T_{on} = V_o \times T_{demag} \quad \text{(Equation 5)}$$

wherein $V_{in}$ represents the rectified voltage 252, and $V_o$ represents the output voltage 260. Additionally, $T_{on}$ represents the on-time period of the drive signal 256 (e.g., the turn-on period of the switch 240), and $T_{demag}$ represents the demagnetization period of the inductive winding 242. For example, based on Equation 5, the following is obtained:

$$\frac{V_o}{K} = \frac{V_{in} + V_o}{K} \times \frac{T_{on}}{T_{demag} + T_{on}} \quad \text{(Equation 6)}$$

where K represents the constant coefficient that appears in Equation 3. In another example, based on Equation 4, Equation 6 is changed to:

$$\frac{V_o}{K} \cong V_{FB\_demag} \times \frac{T_{on}}{T_{demag} + T_{on}} \quad \text{(Equation 7)}$$

where $V_{FB\_demag}$ represents the voltage signal 286 during the demagnetization period of the inductive winding 242.

Figure 4:
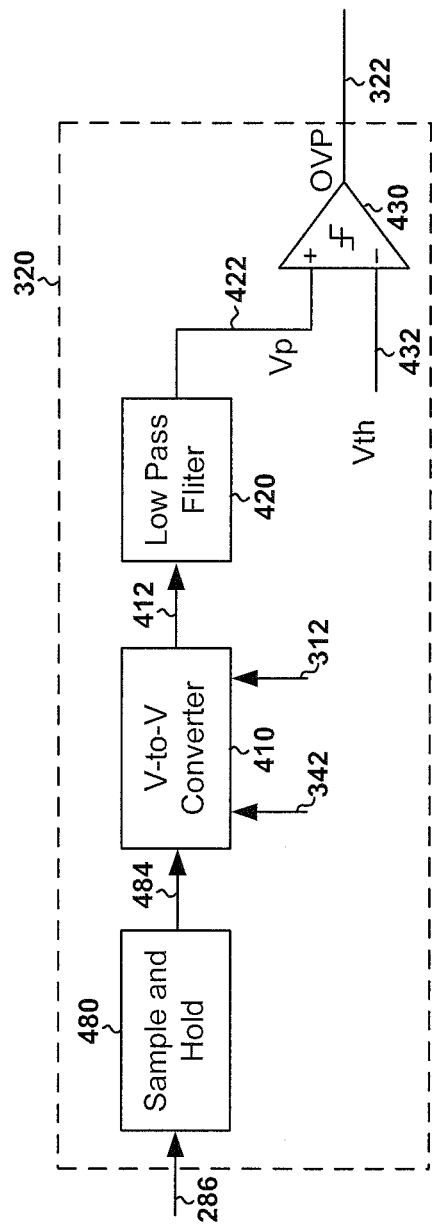
FIG. 4 is a simplified diagram showing the overvoltage-protection (OVP) detector of the pulse-width-modulation (PWM) controller as part of the AC-to-DC power conversion system as shown in FIG. 2 according to an embodiment of the present invention.

FIG. 4 is a simplified diagram showing the overvoltage-protection (OVP) detector 320 of the pulse-width-modulation (PWM) controller 220 as part of the AC-to-DC power conversion system 200 according to an embodiment of the present invention. This diagram is merely an example, which should not unduly limit the scope of the claims. One of ordinary skill in the art would recognize many variations, alternatives, and modifications. The overvoltage-protection (OVP) detector 320 includes a sample-and-hold component 480 (e.g., a sample-and-hold circuit), a voltage-to-voltage converter 410, a low-pass filter 420, and a comparator 430.

In one embodiment, the sample-and-hold component 480 receives the voltage signal 286, samples the voltage signal 286 during the demagnetization period, holds the sampled voltage signal 286, and outputs the sampled and held voltage signal 286 as a voltage signal 484. In another embodiment, the voltage-to-voltage converter 410 is configured to receive the voltage signal 484, the demagnetization signal 312, and the pulse-width-modulation (PWM) signal 342, and generate a voltage signal 412. As an example, the voltage signal 412 has the following relationship with the voltage signal 286:

$$V_C \cong V_{FB\_demag} \times \frac{T_{on}}{T_{demag} + T_{on}} \quad \text{(Equation 8)}$$

where $V_C$ represents the voltage signal 412, and $V_{FB\_demag}$ represents the voltage signal 286 during the demagnetization period of the inductive winding 242. For example, the left-hand side of Equation 8 and the right-hand side of Equation 8 are equal. In another example, the left-hand side of Equation 8 and the right-hand side of Equation 8 are approximately equal within ±1%. In another example, the left-hand side of Equation 8 and the right-hand side of Equation 8 are approximately equal within ±5%. In yet another example, the left-hand side of Equation 8 and the right-hand side of Equation 8 are approximately equal within ±10%.

In yet another embodiment, the voltage signal 412 is received by the low-pass filter 420, which in response performs low-pass filtering to the voltage signal 412 and generates a voltage signal 422. As an example, the voltage signal 422 has the following relationship with the voltage signal 286:

$$V_P \cong V_{FB\_demag} \times \frac{T_{on}}{T_{demag} + T_{on}} \quad \text{(Equation 9)}$$

where $V_P$ represents the voltage signal 422. For example, the left-hand side of Equation 9 and the right-hand side of Equation 9 are equal. In another example, the left-hand side of Equation 9 and the right-hand side of Equation 9 are approximately equal within ±1%. In another example, the left-hand side of Equation 9 and the right-hand side of Equation 9 are approximately equal within ±5%. In yet another example, the left-hand side of Equation 9 and the right-hand side of Equation 9 are approximately equal within ±10%.

As another example, based on Equation 7, Equation 8 is changed to:

$$V_C \cong \frac{V_o}{K} \quad \text{(Equation 10A)}$$

For example, the left-hand side of Equation 10A and the right-hand side of Equation 10A are equal. In another example, the left-hand side of Equation 10A and the right-hand side of Equation 10A are approximately equal within ±1%. In yet another example, the left-hand side of Equation 10A and the right-hand side of Equation 10A are approximately equal within ±5%. In yet another example, the left-hand side of Equation 10A and the right-hand side of Equation 10A are approximately equal within ±10%.

As yet another example, based on Equation 7, Equation 9 is changed to:

$$V_P \cong \frac{V_o}{K} \quad \text{(Equation 10B)}$$

For example, the left-hand side of Equation 10B and the right-hand side of Equation 10B are equal. In another example, the left-hand side of Equation 10B and the right-hand side of Equation 10B are approximately equal within ±1%. In yet another example, the left-hand side of Equation 10B and the right-hand side of Equation 10B are approximately equal within ±5%. In yet another example, the left-hand side of Equation 10B and the right-hand side of Equation 10B are approximately equal within ±10%.

In yet another embodiment, the voltage signal 422 is received by the comparator 430, which also receives a comparator threshold 432 (e.g., $V_{th}$). For example, the comparator 430 compares the voltage signal 422 and the comparator threshold 432, wherein the voltage signal 422 is represented by $V_P$ and the comparator threshold 432 is represented by $V_{th}$. In another example, if $V_P > V_{th}$, the comparator 430 generates the signal 322 at the logic high level. In yet another example, if $V_P < V_{th}$, the comparator 430 generates the signal 322 at the logic low level.

As shown in FIG. 3, the signal 322 is received by the logic controller 340 according to some embodiments. For example, if $V_P > V_{th}$ (e.g., if the signal 322 is at the logic high level), the overvoltage protection (OVP) is triggered, and the power conversion system 200 is shut down. In another example, if $V_P < V_{th}$ (e.g., if the signal 322 is at the logic low level), the overvoltage protection (OVP) is not triggered, and the switch 240 is turned on and off by the drive signal 256 that changes between a logic high level and a logic low level.

In one embodiment, the overvoltage protection (OVP) is triggered and the power conversion system 200 is shut down if:

$$V_P > V_{th} \quad \text{(Equation 11)}$$

where $V_{th}$ represents the comparator threshold 432. For example, based on Equation 10B, Equation 11 is changed to:

$$V_o > V_{OVP} \quad \text{(Equation 12)}$$

$$\text{where } V_{OVP} = K \times V_{th} \quad \text{(Equation 13)}$$

and $V_{OVP}$ represents an overvoltage-protection threshold for the output voltage 260.

In another embodiment, if $V_o > V_{OVP}$, the overvoltage protection (OVP) is triggered and the power conversion system 200 is shut down. In yet another embodiment, if $V_o < V_{OVP}$, the overvoltage protection (OVP) is not triggered, and the switch 240 is turned on and off by the drive signal 256, which changes between a logic high level and a logic low level.

As discussed above and further emphasized here, FIG. 4 is merely an example, which should not unduly limit the scope of the claims. One of ordinary skill in the art would recognize many variations, alternatives, and modifications. For example, the low-pass filter 420 is omitted, so that the voltage signal 412 is received by the comparator 430, which also receives the comparator threshold 432 (e.g., $V_{th}$). In one embodiment, the comparator 430 compares the voltage signal 412 and the comparator threshold 432, wherein the voltage signal 412 is represented by $V_C$ and the comparator threshold 432 is represented by $V_{th}$. In another embodiment, if $V_C > V_{th}$, the comparator 430 generates the signal 322 at the logic high level, and if $V_C < V_{th}$, the comparator 430 generates the signal 322 at the logic low level.

As shown in FIGS. 2 and 3, the pulse-width-modulation (PWM) controller 220 includes the terminal 222 (e.g., pin VDD), the terminal 224 (e.g., pin COMP), the terminal 226 (e.g., pin GATE), the terminal 228 (e.g., pin CS), the terminal 230 (e.g., pin GND), and the terminal 232 (e.g., pin FB). For example, the pulse-width-modulation (PWM) controller 220 is located on a chip, and the terminal 230 (e.g., pin GND) is biased to the chip ground (e.g., zero volts). In another example, the terminal 232 (e.g., pin FB) is used to detect the end of a demagnetization process for the inductive winding 242, and upon such detection, a new switching cycle starts.

Also, as shown in FIG. 3, the pulse-width-modulation (PWM) controller 220 includes the demagnetization detector 310, the overvoltage-protection (OVP) detector 320, the constant-current controller 330, the logic controller 340, and the gate driver 350. In one embodiment, during each switching cycle, if the drive signal 256 generated by the gate driver 350 changes from a logic low level to a logic high level, the switch 240 becomes closed (e.g., turned on). For example, after the switch 240 becomes closed, the current flowing through the switch 240 gradually increases in magnitude, causing the current-sensing voltage signal 284 to also increase in magnitude. In another example, if the current-sensing voltage signal 284 is larger than a reference voltage related to the terminal 224 (e.g., pin COMP), the logic controller 340 outputs the pulse-width-modulation (PWM) signal 342 to the gate driver 350, which in response, generates the drive signal 256 (e.g., at a logic low level) to open (e.g., turn off) the switch 240. In yet another example, when the switch becomes open (e.g., turned off), the demagnetization process for the inductive winding 242 starts. In yet another example, during the demagnetization process, the overvoltage-protection (OVP) detector 320 performs the function of overvoltage protection (OVP). In yet another example, if the demagnetization detector 310 detects the end of the demagnetization process, the switch 240 becomes closed (e.g., turned on) again.

Figure 5:
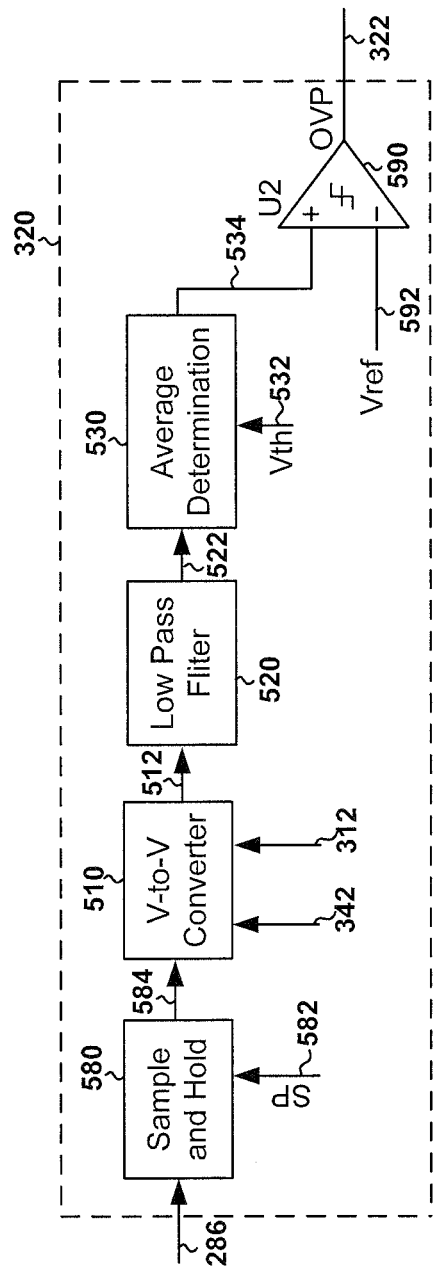
FIG. 5 is a simplified diagram showing the overvoltage-protection (OVP) detector of the pulse-width-modulation (PWM) controller as part of the AC-to-DC power conversion system as shown in FIG. 2 according to another embodiment of the present invention.

FIG. 5 is a simplified diagram showing the overvoltage-protection (OVP) detector 320 of the pulse-width-modulation (PWM) controller 220 as part of the AC-to-DC power conversion system 200 according to another embodiment of the present invention. This diagram is merely an example, which should not unduly limit the scope of the claims. One of ordinary skill in the art would recognize many variations, alternatives, and modifications. The overvoltage-protection (OVP) detector 320 includes a sample-and-hold component 580 (e.g., a sample-and-hold circuit), a voltage-to-voltage converter 510, a low-pass filter 520, an average-determination component 530 (e.g., an average-determination circuit), and a comparator 590. For example, the sample-and-hold component 580 is the same as the sample-and-hold component 480, the voltage-to-voltage converter 510 is the same as the voltage-to-voltage converter 410, and the low-pass filter 520 is the same as the low-pass filter 420.

In one embodiment, the sample-and-hold component 580 receives the voltage signal 286 and a control signal 582. For example, in response to the control signal 582, the sample-and-hold component 580 samples the voltage signal 286 during the demagnetization period, holds the sampled voltage signal 286, and outputs the sampled and held voltage signal 286 as a voltage signal 584. In another embodiment, the voltage-to-voltage converter 510 is configured to receive the voltage signal 584, the demagnetization signal 312 and the pulse-width-modulation (PWM) signal 342, and generate a voltage signal 512. For example, the voltage signal 512 has the relationship with the voltage signal 286 as shown in Equation 8. In yet another embodiment, the voltage signal 512 is received by the low-pass filter 520, which in response performs low-pass filtering to the voltage signal 512 and generates a voltage signal 522. For example, the voltage signal 522 has the relationship with the voltage signal 286 as shown in Equation 9 and has the relationship with the output voltage 260 as shown in Equation 10B.

In yet another embodiment, the average-determination component 530 receives the voltage signal 522 and a threshold voltage 532 (e.g., $V_{th}$) and generates a voltage signal 534. For example, the average-determination component 530 is configured to control charging and discharging of a capacitor as part of the average-determination component 530, and output the voltage of the capacitor as the voltage signal 534. In another example, the average-determination component 530 is configured to compare the voltage signal 522 and the threshold voltage 532 (e.g., $V_{th}$) and generate the voltage signal 534. In yet another example, the voltage signal 534 reflects the average of the voltage signal 522 in comparison with the threshold voltage 532. In yet another example, for a switching cycle, if the average of the voltage signal 522 is equal to the threshold voltage 532, the voltage signal 534 at the end of the switching cycle is equal to the voltage signal 534 at the beginning of the switching cycle. In yet another example, for a switching cycle, if the average of the voltage signal 522 is smaller than the threshold voltage 532, the voltage signal 534 at the end of the switching cycle is smaller than the voltage signal 534 at the beginning of the switching cycle. In yet another example, for a switching cycle, if the average of the voltage signal 522 is larger than the threshold voltage 532, the voltage signal 534 at the end of the switching cycle is larger than the voltage signal 534 at the beginning of the switching cycle.

In yet another embodiment, the voltage signal 534 is received by the comparator 590, which also receives a reference voltage 592 (e.g., $V_{ref}$). For example, the comparator 590 compares the voltage signal 534 and the reference voltage 592, wherein the voltage signal 534 is represented by $V_Q$ and the reference voltage 592 is represented by $V_{ref}$. In another example, if $V_Q > V_{ref}$, the comparator 590 generates the signal 322 at the logic high level. In yet another example, if $V_Q < V_{ref}$, the comparator 590 generates the signal 322 at the logic low level.

As shown in FIG. 3, the signal 322 is received by the logic controller 340 according to some embodiments. For example, if $V_Q > V_{ref}$ (e.g., if the signal 322 is at the logic high level), the overvoltage protection (OVP) is triggered, and the power conversion system 200 is shut down. In another example, if $V_Q < V_{ref}$ (e.g., if the signal 322 is at the logic low level), the overvoltage protection (OVP) is not triggered, and the switch 240 is turned on and off by the drive signal 256 that changes between a logic high level and a logic low level.

According to one embodiment, if after one or more switching cycles, the voltage signal 534 changes from being smaller than the reference voltage 592 to being larger than the reference voltage 592, the signal 322 changes from the logic low level to the logic high level. For example, in response to the signal 322 changing from the logic low level to the logic high level, the overvoltage protection (OVP) is triggered and the power conversion system 200 is shut down. In another example, an overvoltage-protection threshold for the output voltage 260 has a relationship with the threshold voltage 532 as shown in Equation 13, where $V_{th}$ represents the threshold voltage 532 and $V_{OVP}$ represents the overvoltage-protection threshold for the output voltage 260.

As discussed above and further emphasized here, FIG. 5 is merely an example, which should not unduly limit the scope of the claims. One of ordinary skill in the art would recognize many variations, alternatives, and modifications. For example, the low-pass filter 520 is omitted, so that the voltage signal 512 is received by the average-determination component 530, which also receives the threshold voltage 532 (e.g., $V_{th}$) and generates the voltage signal 534.

Figure 6:
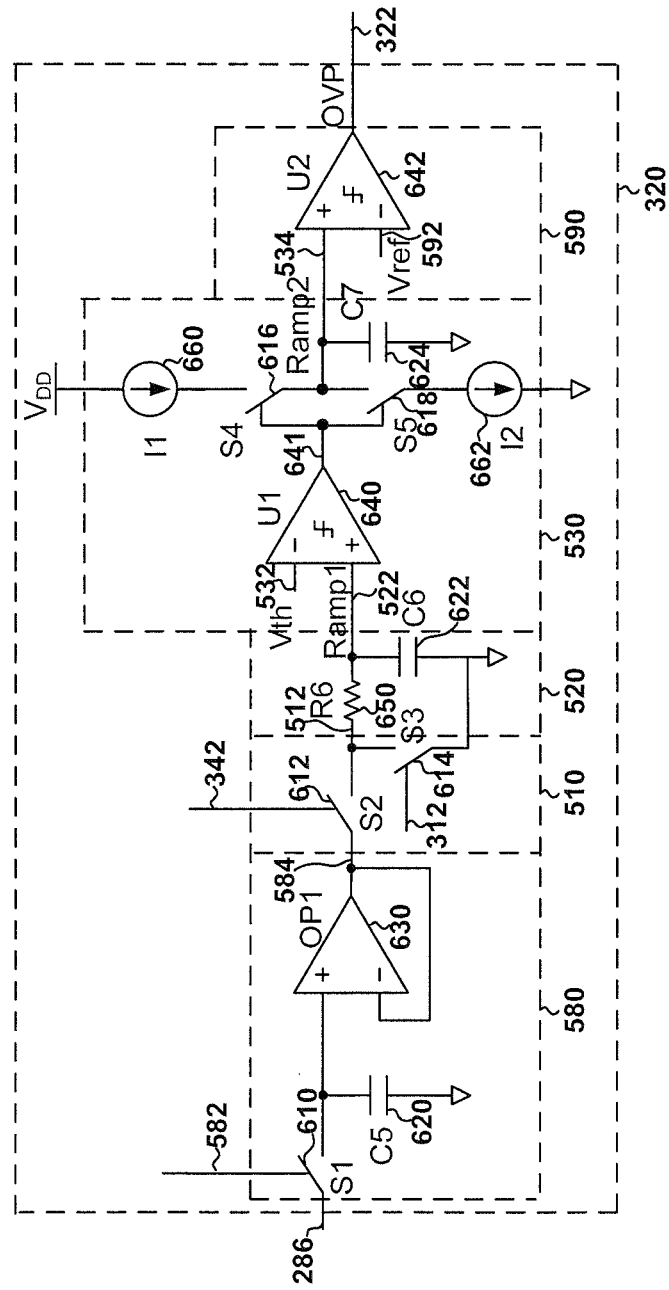
FIG. 6 is a simplified diagram showing the overvoltage-protection (OVP) detector of the pulse-width-modulation (PWM) controller as part of the AC-to-DC power conversion system as shown in FIG. 2 according to yet another embodiment of the present invention.

FIG. 6 is a simplified diagram showing the overvoltage-protection (OVP) detector 320 of the pulse-width-modulation (PWM) controller 220 as part of the AC-to-DC power conversion system 200 according to yet another embodiment of the present invention. This diagram is merely an example, which should not unduly limit the scope of the claims. One of ordinary skill in the art would recognize many variations, alternatives, and modifications. The overvoltage-protection (OVP) detector 320 includes switches 610, 612, 614, 616 and 618, capacitors 620, 622 and 624, an operational amplifier 630, comparators 640 and 642, a resistor 650, and current sources 660 and 662.

Referring to FIG. 5, the sample-and-hold component 580 includes the switch 610, the capacitor 620 and the operational amplifier 630, the voltage-to-voltage converter 510 includes the switches 612 and 614, the low-pass filter 520 includes the capacitor 622 and the resistor 650, the average-determination component 530 includes the comparator 640, the switches 616 and 618, the capacitor 624 and the current sources 660 and 662, and the comparator 590 is the comparator 642, according to certain embodiments.

In one embodiment, the switch 610 receives the voltage signal 286 and the control signal 582. For example, the control signal 582 includes a signal pulse during the demagnetization period of the inductive winding 242. In another example, the control signal 582 causes the switch 610 to close if the control signal 582 is at a logic high level (e.g., during the signal pulse), and causes the switch 610 to open if the control signal 582 is at a logic low level (e.g., outside the signal pulse). In yet another example, in response to the control signal 582, the voltage signal 286 is sampled during the demagnetization period. In yet another example, the sampled voltage signal 286 is held by the capacitor 620 and the operation amplifier 630, which outputs the sampled and held voltage signal 286 as the voltage signal 584.

In another embodiment, the voltage signal 584 is received by the switch 612 coupled to the switch 614. For example, the switch 612 receives the pulse-width-modulation (PWM) signal 342. In another example, the PWM signal 342 causes the switch 612 to close if the PWM signal 342 is at a logic high level, and causes the switch 612 to open if the PWM signal 342 is at a logic low level. In yet another example, the switch 614 receives the demagnetization signal 312. In yet another example, the demagnetization signal 312 causes the switch 614 to close if the demagnetization signal 312 is at a logic high level, and causes the switch 614 to open if the demagnetization signal 312 is at a logic low level. In yet another embodiment, the switches 612 and 614 together convert the voltage signal 584 to the voltage signal 512 in response to the demagnetization signal 312 and the pulse-width-modulation (PWM) signal 342. For example, the voltage signal 512 has the relationship with the voltage signal 286 as shown in Equation 8.

In yet another embodiment, the voltage signal 512 is received by the resistor 650 coupled with the capacitor 622. For example, the resistor 650 and the capacitor 622 serve as a low-pass filter, which in response generates the voltage signal 522. For example, the voltage signal 522 has the relationship with the voltage signal 286 as shown in Equation 9 and has the relationship with the output voltage 260 as shown in Equation 10B. In another example, the average of the voltage signal 522 represents the output voltage 260.

In yet another embodiment, the voltage signal 522 is received by the comparator 640, which also receives the threshold voltage 532 (e.g., $V_{th}$). For example, the comparator 640 compares the voltage signal 522 and the threshold voltage 532, and generates a comparison signal 641. For example, the comparison signal 641 is at the logic low level if the voltage signal 522 is smaller than the threshold voltage 532, and the comparison signal 641 is at the logic high level if the voltage signal 522 is larger than the threshold voltage 532. In yet another embodiment, the comparison signal 641 is received by the switches 616 and 618. For example, in response the comparison signal 641 being at the logic low level, the switch 616 is open and the switch 618 is closed. In another example, in response the comparison signal 641 being at the logic high level, the switch 616 is closed and the switch 618 is open.

In yet another embodiment, if the switch 616 is open and the switch 618 is closed, the current source 662 discharges the capacitor 624 with a discharging current (e.g., $I_2$) and reduces the voltage 532 in magnitude. In yet another embodiment, if the switch 616 is closed and the switch 618 is open, the current source 662 charges the capacitor 624 with a charging current (e.g., $I_1$) and raises the voltage 532 in magnitude. For example, the charging current (e.g., $I_1$) is equal to the discharging current (e.g., $I_2$) in magnitude.

In yet another embodiment, if the voltage signal 522 is smaller than the threshold voltage 532, the current source 662 discharges the capacitor 624 with a discharging current (e.g., $I_2$) and reduces the voltage 532 in magnitude, and if the voltage signal 522 is larger than the threshold voltage 532, the current source 662 charges the capacitor 624 with a charging current (e.g., $I_1$) and raises the voltage 532 in magnitude. For example, the charging current (e.g., $I_1$) is equal to the discharging current (e.g., $I_2$) in magnitude.

According to one embodiment, for a switching cycle, if the average of the voltage signal 522 is equal to the threshold voltage 532, the comparison signal 641 has a duty cycle that is equal to 50%, so that the charging time and the discharging time during the switch cycle are equal. For example, the charging current (e.g., $I_1$) is equal to the discharging current (e.g., $I_2$) in magnitude, so the voltage signal 534 at the end of the switching cycle is equal to the voltage signal 534 at the beginning of the switching cycle.

According to another embodiment, for a switching cycle, if the average of the voltage signal 522 is smaller than the threshold voltage 532, the comparison signal 641 has a duty cycle that is smaller than 50%, so that the charging time is shorter than the discharging time during the switch cycle. For example, the charging current (e.g., $I_1$) is equal to the discharging current (e.g., $I_2$) in magnitude, so the voltage signal 534 at the end of the switching cycle is smaller than the voltage signal 534 at the beginning of the switching cycle but larger or equal to zero if the voltage signal 534 at the beginning of the switching cycle is larger than zero, or the voltage signal 534 at the end of the switching cycle is equal to zero if the voltage signal 534 at the beginning of the switching cycle is also equal to zero.

According to yet another embodiment, for a switching cycle, if the average of the voltage signal 522 is larger than the threshold voltage 532, the comparison signal 641 has a duty cycle that is larger than 50%, so that the charging time is longer than the discharging time during the switch cycle. For example, the charging current (e.g., $I_1$) is equal to the discharging current (e.g., $I_2$) in magnitude, so the voltage signal 534 at the end of the switching cycle is larger than the voltage signal 534 at the beginning of the switching cycle.

According to yet another embodiment, if after one or more switching cycles, the voltage signal 534 changes from being smaller than the reference voltage 592 to being larger than the reference voltage 592, the signal 322 changes from the logic low level to the logic high level. For example, the average of the voltage signal 522 remains larger than the threshold voltage 532 for consecutive switching cycles, so the voltage signal 534 increases from one switching cycle to another switching cycle, and eventually becomes larger than the reference voltage 592. In another example, in response to the signal 322 changing from the logic low level to the logic high level, the overvoltage protection (OVP) is triggered and the power conversion system 200 is shut down.

Figure 7:
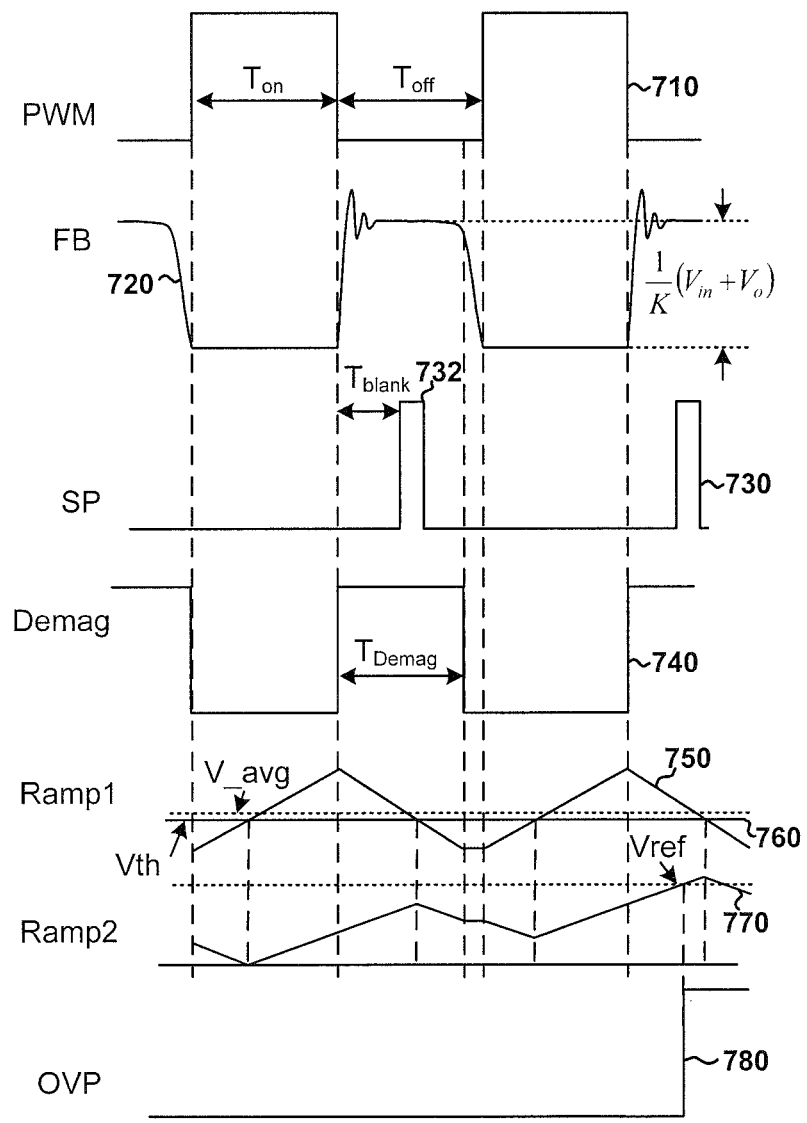
FIG. 7 is a simplified timing diagram for the overvoltage-protection (OVP) detector as shown in FIG. 5 and/or FIG. 6 as part of the AC-to-DC power conversion system as shown in FIG. 2 according to certain embodiments of the present invention.

FIG. 7 is a simplified timing diagram for the overvoltage-protection (OVP) detector 320 as shown in FIG. 5 and/or FIG. 6 as part of the AC-to-DC power conversion system 200 according to certain embodiments of the present invention. This diagram is merely an example, which should not unduly limit the scope of the claims. One of ordinary skill in the art would recognize many variations, alternatives, and modifications.

For example, the waveform 710 represents the pulse-width-modulation (PWM) signal 342 as a function of time, the waveform 720 represents the voltage signal 286 as a function of time, the waveform 730 represents the control signal 582 as a function of time, and the waveform 740 represents the demagnetization signal 312 as a function of time. Additionally, the waveform 750 represents the voltage signal 522 as a function of time, the waveform 760 represents the threshold voltage 532 as a function of time, the waveform 770 represents the voltage signal 534 as a function of time, and the waveform 780 represents the signal 322 as a function of time.

In one embodiment, as shown by the waveform 710, the pulse-width-modulation (PWM) signal 342 is at a logic high level during a turn-on period (e.g., an on-time period $T_{on}$), and is at a logic low level during a turn-off period (e.g., an off-time period $T_{off}$). For example, the time duration of a switching cycle ($T_{switch}$) is equal to a sum of the turn-on period and the turn-off period. In another example, during the turn-on period, the switch 240 is closed (e.g., turned on). In yet another example, during the turn-off period, the switch 240 is open (e.g., turned off). In another embodiment, as shown by the waveform 720, the voltage signal 286 reaches a value as described in Equation 4 during a demagnetization period of the inductive winding 242.

In another embodiment, as shown by the waveform 730, the control signal 582 changes from a logic low level to a logic high level after a predetermined time delay (e.g., $T_{blank}$) from a falling edge of the PWM signal 342, and forms a signal pulse 732. For example, during the signal pulse 732, the voltage signal 286 (e.g., as shown by the waveform 720) is sampled, in order to obtain the magnitude of the voltage signal 286 during the demagnetization period (e.g., $T_{Demag}$ as indicated by the waveform 740). In yet another embodiment, as shown by the waveform 740, the demagnetization signal 312 is at the logic high level during a demagnetization period of the inductive winding 242 and is at the logic low level during outside of any demagnetization period of the inductive winding 242.

In yet another embodiment, as shown by the waveform 750, the voltage signal 522 has a triangular waveform during the turn-on period (e.g., $T_{on}$) and the demagnetization period (e.g., $T_{Demag}$). For example, after the end of the demagnetization period but before the end of the turn-off period, the voltage signal 522 is constant.

In yet another embodiment, as shown by the waveform 770, the voltage signal 534 at the end of a switching cycle is larger than the voltage signal 534 at the beginning of the switching cycle. For example, after more than one but less than switching cycles, the voltage signal 534 changes from being smaller than the reference voltage 592 to being larger than the reference voltage 592. In another example, in response to the voltage signal 534 becoming larger than the reference voltage 592, the signal 322 changes from the logic low level to the logic high level as shown by the waveform 780 to trigger the overvoltage protection (OVP).

Figure 8:
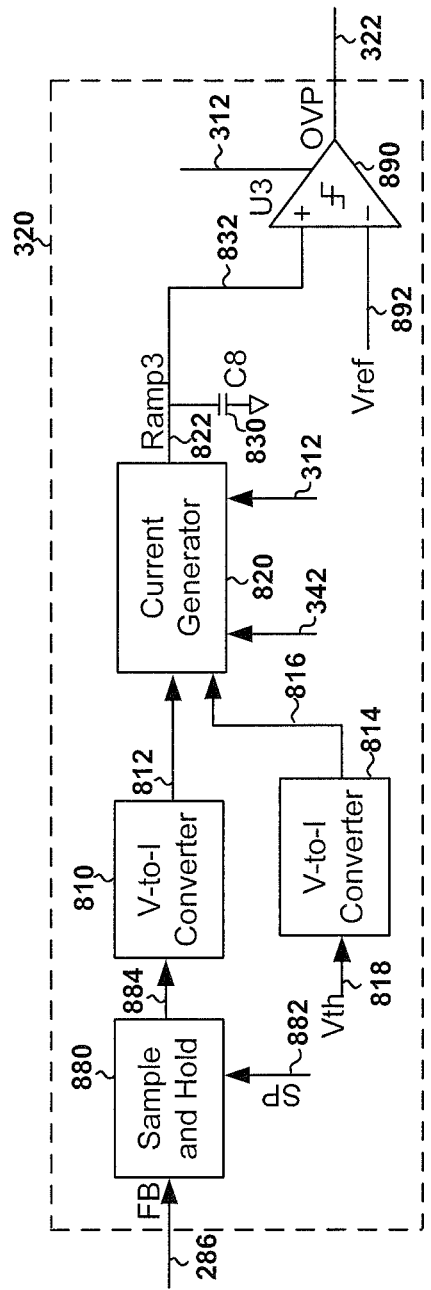
FIG. 8 is a simplified diagram showing the overvoltage-protection (OVP) detector of the pulse-width-modulation (PWM) controller as part of the AC-to-DC power conversion system as shown in FIG. 2 according to yet another embodiment of the present invention.

FIG. 8 is a simplified diagram showing the overvoltage-protection (OVP) detector 320 of the pulse-width-modulation (PWM) controller 220 as part of the AC-to-DC power conversion system 200 according to yet another embodiment of the present invention. This diagram is merely an example, which should not unduly limit the scope of the claims. One of ordinary skill in the art would recognize many variations, alternatives, and modifications. The overvoltage-protection (OVP) detector 320 includes a sample-and-hold component 880 (e.g., a sample-and-hold circuit), voltage-to-current converters 810 and 814, a current generator 820, a capacitor 830, and a controlled comparator 890. For example, the sample-and-hold component 880 is the same as the sample-and-hold component 480. In another example, the voltageto-current converters 810 and 814, the current generator 820, and the capacitor 830 are parts of a voltage-to-voltage converter (e.g., the voltage-to-voltage converter 410).

In one embodiment, the sample-and-hold component 880 receives the voltage signal 286 and a control signal 882. For example, in response to the control signal 882, the sample-and-hold component 880 samples the voltage signal 286 during the demagnetization period, holds the sampled voltage signal 286, and outputs the sampled and held voltage signal 286 as a voltage signal 884. In another example, $$V_s = V_{FB\_demag} \quad \text{(Equation 14)}$$

where $V_s$ represents the voltage signal 884. Additionally, $V_{FB\_demag}$ represents the voltage signal 286 during the demagnetization period of the inductive winding 242.

Referring back to FIG. 2, based on Equation 4, the following has been obtained according to another embodiment.

$$V_{FB\_demag} \approx \frac{V_{in} + V_o}{K} \quad \text{(Equation 15)}$$

where $V_{in}$ represents the rectified voltage 252, and $V_o$ represents the output voltage 260. Additionally, K represents the constant coefficient that appears in Equation 3. For example, based on Equations 14 and 15, the following is obtained.

$$V_s \approx \frac{V_{in} + V_o}{K} \quad \text{(Equation 16)}$$

As shown in FIG. 8, the voltage-to-current converter 810 is configured to receive the voltage signal 884 (e.g., $V_s$) and generate a current signal 812 according to some embodiments. In one embodiment, $$I_s = V_s \times G_{m1} \quad \text{(Equation 17)}$$

where $V_s$ represents the voltage signal 884, $G_{m1}$ represents the transconductance of the voltage-to-current converter 810, and $I_s$ represents the current signal 812. In another example, based on Equations 16 and 17, the following is obtained.

$$I_s \approx \frac{V_{in} + V_o}{K} \times G_{m1} \quad \text{(Equation 18)}$$

In another embodiment, the voltage-to-current converter 814 is configured to receive a threshold voltage 818 (e.g., $V_{th}$) and generate a current signal 816. For example, $$I_{th} = V_{th} \times G_{m2} \quad \text{(Equation 19)}$$

where $V_{th}$ represents the threshold voltage 818, $G_{m2}$ represents the transconductance of the voltage-to-current converter 814, and $I_{th}$ represents the current signal 816. In another example, if $$V_{th} = \frac{V_{OVP}}{K} \quad \text{(Equation 20)}$$

then $$I_{th} = \frac{V_{OVP}}{K} \times G_{m2} \quad \text{(Equation 21)}$$

where $V_{OVP}$ represents an overvoltage-protection threshold for the output voltage 260, and K represents the constant coefficient that appears in Equation 3.

In yet another embodiment, if the transconductance of the voltage-to-current converter 810 is equal to the transconductance of the voltage-to-current converter 814, the following equations are obtained.

$$I_s \approx \frac{V_{in} + V_o}{K} \times G_{me} \quad \text{(Equation 22)}$$

$$I_{th} = \frac{V_{OVP}}{K} \times G_{me} \quad \text{(Equation 23)}$$

where $G_{me}$ represents the transconductance of the voltage-to-current converter 810 and also represents the transconductance of the voltage-to-current converter 814.

Referring to FIG. 2, based on Equation 6, the following is obtained according to certain embodiments.

$$\frac{V_{in} + V_o}{K} \times \frac{T_{on}}{T_{demag} + T_{on}} = \frac{V_o}{K} \quad \text{(Equation 24)}$$

where K represents the constant coefficient that appears in Equation 3. Additionally, $T_{on}$ represents the on-time period of the drive signal 256 (e.g., the turn-on period of the switch 240), and $T_{demag}$ represents the demagnetization period of the inductive winding 242.

For example, if $$V_o > V_{OVP} \quad \text{(Equation 25)}$$

then Equation 24 becomes $$\frac{V_{in} + V_o}{K} \times \frac{T_{on}}{T_{demag} + T_{on}} > \frac{V_{OVP}}{K} \quad \text{(Equation 26)}$$

In another example, based on Equations 22 and 23, Equation 26 becomes $$(I_s - I_{th}) \times T_{on} - I_{th} \times T_{demag} > 0 \quad \text{(Equation 27)}$$

where $I_s$ represents the current signal 812, and $I_{th}$ represents the current signal 816. Additionally, $T_{on}$ represents the on-time period of the drive signal 256 (e.g., the turn-on period of the switch 240), and $T_{demag}$ represents the demagnetization period of the inductive winding 242.

As shown in FIG. 8, according to some embodiments, if $(I_s - I_{th}) \times T_{on} - I_{th} \times T_{demag} > 0$ (e.g., as shown by Equation 27), the overvoltage protection (OVP) is triggered and the power conversion system 200 is shut down. In yet another embodiment, if $(I_s - I_{th}) \times T_{on} - I_{th} \times T_{demag} < 0$, the overvoltage protection (OVP) is not triggered, and the switch 240 is turned on and off by the drive signal 256, which changes between a logic high level and a logic low level.

In one embodiment, the voltage-to-current converter 810 outputs the current signal 812 (e.g., $I_s$), and the voltage-to-current converter 814 outputs the current signal 816 (e.g., $I_{th}$). For example, the current signals 812 and 816 are received by the current generator 820, which also receives the demagnetization signal 312 and the pulse-width-modulation (PWM) signal 342 and generates a current 822 (e.g., $I_c$). In another example, the current 822 is used to charge the capacitor 830 if the current 822 flows from the current generator 820 to the capacitor 830, and to discharge the capacitor 830 if the current 822 flows from the capacitor 830 to the current generator 820.

In another embodiment, during the on-time period of the drive signal 256 (e.g., $T_{on}$), the current 822 is generated to flow from the current generator 820 to the capacitor 830 and charge the capacitor 830. For example, the current 822 is determined in magnitude as follows:

$$I_{c1}=I_s-I_{th} \quad \text{(Equation 28)}$$

where $I_{c1}$ represents the current 822 during the on-time period of the drive signal 256 (e.g., $T_{on}$), $I_s$ represents the current signal 812, and $I_{th}$ represents the current signal 816. In another example, during the on-time period of the drive signal 256, the current 822 charges the capacitor 830, and a capacitor voltage 832 (e.g., $V_c$) of the capacitor 830 increases by the following magnitude:

$$\Delta V_{c1}=(I_s-I_{th}) \times T_{on} \times C \quad \text{(Equation 29)}$$

where $\Delta V_{c1}$ represents an increase of the capacitor voltage 832, and C represents the capacitance of the capacitor 830.

In yet another embodiment, during the demagnetization period of the inductive winding 242 (e.g., $T_{demag}$), the current 822 is generated to flow from the capacitor 830 to the current generator 820 and discharge the capacitor 830. For example, the current 822 is determined in magnitude as follows:

$$I_{c2}=I_{th} \quad \text{(Equation 30)}$$

where $I_{c2}$ represents the current 822 during the demagnetization period of the inductive winding 242 (e.g., $T_{demag}$), and $I_{th}$ represents the current signal 816. In another example, during the demagnetization period of the inductive winding 242 (e.g., $T_{demag}$), the current 822 discharges the capacitor 830, and the capacitor voltage 832 (e.g., $V_c$) of the capacitor 830 decreases by the following magnitude:

$$\Delta V_{c2}=I_{th} \times T_{demag} \times C \quad \text{(Equation 31)}$$

where $\Delta V_{c2}$ represents a decrease of the capacitor voltage 832, and C represents the capacitance of the capacitor 830.

In yet another embodiment, from the beginning of the on-time period of the drive signal 256 (e.g., $T_{on}$) to the end of the demagnetization period of the inductive winding 242 (e.g., $T_{demag}$), the change of the capacitor voltage 832 is determined based on Equations 29 and 31 as follows:

$$\Delta V_{cd}=\Delta V_{c1}-\Delta V_{c2}=(I_s-I_{th}) \times T_{on} \times C - I_{th} \times T_{demag} \times C \quad \text{(Equation 32)}$$

where $\Delta V_{cd}$ represents the change of the capacitor voltage 832 from the beginning of the on-time period of the drive signal 256 to the end of the demagnetization period of the inductive winding 242.

According to one embodiment, if $\Delta V_{cd}$ is larger than zero, the capacitor voltage 832 increases from the beginning of the on-time period of the drive signal 256 to the end of the demagnetization period of the inductive winding 242. In another embodiment, if $\Delta V_{cd}$ is smaller than zero, the capacitor voltage 832 decreases from the beginning of the on-time period of the drive signal 256 to the end of the demagnetization period of the inductive winding 242.

According to another embodiment, if the capacitor voltage 832 increases from the beginning of the on-time period of the drive signal 256 to the end of the demagnetization period of the inductive winding 242 (e.g., $\Delta V_{cd}>0$), based on Equation 32, Equation 27 is obtained as reproduced below.

$$(I_s-I_{th}) \times T_{on}-I_{th} \times T_{demag}>0 \quad \text{(Equation 33)}$$

For example, if the capacitor voltage 832 increases from the beginning of the on-time period of the drive signal 256 to the end of the demagnetization period of the inductive winding 242 (e.g., $\Delta V_{cd}>0$), the overvoltage protection (OVP) is triggered and the power conversion system 200 is shut down. In another example, if the capacitor voltage 832 decreases from the beginning of the on-time period of the drive signal 256 to the end of the demagnetization period of the inductive winding 242 (e.g., $\Delta V_{cd}<0$), the overvoltage protection (OVP) is not triggered, and the switch 240 is turned on and off by the drive signal 256, which changes between a logic high level and a logic low level.

According to yet another embodiment, if the capacitor voltage 832 increases from the beginning of the on-time period of the drive signal 256 to the end of the demagnetization period of the inductive winding 242 by a predetermined amount (e.g., $\Delta V_{cd}>V_{ref}$), the overvoltage protection (OVP) is triggered and the power conversion system 200 is shut down, where $V_{ref}$ represents the predetermined amount. In another example, if the capacitor voltage 832 does not increase from the beginning of the on-time period of the drive signal 256 to the end of the demagnetization period of the inductive winding 242 by the predetermined amount (e.g., $\Delta V_{cd}<V_{ref}$), the overvoltage protection (OVP) is not triggered, and the switch 240 is turned on and off by the drive signal 256, which changes between a logic high level and a logic low level. In yet another example, the predetermined amount (e.g., $V_{ref}$) is equal to or larger than the chip ground (e.g., being equal to or larger than zero volts).

In one embodiment, the capacitor voltage 832 is set to the chip ground (e.g., zero volts) at the beginning of each switching period (e.g., at the beginning of each on-time period of the drive signal 256), so that at the end of each corresponding demagnetization period of the inductive winding 242, the capacitor voltage 832 is equal to the change of the capacitor voltage 832 from the beginning of the on-time period of the drive signal 256 to the end of the demagnetization period of the inductive winding 242, as follows:

$$V_{ce}=\Delta V_{cd} \quad \text{(Equation 34)}$$

where $V_{ce}$ represents the capacitor voltage 832 at the end of the demagnetization period of the inductive winding 242, and $\Delta V_{cd}$ represents the change of the capacitor voltage 832 from the beginning of the on-time period of the drive signal 256 to the end of the demagnetization period of the inductive winding 242. For example, if the capacitor voltage 832 is set to the chip ground (e.g., zero volts) at the beginning of each switching period (e.g., at the beginning of each on-time period of the drive signal 256), based on Equations 32 and 34, the following is obtained.

$$V_{ce}=(I_s-I_{th}) \times T_{on} \times C - I_{th} \times T_{demag} \times C \quad \text{(Equation 35)}$$

where $V_{ce}$ represents the capacitor voltage 832 at the end of a demagnetization period of the inductive winding 242. Additionally, $I_s$ represents the current signal 812, and $I_{th}$ represents the current signal 816. Moreover, $T_{on}$ represents the on-time period of the drive signal 256 (e.g., the turn-on period of the switch 240), and $T_{demag}$ demag represents the demagnetization period of the inductive winding 242. Also, C represents the capacitance of the capacitor 830.

For example, if the capacitor voltage 832 at the end of a demagnetization period of the inductive winding 242 is larger than a predetermined amount (e.g., $V_{ce}>V_{ref}$), the overvoltage protection (OVP) is triggered and the power conversion system 200 is shut down, where $V_{ref}$ represents the predetermined amount. In another example, if the capacitor voltage 832 at the end of the demagnetization period of the inductive winding 242 is smaller than the predetermined amount (e.g., $V_{ce}<V_{ref}$), the overvoltage protection (OVP) is not triggered, and the switch 240 is turned on and off by the drive signal 256, which changes between a logic high level and a logic low level. In yet another example, the predetermined amount (e.g., $V_{ref}$) is equal to or larger than the chip ground (e.g., being equal to or larger than zero volts).

In another embodiment, the AC-to-DC power conversion system 200 operates in the quasi-resonance mode, under which, $$T_{demag} \cong T_{off} \quad \text{(Equation 36)}$$

where $T_{off}$ represents the off-time period of the drive signal 256 (e.g., the turn-off period of the switch 240). For example, under the quasi-resonance mode, $$T_{switch} = T_{on} + T_{off} \cong T_{on} + T_{demag} \quad \text{(Equation 37)}$$

where $T_{switch}$ represents the switching period of the drive signal 256 (e.g., the switching period of the switch 240). In another example, under the quasi-resonance mode, from the beginning of a switching period to the end of the switching period, the change of the capacitor voltage 832 is determined based on Equation 32 as follows.

$$\Delta V_{cp} \cong \Delta V_{cd} = (I_s - I_{th}) \times T_{on} \times C - I_{th} \times T_{demag} \times C \quad \text{(Equation 38)}$$

where $\Delta V_{cp}$ represents the change of the capacitor voltage 832 from the beginning of a switching period to the end of the switching period.

In yet another embodiment, the capacitor voltage 832 is set to the chip ground (e.g., zero volts) at the beginning of each switching period (e.g., at the beginning of each on-time period of the drive signal 256), so that at the end of the switching period, the capacitor voltage 832 is equal to the change of the capacitor voltage 832 from the beginning of the switching period to the end of the switching period, as follows:

$$V_{cs} = \Delta V_{cp} \quad \text{(Equation 39)}$$

where $V_{cs}$ represents the capacitor voltage 832 at the end of the switching period, and $\Delta V_{cp}$ represents the change of the capacitor voltage 832 from the beginning of the switching period to the end of the switching period. For example, if the capacitor voltage 832 is set to the chip ground (e.g., zero volts) at the beginning of each switching period (e.g., at the beginning of each on-time period of the drive signal 256), based on Equations 38 and 39, the following is obtained.

$$V_{cs} \cong (I_s - I_{th}) \times T_{on} \times C - I_{th} \times T_{demag} \times C \quad \text{(Equation 40)}$$

where $V_{cs}$ represents the capacitor voltage 832 at the end of the switching period. Additionally, $I_s$ represents the current signal 812, and $I_{th}$ represents the current signal 816. Moreover, $T_{on}$ represents the on-time period of the drive signal 256 (e.g., the turn-on period of the switch 240), and $T_{demag}$ represents the demagnetization period of the inductive winding 242. Also, C represents the capacitance of the capacitor 830.

As shown in FIG. 8, the capacitor voltage 832 of the capacitor 830 is received by the controlled comparator 890, which also receives a comparator threshold 892 (e.g., $V_{ref}$) and the demagnetization signal 312 according to some embodiments. For example, at the end of a demagnetization period of the inductive winding 242 as indicated by the demagnetization signal 312, the controlled comparator 890 compares the capacitor voltage 832 and the comparator threshold 892, generates the signal 322, and keeps the signal 322 unchanged until at least the end of the next demagnetization period. In another example, at the end of a demagnetization period of the inductive winding 242, if $V_{ce}>V_{ref}$, the controlled comparator 890 generates the signal 322 at the logic high level. In yet another example, at the end of a demagnetization period of the inductive winding 242, if $V_{ce}<V_{ref}$, the controlled comparator 890 generates the signal 322 at the logic low level. In yet another example, the comparator threshold 892 (e.g., $V_{ref}$) is equal to or larger than the chip ground (e.g., being equal to or larger than zero volts). According to certain embodiments, the controlled comparator 890 receives the capacitor voltage 832, the comparator threshold 892 (e.g., $V_{ref}$), and the demagnetization signal 312. For example, the comparator 890 compares the capacitor voltage 832 and the comparator threshold 892, and generates the signal 322 based on the comparison between the sampled capacitor voltage 832 and the sampled comparator threshold 892 at each falling edge of the demagnetization signal 312. In another example, the comparator 890 keeps the signal 322 unchanged until at least the next falling edge of the demagnetization signal 312.

As shown in FIG. 3, the signal 322 is received by the logic controller 340 according to certain embodiments. For example, if $V_{ce}>V_{ref}$ (e.g., if the signal 322 is at the logic high level), the overvoltage protection (OVP) is triggered, and the power conversion system 200 is shut down. In another example, if $V_{ce}<V_{ref}$ (e.g., if the signal 322 is at the logic low level), the overvoltage protection (OVP) is not triggered, and the switch 240 is turned on and off by the drive signal 256 that changes between a logic high level and a logic low level. In yet another example, $V_{ref}$ is equal to or larger than the chip ground (e.g., being equal to or larger than zero volts).

Figure 9:
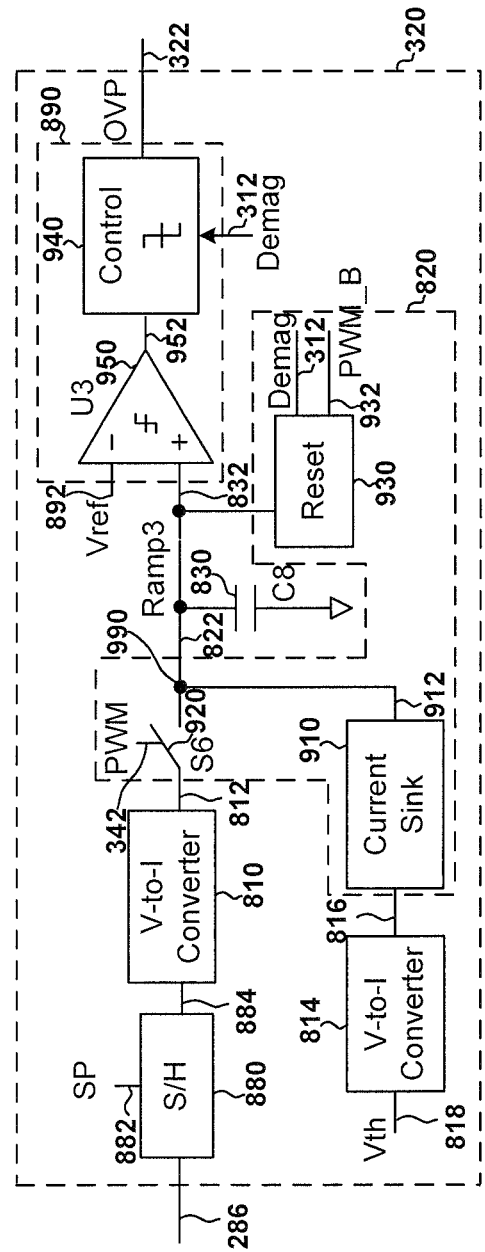
FIG. 9 is a simplified diagram showing the overvoltage-protection (OVP) detector of the pulse-width-modulation (PWM) controller as part of the AC-to-DC power conversion system as shown in FIG. 2 according to yet another embodiment of the present invention.

FIG. 9 is a simplified diagram showing the overvoltage-protection (OVP) detector 320 of the pulse-width-modulation (PWM) controller 220 as part of the AC-to-DC power conversion system 200 according to yet another embodiment of the present invention. This diagram is merely an example, which should not unduly limit the scope of the claims. One of ordinary skill in the art would recognize many variations, alternatives, and modifications. The overvoltage-protection (OVP) detector 320 includes the sample-and-hold component 880, the voltage-to-current converters 810 and 814, the capacitor 830, a current sink 910, a switch 920, a reset component 930 (e.g., a reset circuit), a control component 940 (e.g., an edge-triggered latch), and a comparator 950. For example, referring to FIG. 8, the current generator 820 includes the current sink 910, the switch 920, and the reset component 930. In another example, referring to FIG. 8, the controlled comparator 890 includes the control component 940 and the comparator 950. In yet another example, the edge-triggered latch 940 includes a flip-flop.

In one embodiment, the sample-and-hold component 880 receives the voltage signal 286 and the control signal 882. For example, in response to the control signal 882, the sample-and-hold component 880 samples the voltage signal 286 during the demagnetization period, holds the sampled voltage signal 286, and outputs the sampled and held voltage signal 286 as the voltage signal 884. In another example, the voltage signal 884 is received by the voltage-to-current converter 810, which generates the current signal 812.

As shown in FIG. 9, the voltage-to-current converter 810 is coupled to the switch 920 according to some embodiments. For example, the switch 920 receives the pulse-width-modulation (PWM) signal 342, which closes the switch 920 during the on-time period of the drive signal 256 (e.g., the turn-on period of the switch 240) and opens the switch 920 during the off-time period of the drive signal 256 (e.g., the turn-off period of the switch 240). In another example, during the on-time period of the drive signal 256 (e.g., the turn-on period of the switch 240), the switch 920 is closed and the current signal 812 flows out of the voltage-to-current converter 810 through the switch 920 to a node 990. In yet another example, during the off-time period of the drive signal 256 (e.g., the turn-off period of the switch 240), the switch 920 is opened, and the current signal 812 does not flow between the voltage-to-current converter 810 and the node 990 through the switch 920.

In another embodiment, the voltage-to-current converter 814 receives the threshold voltage 818 (e.g., $V_{th}$) and generates the current signal 816. For example, the current signal 816 is received by the current sink 910, which in response generates a current signal 912. In another example, the current signal 912 is equal to the current signal 816 in magnitude, and the current signal 912 flows from the node 990 to the current sink 910.

As shown in FIG. 9, the reset component 930 receives the demagnetization signal 312 and a control signal 932 according to certain embodiments. For example, the control signal 932 is a complementary signal of the pulse-width-modulation (PWM) signal 342, so that the control signal 932 is at the logic low level if the PWM signal 342 is at the logic high level, and the control signal 932 is at the logic high level if the PWM signal 342 is at the logic low level. In another example, the control signal 932 is at the logic low level during the on-time period of the drive signal 256 (e.g., the turn-on period of the switch 240), and the control signal 932 is at the logic high level during the off-time period of the drive signal 256 (e.g., the turn-off period of the switch 240). In yet another example, the demagnetization signal 312 is the logic high level during a demagnetization period of the inductive winding 242 and is at the logic low level during outside of any demagnetization period of the inductive winding 242.

According to one embodiment, at the end of a demagnetization period of the inductive winding 242 (e.g., at a falling edge of the demagnetization signal 312 from the logic high level to the logic low level), the reset component 930 resets the capacitor voltage 832 to the chip ground (e.g., zero volts), and keeps the capacitor voltage 832 at the chip ground (e.g., zero volts) until the end of the off-time period of the drive signal 256 (e.g., at a falling edge of the control signal 932 from the logic high level to the logic low level), which is also the beginning of the next switching period. For example, at the beginning of each switching period, the capacitor voltage 832 is set to the chip ground (e.g., zero volts). In another example, under the quasi-resonance mode, the time duration between the end of the demagnetization period of the inductive winding 242 and the end of the corresponding off-time period of the drive signal 256 is approximately equal to zero.

According to another embodiment, the capacitor voltage 832 is set to the chip ground (e.g., zero volts) at the beginning of each switching period (e.g., at the beginning of each on-time period of the drive signal 256). In one embodiment, during the on-time period of the drive signal 256, the current signal 812 flows out of the voltage-to-current converter 810 through the switch 920 to the node 990, and the current signal 912 that is equal to the current signal 816 in magnitude flows from the node 990 to the current sink 910. For example, at the end of the on-time period of the drive signal 256, the capacitor voltage 832 is determined as follows.

$$V_{co}=(I_s-I_{th})\times T_{on}\times C \quad \text{(Equation 41)}$$

where $V_{co}$ represents the capacitor voltage 832 at the end of each on-time period of the drive signal 256. Additionally, $I_s$ represents the current signal 812, and $I_{th}$ represents the current signal 816 and the current signal 912. Moreover, $T_{on}$ represents the on-time period of the drive signal 256 (e.g., the turn-on period of the switch 240), and C represents the capacitance of the capacitor 830.

In another embodiment, after the on-time period of the drive signal 256, during the off-time period of the drive signal 256, the current signal 912 that is equal to the current signal 816 in magnitude still flows from the node 990 to the current sink 910, but the current signal 812 does not flow between the voltage-to-current converter 810 and the node 990 through the switch 920. For example, at the end of the demagnetization period of the inductive winding 242, which is approximately equal to the off-time period of the drive signal 256 under the quasi-resonance mode, the capacitor voltage 832 is determined as follows.

$$V_{ce}=(I_s-I_{th})\times T_{on}\times C-I_{th}\times T_{demag}\times C \quad \text{(Equation 42)}$$

where $V_{ce}$ represents the capacitor voltage 832 at the end of a demagnetization period of the inductive winding 242. Additionally, $I_s$ represents the current signal 812, and $I_{th}$ represents the current signal 816 and the current signal 912. Moreover, $T_{on}$ represents the on-time period of the drive signal 256 (e.g., the turn-on period of the switch 240), and $T_{demag}$ represents the demagnetization period of the inductive winding 242. Also, C represents the capacitance of the capacitor 830. In another example, Equation 41 is the same as Equation 35.

As shown in FIG. 9, the capacitor voltage 832 of the capacitor 830 is received by the comparator 950, which also receives the comparator threshold 892 (e.g., $V_{th}$) according to some embodiments. For example, the comparator 950 compares the capacitor voltage 832 (e.g., the capacitor voltage 832 at the end of a demagnetization period of the inductive winding 242) and the comparator threshold 892, and generate a comparison signal 952, wherein the capacitor voltage 832 is represented by $V_c$ and the comparator threshold 892 is represented by $V_{ref}$. In another example, if $V_c>V_{ref}$, the comparator 950 generates the comparison signal 952 at the logic high level. In yet another example, if $V_c<V_{ref}$, the comparator 950 generates the comparison signal 952 at the logic low level.

According to one embodiment, the comparison signal 952 is received by the control component 940. For example, the control component 940 also receives the demagnetization signal 312. In another example, in response to the demagnetization signal 312 indicating the end of a demagnetization period (e.g., the demagnetization signal 312 changing from the logic high level to the logic low level), the control component 940 generates the signal 322 that is the same as the comparison signal 952 at the end of the demagnetization period, and then keeps the signal 322 unchanged until at least the end of the next demagnetization period. In yet another example, at the end of the demagnetization period, if $V_{ce}>V_{ref}$, the comparator 950 generates the comparison signal 952 at the logic high level, and in response, the control component 940 generates the signal 322 also at the logic high level. In yet another example, at the end of the demagnetization period, if $V_{ce}<V_{ref}$, the comparator 950 generates the comparison signal 952 at the logic low level, and in response, the control component 940 generates the signal 322 also at the logic low level.

As shown in FIG. 3, the signal 322 is received by the logic controller 340 according to certain embodiments. For example, if $V_{ce} > V_{ref}$ (e.g., if the signal 322 is at the logic high level), the overvoltage protection (OVP) is triggered, and the power conversion system 200 is shut down. In another example, if $V_{ce} < V_{ref}$ (e.g., if the signal 322 is at the logic low level), the overvoltage protection (OVP) is not triggered, and the switch 240 is turned on and off by the drive signal 256 that changes between a logic high level and a logic low level.

Figure 10:
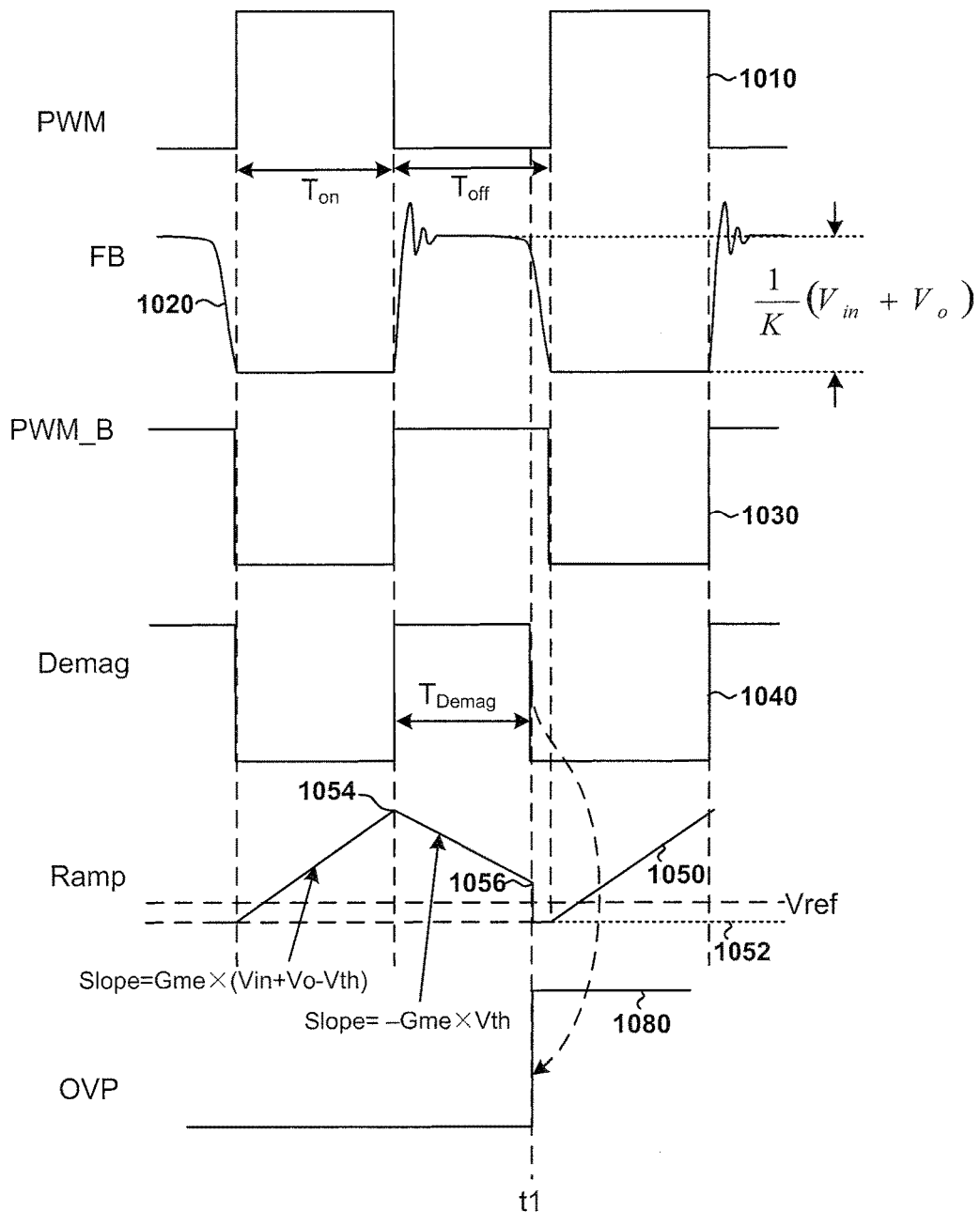
FIG. 10 is a simplified timing diagram for the overvoltage-protection (OVP) detector as shown in FIG. 8 and/or FIG. 9 as part of the AC-to-DC power conversion system as shown in FIG. 2 according to certain embodiments of the present invention.

FIG. 10 is a simplified timing diagram for the overvoltage-protection (OVP) detector 320 as shown in FIG. 8 and/or FIG. 9 as part of the AC-to-DC power conversion system 200 according to certain embodiments of the present invention. This diagram is merely an example, which should not unduly limit the scope of the claims. One of ordinary skill in the art would recognize many variations, alternatives, and modifications.

For example, the waveform 1010 represents the pulse-width-modulation (PWM) signal 342 as a function of time, the waveform 1020 represents the voltage signal 286 as a function of time, the waveform 1030 represents the control signal 932 as a function of time, and the waveform 1040 represents the demagnetization signal 312 as a function of time. Additionally, the waveform 1050 represents the capacitor voltage 832, and the waveform 1080 represents the signal 322 as a function of time.

In one embodiment, as shown by the waveform 1010, the pulse-width-modulation (PWM) signal 342 is at a logic high level during a turn-on period (e.g., an on-time period $T_{on}$), and is at a logic low level during a turn-off period (e.g., an off-time period $T_{off}$). For example, the time duration of a switching cycle (e.g., $T_{switch}$) is equal to a sum of the turn-on period and the turn-off period. In another example, during the turn-on period, the switch 240 is closed (e.g., turned on). In yet another example, during the turn-off period, the switch 240 is open (e.g., turned off). In another embodiment, as shown by the waveform 1020, the voltage signal 286 reaches a value as described in Equation 4 during a demagnetization period of the inductive winding 242.

In yet another embodiment, as shown by the waveform 1030, the control signal 932 is a complementary signal of the pulse-width-modulation (PWM) signal 342 (e.g., as shown by the waveform 1010). For example, the control signal 932 is at the logic low level if the PWM signal 342 is at the logic high level, and the control signal 932 is at the logic high level if the PWM signal 342 is at the logic low level. In another example, the control signal 932 is at the logic low level during the turn-on period (e.g., the on-time period of the drive signal 256), and the control signal 932 is at the logic high level during the turn-off period (e.g., the off-time period of the drive signal 256). In yet another embodiment, as shown by the waveform 1040, the demagnetization signal 312 is at the logic high level during a demagnetization period of the inductive winding 242 and is at the logic low level during outside of any demagnetization period of the inductive winding 242.

In yet another embodiment, as shown by the waveform 1050, at the beginning of a switching period (e.g., at the beginning of an on-time period of the drive signal 256), the capacitor voltage 832 is set to the chip ground that is equal to a magnitude 1052 (e.g., zero volts). For example, during the on-time period of the drive signal 256, the capacitor voltage 832 increases (e.g., increases linearly) from the magnitude 1052 to a magnitude 1054. In another example, during the demagnetization period, the capacitor voltage 832 decreases (e.g., decreases linearly) from the magnitude 1054 to a magnitude 1056. In yet another example, at the end of the demagnetization period (e.g., at a falling edge of the demagnetization signal 312 from the logic high level to the logic low level as shown by the waveform 1040), the capacitor voltage 832 is reset by the reset component 930 from the magnitude 1056 to the magnitude 1052 (e.g., the chip ground). In yet another example, the reset component 930 keeps the capacitor voltage 832 at the magnitude 1052 from the end of the demagnetization period to the end of the off-time period of the drive signal 256 (e.g., at a falling edge of the control signal 932 from the logic high level to the logic low level as shown by the waveform 1030). In yet another example, the end of the off-time period of the drive signal 256 is also the beginning of the next switching period.

In yet another embodiment, as shown by the waveform 1080, the signal 322 is at the logic low level before time $t_1$, where the time $t_1$ corresponds to the end of a demagnetization period. For example, before the time $t_1$, the overvoltage protection (OVP) is not triggered, and the switch 240 is turned on and off by the drive signal 256 that changes between a logic high level and a logic low level. In another example, at the time $t_1$, the demagnetization signal 312 changes from the logic high level to the logic low level as shown by the waveform 1040. In yet another example, at the time $t_1$, the magnitude 1056 of the capacitor voltage 832 is larger than the comparator threshold 892 (e.g., $V_{ref}$) as shown by the waveform 1050, and in response, the signal 322 changes from the logic low level to the logic high level. In yet another example, in response to the signal 322 changing from the logic low level to the logic high level at the time $t_1$, the overvoltage protection (OVP) is triggered and the power conversion system 200 is shut down.

Figure 11:
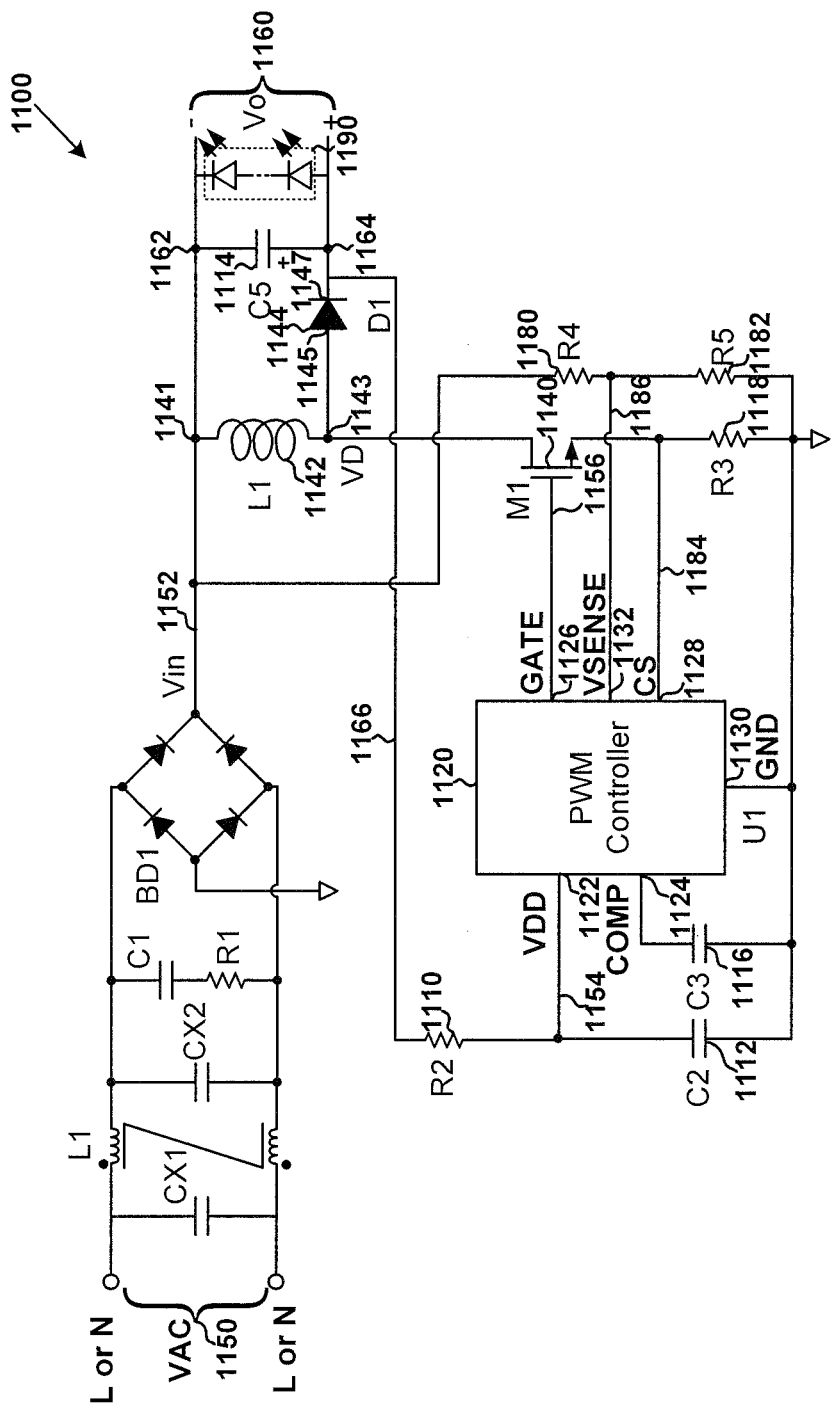
FIG. 11 is a simplified diagram showing an AC-to-DC power conversion system with primary-side regulation (PSR) and buck-boost mechanism for LED lighting according to another embodiment of the present invention.

FIG. 11 is a simplified diagram showing an AC-to-DC power conversion system with primary-side regulation (PSR) and buck-boost mechanism for LED lighting according to another embodiment of the present invention. This diagram is merely an example, which should not unduly limit the scope of the claims. One of ordinary skill in the art would recognize many variations, alternatives, and modifications. The AC-to-DC power conversion system 1100 (e.g., a power converter) includes resistors 1110, 1118, 1180 and 1182, capacitors 1112, 1114, and 1116, a pulse-width-modulation (PWM) controller 1120, a switch 1140, an inductive winding 1142, and a diode 1144. For example, the AC-to-DC power conversion system 1100 includes only one inductive winding (e.g., the inductive winding 1142). In another example, the pulse-width-modulation (PWM) controller 1120 includes a terminal 1122 (e.g., pin VDD), a terminal 1124 (e.g., pin COMP), a terminal 1126 (e.g., pin GATE), a terminal 1128 (e.g., pin CS), a terminal 1130 (e.g., pin GND), and a terminal 1132 (e.g., pin Vsense).

Figure 12:
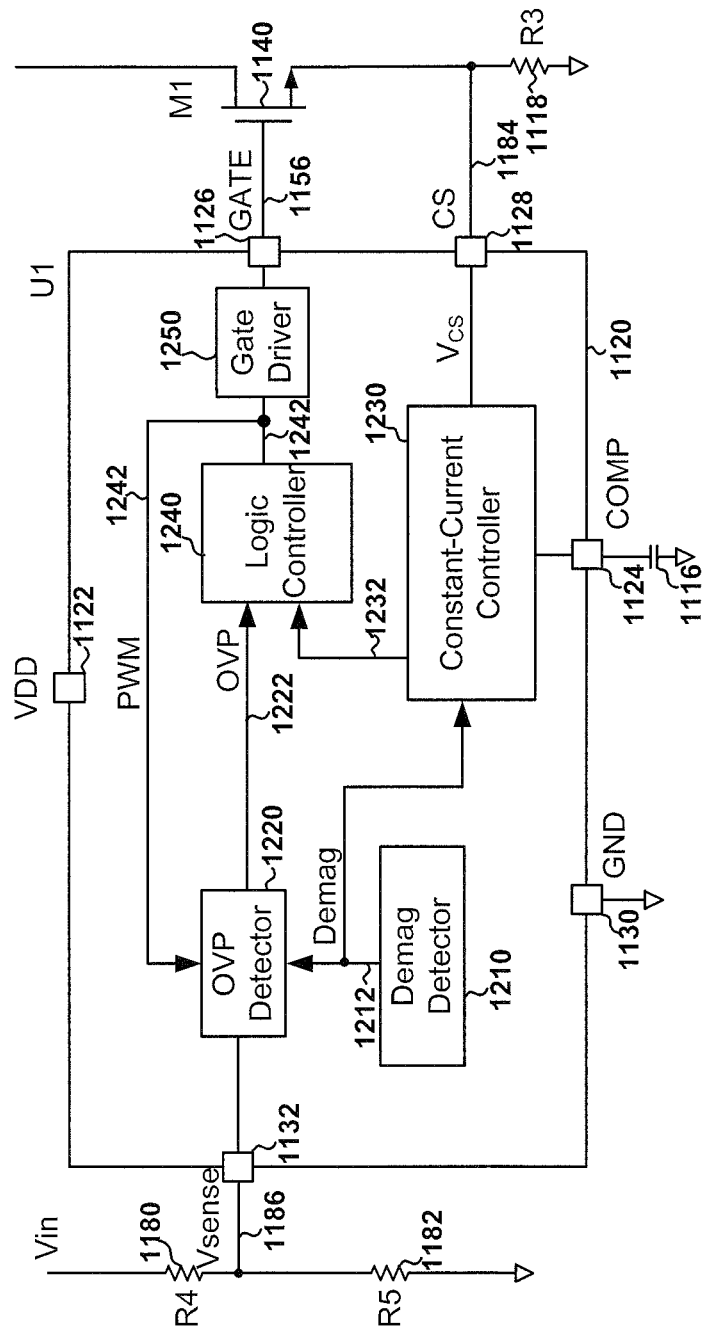
FIG. 12 is a simplified diagram showing certain components of the pulse-width-modulation (PWM) controller as part of the AC-to-DC power conversion system as shown in FIG. 11 according to an embodiment of the present invention.

FIG. 12 is a simplified diagram showing certain components of the pulse-width-modulation (PWM) controller 1120 as part of the AC-to-DC power conversion system 1100 according to an embodiment of the present invention. This diagram is merely an example, which should not unduly limit the scope of the claims. One of ordinary skill in the art would recognize many variations, alternatives, and modifications. The pulse-width-modulation (PWM) controller 1120 includes a demagnetization detector 1210, an overvoltage-protection (OVP) detector 1220, a constant-current controller 1230, a logic controller 1240, and a gate driver 1250.

As shown in FIG. 11, an AC input voltage 1150 (e.g., VAC) is received and rectified (e.g., with full-wave rectification) to generate a rectified voltage 1152 (e.g., $V_{in}$) according to one embodiment. For example, the rectified voltage 1152 does not fall below the chip ground (e.g., zero volts). According to another embodiment, the inductive winding 1142 includes winding terminals 1141 and 1143, and the diode 1144 includes diode terminals 1145 and 1147. For example, the winding terminal 1141 is biased at the rectified voltage 1152 (e.g., V$_{in}$). In another example, the winding terminal 1143 is coupled to the diode terminal 1145. In yet another example, a voltage difference between the diode terminal 1147 and the winding terminal 1141 is equal to an output voltage 1160 (e.g., V$_o$) of the power converter 1100.

In one embodiment, the power conversion system 1100 generates the output voltage 1160 (e.g., V$_o$). For example, the output voltage 1160 represents the voltage difference between nodes 1164 and 1162, and the node 1164 is at a voltage 1166. In another example, the voltage 1166 charges the capacitor 1112 (e.g., C2) through the resistor 1110 (e.g., R2) in order to increase a voltage 1154 in magnitude. In another embodiment, the voltage 1154 is received by the PWM controller 1120 through the terminal 1122. For example, if the voltage 1154 becomes larger than an under-voltage-lockout (UVLO) threshold, the PWM controller 1120 starts the normal operation. In another example, under normal operation, the PWM controller 1120 generates a drive signal 1156 with pulse-width modulation. In yet another example, the resistor 1118 is used to sense the current flowing through the inductive winding 1142 and to generate the current-sensing voltage signal 1184.

As shown in FIG. 12, the demagnetization detector 1210 detects the end of a demagnetization process for the inductive winding 1142, and generates a demagnetization signal 1212 according to one embodiment. For example, the demagnetization signal 1212 is received by the overvoltage-protection (OVP) detector 1220 and the constant-current controller 1230. In another example, the constant-current controller 1230 also receives the current-sensing voltage signal 1184 (e.g., V$_{cs}$) through the terminal 1128, and controls charging and discharging of the capacitor 1116 (e.g., C3) through the terminal 1124.

In one embodiment, the constant-current controller 1230 processes the current-sensing voltage signal 1184 on a cycle-by-cycle basis by sampling the peak magnitude of the current-sensing voltage signal 1184 for each cycle and sending the sampled peak magnitude to an error amplifier as part of the constant-current controller 1230. For example, the error amplifier receives the sampled peak magnitude, and generates an output current to charge or discharge the capacitor 1116 (e.g., C3) through the terminal 1124. In another example, the error amplifier and the capacitor 1116 together perform the mathematical operation of integration for the sampled peak magnitude over the demagnetization period, and provide loop compensation to the power conversion system 1100.

In another embodiment, the constant-current controller 1230 generates a signal 1232, and the OVP detector 1220 generates a signal 1222. For example, the signals 1222 and 1232 are received by the logic controller 1240, which in response outputs a pulse-width-modulation (PWM) signal 1242. In another example, the PWM signal 1242 is received by the OVP detector 1220 and the gate driver 1250. In yet another embodiment, the gate driver 1250 outputs the drive signal 1156 to the switch 1140 through the terminal 1126. For example, the drive signal 1156 has a frequency and also a duty cycle. In another example, the drive signal 1156 opens (e.g., turns off) and closes (e.g., turns on) the switch 1140 (e.g., to affect a current flowing through the inductive winding 1142).

In yet another embodiment, the capacitor 1114 (e.g., C5) is used to support the output voltage 1160 (e.g., V$_o$) of the power conversion system 1100. In yet another embodiment, the power conversion system 1100 provides a constant output current to one or more light emitting diodes (LEDs) 1190.

As shown in FIG. 11, the resistor 1180 (e.g., R4) receives the rectified voltage 1152 (e.g., V$_{in}$), and in response, the resistor 1180 (e.g., R4) and the resistor 1182 (e.g., R5) generate a voltage signal 1186, which is received by the PWM controller 1120 through the terminal 1132, according to certain embodiments. In one embodiment, the rectified voltage 1152 (e.g., V$_{in}$) and the output voltage 1160 (e.g., V$_o$) have the following relationship:

$$V_{in} \times T_{on} = V_o \times T_{demag} \quad \text{(Equation 43)}$$

wherein V$_{in}$ represents the rectified voltage 1152, and V$_o$ represents the output voltage 1160. Additionally, T$_{on}$ represents the on-time period of the drive signal 1156 (e.g., the turn-on period of the switch 1140), and T$_{demag}$ represents the demagnetization period of the inductive winding 1142.

Figure 13:
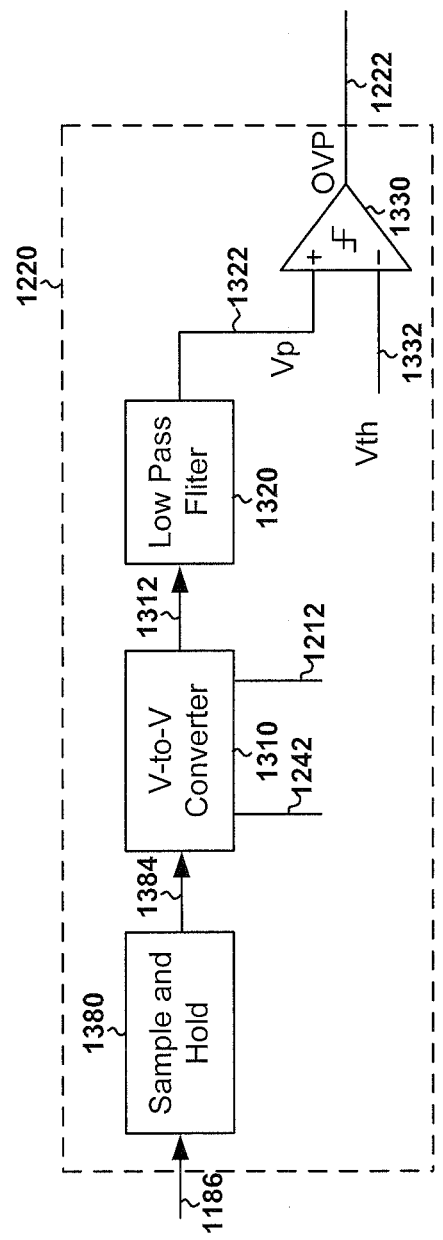
FIG. 13 is a simplified diagram showing the overvoltage-protection (OVP) detector of the pulse-width-modulation (PWM) controller as part of the AC-to-DC power conversion system as shown in FIG. 11 according to an embodiment of the present invention.

FIG. 13 is a simplified diagram showing the overvoltage-protection (OVP) detector 1220 of the pulse-width-modulation (PWM) controller 1120 as part of the AC-to-DC power conversion system 1100 according to an embodiment of the present invention. This diagram is merely an example, which should not unduly limit the scope of the claims. One of ordinary skill in the art would recognize many variations, alternatives, and modifications. The overvoltage-protection (OVP) detector 1220 includes a sample-and-hold component 1380 (e.g., a sample-and-hold circuit), a voltage-to-voltage converter 1310, a low-pass filter 1320, and a comparator 1330.

In one embodiment, the sample-and-hold component 1380 receives the voltage signal 1186, samples the voltage signal 1186 during the demagnetization period, holds the sampled voltage signal 1186, and outputs the sampled and held voltage signal 1186 as a voltage signal 1384. In another embodiment, the voltage-to-voltage converter 1310 is configured to receive the voltage signal 1384, the demagnetization signal 1212, and the pulse-width-modulation (PWM) signal 1242, and generates a voltage signal 1312.

For example, the voltage signal 1312 has the following relationship with the voltage signal 1186:

$$V_C \cong V_{in\_c\_demag} \times \frac{T_{on}}{T_{demag}} \quad \text{(Equation 44)}$$

where V$_C$ represents the voltage signal 1312, and V$_{in\_c\_demag}$ represents the voltage signal 1186 during the demagnetization period of the inductive winding 1142. For example, the left-hand side of Equation 44 and the right-hand side of Equation 44 are equal. In another example, the left-hand side of Equation 44 and the right-hand side of Equation 44 are approximately equal within ±1%. In another example, the left-hand side of Equation 44 and the right-hand side of Equation 44 are approximately equal within ±5%. In yet another example, the left-hand side of Equation 44 and the right-hand side of Equation 44 are approximately equal within ±10%.

In another example, as shown in Equation 44, V$_{in\_c\_demag}$ is determined as follows:

$$V_{in\_c\_demag} = \frac{V_{in}}{K} \quad \text{(Equation 45A)}$$

where $V_{in}$ represents the rectified voltage 1152 during the demagnetization period of the inductive winding 1142.

In yet another example, the voltage signal 1186 is determined as follows:

$$V_{in\_c} = \frac{V_{in}}{K} \qquad \text{(Equation 45B)}$$

where $V_{in\_c}$ represents the voltage signal 1186, and $V_{in}$ represents the rectified voltage 1152.

In yet another example, as shown in Equations 45A and 45B, K represents a constant coefficient as shown below.

$$K = \frac{R_4 + R_5}{R_5} \qquad \text{(Equation 46)}$$

where $R_4$ represents resistance of the resistor 1180, and $R_5$ represents resistance of the resistor 1182.

According to one embodiment, the voltage signal 1312 is received by the low-pass filter 1320, which in response performs low-pass filtering to the voltage signal 1312 and generates a voltage signal 1322. For example, the voltage signal 1322 has the following relationship with the voltage signal 1186:

$$V_P \cong V_{in\_c\_demag} \times \frac{T_{on}}{T_{demag}} \qquad \text{(Equation 47)}$$

where $V_P$ represents the voltage signal 1322, and $V_{in\_c\_demag}$ represents the voltage signal 1186. For example, the left-hand side of Equation 47 and the right-hand side of Equation 47 are equal. In another example, the left-hand side of Equation 47 and the right-hand side of Equation 47 are approximately equal within ±1%. In another example, the left-hand side of Equation 47 and the right-hand side of Equation 47 are approximately equal within ±5%. In yet another example, the left-hand side of Equation 47 and the right-hand side of Equation 47 are approximately equal within ±10%.

In another example, based on Equations 43 and 45A, Equation 44 is changed to:

$$V_C \cong \frac{V_o}{K} \qquad \text{(Equation 48A)}$$

where $V_o$ represents the output voltage 1160. For example, the left-hand side of Equation 48A and the right-hand side of Equation 48A are equal. In another example, the left-hand side of Equation 48A and the right-hand side of Equation 48A are approximately equal within ±1%. In yet another example, the left-hand side of Equation 48A and the right-hand side of Equation 48A are approximately equal within ±5%. In yet another example, the left-hand side of Equation 48A and the right-hand side of Equation 48A are approximately equal within ±10%.

In yet another example, based on Equations 43 and 45A, Equation 47 is changed to:

$$V_P \cong \frac{V_o}{K} \qquad \text{(Equation 48B)}$$

where $V_o$ represents the output voltage 1160. For example, the left-hand side of Equation 48B and the right-hand side of Equation 48B are equal. In another example, the left-hand side of Equation 48B and the right-hand side of Equation 48B are approximately equal within ±1%. In yet another example, the left-hand side of Equation 48B and the right-hand side of Equation 48B are approximately equal within ±5%. In yet another example, the left-hand side of Equation 48B and the right-hand side of Equation 48B are approximately equal within ±10%.

According to another embodiment, the voltage signal 1322 is received by the comparator 1330, which also receives a comparator threshold 1332 (e.g., $V_{th}$). For example, the comparator 1330 compares the voltage signal 1322 and the comparator threshold 1332, wherein the voltage signal 1322 is represented by $V_P$ and the comparator threshold 1332 is represented by $V_{th}$. In another example, if $V_P > V_{th}$, the comparator 1330 generates the signal 1222 at the logic high level. In yet another example, if $V_P < V_{th}$, the comparator 1330 generates the signal 1222 at the logic low level.

As shown in FIG. 12, the signal 1222 is received by the logic controller 1240 according to some embodiments. For example, if $V_P > V_{th}$ (e.g., if the signal 1222 is at the logic high level), the overvoltage protection (OVP) is triggered, and the power conversion system 1100 is shut down. In another example, if $V_P < V_{th}$ (e.g., if the signal 1222 is at the logic low level), the overvoltage protection (OVP) is not triggered, and the switch 1140 is turned on and off by the drive signal 1156 that changes between a logic high level and a logic low level.

In one embodiment, the overvoltage protection (OVP) is triggered and the power conversion system 1100 is shut down if:

$$V_P > V_{th} \qquad \text{(Equation 49)}$$

where $V_{th}$ represents the comparator threshold 1332. For example, based on Equation 49, Equation 48B is changed to:

$$V_o > V_{OVP} \qquad \text{(Equation 50)}$$

$$\text{where } V_{OVP} = K \times V_{th} \qquad \text{(Equation 51)}$$

and $V_{OVP}$ represents an overvoltage-protection threshold for the output voltage 1160.

In another embodiment, if $V_o > V_{OVP}$, the overvoltage protection (OVP) is triggered and the power conversion system 1100 is shut down. In yet another embodiment, if $V_o < V_{OVP}$, the overvoltage protection (OVP) is not triggered, and the switch 1140 is turned on and off by the drive signal 1156, which changes between a logic high level and a logic low level.

As discussed above and further emphasized here, FIG. 13 is merely an example, which should not unduly limit the scope of the claims. One of ordinary skill in the art would recognize many variations, alternatives, and modifications. For example, the low-pass filter 1320 is omitted, so that the voltage signal 1312 is received by the comparator 1330, which also receives the comparator threshold 1332 (e.g., $V_{th}$). In one embodiment, the comparator 1330 compares the voltage signal 1312 and the comparator threshold 1332, wherein the voltage signal 1312 is represented by $V_C$ and the comparator threshold 1332 is represented by $V_{th}$. In another embodiment, if $V_C > V_{th}$, the comparator 1330 generates the signal 1222 at the logic high level, and if $V_C < V_{th}$, the comparator 1330 generates the signal 1222 at the logic low level.

As shown in FIGS. 11 and 12, the pulse-width-modulation (PWM) controller 1120 includes the terminal 1122 (e.g., pin VDD), the terminal 1124 (e.g., pin COMP), the terminal 1126 (e.g., pin GATE), the terminal 1128 (e.g., pin CS), the terminal 1130 (e.g., pin GND), and the terminal 1132 (e.g., pin Vsense). For example, the pulse-width-modulation (PWM) controller 1120 is located on a chip, and the terminal 1130 (e.g., pin GND) is biased to the chip ground (e.g., zero volts). In another example, the terminal 1126 (e.g., pin GATE) is used, by the demagnetization detector 1210, to detect the end of a demagnetization process for the inductive winding 1142, and upon such detection, a new switching cycle starts.

Also, as shown in FIG. 12, the pulse-width-modulation (PWM) controller 1120 includes the demagnetization detector 1210, the overvoltage-protection (OVP) detector 1220, the constant-current controller 1230, the logic controller 1240, and the gate driver 1250. In one embodiment, during each switching cycle, if the drive signal 1156 generated by the gate driver 1250 changes from a logic low level to a logic high level, the switch 1140 becomes closed (e.g., turned on). For example, after the switch 1140 becomes closed, the current flowing through the switch 1140 gradually increases in magnitude, causing the current-sensing voltage signal 1184 to also increase in magnitude. In another example, if the current-sensing voltage signal 1184 is larger than a reference voltage related to the terminal 1124 (e.g., pin COMP), the logic controller 1240 outputs the pulse-width-modulation (PWM) signal 1242 to the gate driver 1250, which in response, generates the drive signal 1156 (e.g., at a logic low level) to open (e.g., turn off) the switch 1140. In yet another example, when the switch becomes open (e.g., turned off), the demagnetization process for the inductive winding 1142 starts. In yet another example, during the demagnetization process, the overvoltage-protection (OVP) detector 1220 performs the function of overvoltage protection (OVP). In yet another example, if the demagnetization detector 1210 detects the end of the demagnetization process, the switch 1140 becomes closed (e.g., turned on) again.

Figure 14:
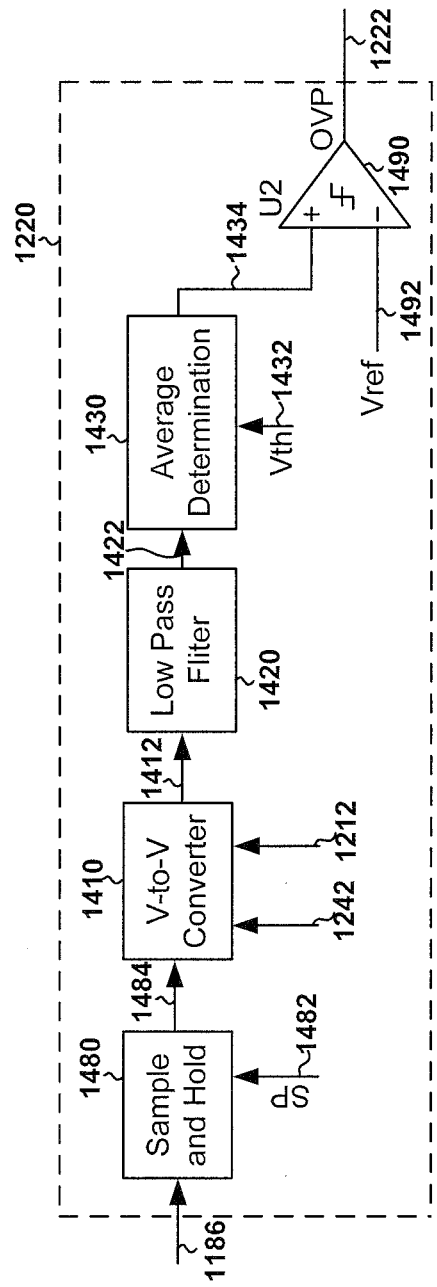
FIG. 14 is a simplified diagram showing the overvoltage-protection (OVP) detector of the pulse-width-modulation (PWM) controller as part of the AC-to-DC power conversion system as shown in FIG. 11 according to another embodiment of the present invention.

FIG. 14 is a simplified diagram showing the overvoltage-protection (OVP) detector 1220 of the pulse-width-modulation (PWM) controller 1120 as part of the AC-to-DC power conversion system 1100 according to another embodiment of the present invention. This diagram is merely an example, which should not unduly limit the scope of the claims. One of ordinary skill in the art would recognize many variations, alternatives, and modifications. The overvoltage-protection (OVP) detector 1220 includes a sample-and-hold component 1480 (e.g., a sample-and-hold circuit), a voltage-to-voltage converter 1410, a low-pass filter 1420, an average-determination component 1430 (e.g., an average-determination circuit), and a comparator 1490.

In one embodiment, the sample-and-hold component 1480 receives the voltage signal 1186 and a control signal 1482. For example, in response to the control signal 1482, the sample-and-hold component 1480 samples the voltage signal 1186 during the demagnetization period, holds the sampled voltage signal 1186, and outputs the sampled and held voltage signal 1186 as a voltage signal 1484. In another embodiment, the voltage-to-voltage converter 1410 is configured to receive the voltage signal 1484, the demagnetization signal 1212 and the pulse-width-modulation (PWM) signal 1242, and generate a voltage signal 1412. For example, the voltage signal 1412 has the relationship with the voltage signal 1186 as shown in Equation 44. In yet another embodiment, the voltage signal 1412 is received by the low-pass filter 1420, which in response performs low-pass filtering to the voltage signal 1412 and generates a voltage signal 1422. For example, the voltage signal 1422 has the relationship with the voltage signal 1186 as shown in Equation 47 and has the relationship with the output voltage 1160 as shown in Equation 48B.

In yet another embodiment, the average-determination component 1430 receives the voltage signal 1422 and a threshold voltage 1432 (e.g., $V_{th}$) and generates a voltage signal 1434. For example, the average-determination component 1430 is configured to control charging and discharging of a capacitor as part of the average-determination component 1430, and output the voltage of the capacitor as the voltage signal 1434. In another example, the average-determination component 1430 is configured to compare the voltage signal 1422 and the threshold voltage 1432 (e.g., $V_{th}$) and generate the voltage signal 1434. In yet another example, the voltage signal 1434 reflects the average of the voltage signal 1422 in comparison with the threshold voltage 1432. In yet another example, for a switching cycle, if the average of the voltage signal 1422 is equal to the threshold voltage 1432, the voltage signal 1434 at the end of the switching cycle is equal to the voltage signal 1434 at the beginning of the switching cycle. In yet another example, for a switching cycle, if the average of the voltage signal 1422 is smaller than the threshold voltage 1432, the voltage signal 1434 at the end of the switching cycle is smaller than the voltage signal 1434 at the beginning of the switching cycle. In yet another example, for a switching cycle, if the average of the voltage signal 1422 is larger than the threshold voltage 1432, the voltage signal 1434 at the end of the switching cycle is larger than the voltage signal 1434 at the beginning of the switching cycle.

In yet another embodiment, the voltage signal 1434 is received by the comparator 1490, which also receives a reference voltage 1492 (e.g., $V_{ref}$). For example, the comparator 1490 compares the voltage signal 1434 and the reference voltage 1492, wherein the voltage signal 1434 is represented by $V_Q$ and the reference voltage 1492 is represented by $V_{ref}$. In another example, if $V_Q > V_{ref}$, the comparator 1490 generates the signal 1222 at the logic high level. In yet another example, if $V_Q < V_{ref}$, the comparator 1490 generates the signal 1222 at the logic low level.

As shown in FIG. 12, the signal 1222 is received by the logic controller 1240 according to some embodiments. For example, if $V_Q > V_{ref}$ (e.g., if the signal 1222 is at the logic high level), the overvoltage protection (OVP) is triggered, and the power conversion system 1100 is shut down. In another example, if $V_Q < V_{ref}$ (e.g., if the signal 1222 is at the logic low level), the overvoltage protection (OVP) is not triggered, and the switch 1140 is turned on and off by the drive signal 1156 that changes between a logic high level and a logic low level.

According to one embodiment, if after one or more switching cycles, the voltage signal 1434 changes from being smaller than the reference voltage 1492 to being larger than the reference voltage 1492, the signal 1222 changes from the logic low level to the logic high level. For example, in response to the signal 1222 changing from the logic low level to the logic high level, the overvoltage protection (OVP) is triggered and the power conversion system 1100 is shut down. In another example, an overvoltage-protection threshold for the output voltage 1160 has a relationship with the threshold voltage 1432 as shown in Equation 51, where $V_{th}$ represents the threshold voltage 1432 and $V_{OVP}$ represents the overvoltage-protection threshold for the output voltage 1160.

As discussed above and further emphasized here, FIG. 14 is merely an example, which should not unduly limit the scope of the claims. One of ordinary skill in the art would recognize many variations, alternatives, and modifications. For example, the low-pass filter 1420 is omitted, so that the voltage signal 1412 is received by the average-determination component 1430, which also receives the threshold voltage 1432 (e.g., $V_{th}$) and generates the voltage signal 1434.

Figure 15:
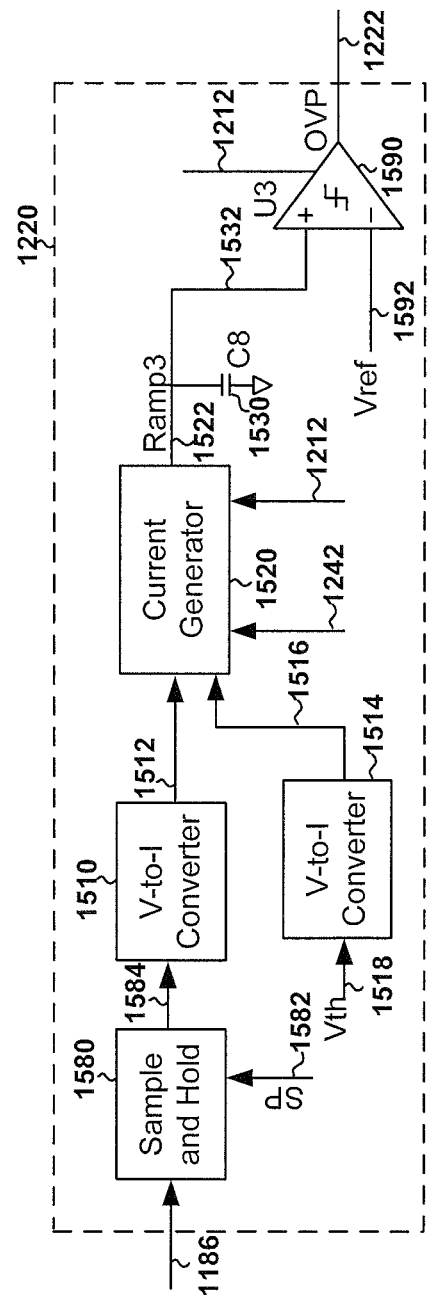
FIG. 15 is a simplified diagram showing the overvoltage-protection (OVP) detector of the pulse-width-modulation (PWM) controller as part of the AC-to-DC power conversion system as shown in FIG. 11 according to yet another embodiment of the present invention.

FIG. 15 is a simplified diagram showing the overvoltage-protection (OVP) detector 1220 of the pulse-width-modulation (PWM) controller 1120 as part of the AC-to-DC power conversion system 1100 according to yet another embodiment of the present invention. This diagram is merely an example, which should not unduly limit the scope of the claims. One of ordinary skill in the art would recognize many variations, alternatives, and modifications. The overvoltage-protection (OVP) detector 1220 includes a sample-and-hold component 1580 (e.g., a sample-and-hold circuit), voltage-to-current converters 1510 and 1514, a current generator 1520, a capacitor 1530, and a controlled comparator 1590.

In one embodiment, the sample-and-hold component 1580 receives the voltage signal 1186 and a control signal 1582. For example, in response to the control signal 1582, the sample-and-hold component 1580 samples the voltage signal 1186 during the demagnetization period, holds the sampled voltage signal 1186, and outputs the sampled and held voltage signal 1186 as a voltage signal 1584. In another example, $$V_s = V_{in\_c\_demag} \quad \text{(Equation 52)}$$

where $V_s$ represents the voltage signal 1584. Additionally, $V_{in\_c\_demag}$ represents the voltage signal 1186 during the demagnetization period of the inductive winding 1142.

Referring back to FIG. 11, the following has been obtained according to another embodiment.

$$V_{in\_c\_demag} = \frac{V_{in}}{K} \quad \text{(Equation 53)}$$

$$K = \frac{R_4 + R_5}{R_5} \quad \text{(Equation 54)}$$

where $V_{in\_c\_demag}$ represents the voltage signal 1186 during the demagnetization period of the inductive winding 1142. Additionally, $V_{in}$ represents the rectified voltage 1152, and K represents a constant coefficient. Moreover, $R_4$ represents resistance of the resistor 1180, and $R_5$ represents resistance of the resistor 1182. For example, based on Equations 52 and 53, the following is obtained.

$$V_s = \frac{V_{in}}{K} \quad \text{(Equation 55)}$$

As shown in FIG. 15, the voltage-to-current converter 1510 is configured to receive the voltage signal 1584 (e.g., $V_s$) and generate a current signal 1512 according to some embodiments. In one embodiment, $$I_s = V_s \times G_{m1} \quad \text{(Equation 56)}$$

where $V_s$ represents the voltage signal 1584, $G_{m1}$ represents the transconductance of the voltage-to-current converter 1510, and $I_s$ represents the current signal 1512. In another example, based on Equations 55 and 56, the following is obtained.

$$I_s = \frac{V_{in}}{K} \times G_{m1} \quad \text{(Equation 57)}$$

In another embodiment, the voltage-to-current converter 1514 is configured to receive a threshold voltage 1518 (e.g., $V_{th}$) and generate a current signal 1516. For example, $$I_{th} = V_{th} \times G_{m2} \quad \text{(Equation 58)}$$

where $V_{th}$ represents the threshold voltage 1518, $G_{m2}$ represents the transconductance of the voltage-to-current converter 1514, and $I_{th}$ represents the current signal 1516. In another example, if $$V_{th} = \frac{V_{OVP}}{K} \quad \text{(Equation 59)}$$

then $$I_{th} = \frac{V_{OVP}}{K} \times G_{m2} \quad \text{(Equation 60)}$$

where $V_{OVP}$ represents an overvoltage-protection threshold for the output voltage 1160, and K represents the constant coefficient that appears in Equation 54.

In yet another embodiment, if the transconductance of the voltage-to-current converter 1510 is equal to the transconductance of the voltage-to-current converter 1514, the following equations are obtained.

$$I_s = \frac{V_{in}}{K} \times G_{me} \quad \text{(Equation 61)}$$

$$I_{th} = \frac{V_{OVP}}{K} \times G_{me} \quad \text{(Equation 60)}$$

where $G_{me}$ represents the transconductance of the voltage-to-current converter 1510 and also represents the transconductance of the voltage-to-current converter 1514.

Referring to FIG. 11, based on Equation 43, the following is obtained according to certain embodiments.

$$\frac{V_{in}}{K} \times T_{on} = \frac{V_o}{K} \times T_{demag} \quad \text{(Equation 63)}$$

where K represents the constant coefficient that appears in Equation 54. Additionally, $T_{on}$ represents the on-time period of the drive signal 1156 (e.g., the turn-on period of the switch 1140), and $T_{demag}$ represents the demagnetization period of the inductive winding 1142.

For example, if $$V_o > V_{OVP} \quad \text{(Equation 64)}$$

then Equation 63 becomes $$\frac{V_{in}}{K} \times T_{on} > \frac{V_{OVP}}{K} \times T_{demag} \quad \text{(Equation 65)}$$

In another example, based on Equations 61 and 62, Equation 65 becomes $$I_s \times T_{on} - I_{th} \times T_{demag} > 0 \quad \text{(Equation 66)}$$

where $I_s$ represents the current signal 1512, and $I_{th}$ represents the current signal 1516. Additionally, $T_{on}$ represents the on-time period of the drive signal 1156 (e.g., the turn-on period of the switch 1140), and $T_{demag}$ represents the demagnetization period of the inductive winding 1142.

As shown in FIG. 15, according to some embodiments, if $I_s \times T_{on} - I_{th} \times T_{demag} > 0$ (e.g., as shown by Equation 66), the overvoltage protection (OVP) is triggered and the power conversion system 1100 is shut down. In yet another embodiment, if $I_s \times T_{on} - I_{th} \times T_{demag} < 0$, the overvoltage protection (OVP) is not triggered, and the switch 1140 is turned on and off by the drive signal 1156, which changes between a logic high level and a logic low level.

In one embodiment, the voltage-to-current converter 1510 outputs the current signal 1512 (e.g., $I_s$), and the voltage-to-current converter 1514 outputs the current signal 1516 (e.g., $I_{th}$). For example, the current signals 1512 and 1516 are received by the current generator 1520, which also receives the demagnetization signal 1212 and the pulse-width-modulation (PWM) signal 1242 and generates a current 1522 (e.g., $I_c$). In another example, the current 1522 is used to charge the capacitor 1530 if the current 1522 flows from the current generator 1520 to the capacitor 1530, and to discharge the capacitor 1530 if the current 1522 flows from the capacitor 1530 to the current generator 1520.

In another embodiment, during the on-time period of the drive signal 1156 (e.g., $T_{on}$), the current 1522 is generated to flow from the current generator 1520 to the capacitor 1530 and charge the capacitor 1530. For example, the current 1522 is determined in magnitude as follows:

$$I_{c1} = I_s \qquad \text{(Equation 67)}$$

where $I_{c1}$ represents the current 1522 during the on-time period of the drive signal 1156 (e.g., $T_{on}$), and $I_s$ represents the current signal 1512. In another example, during the on-time period of the drive signal 1156, the current 1522 charges the capacitor 1530, and a capacitor voltage 1532 (e.g., $V_c$) of the capacitor 1530 increases by the following magnitude:

$$\Delta V_{c1} = I_s \times T_{on} \times C \qquad \text{(Equation 68)}$$

where $\Delta V_{c1}$ represents an increase of the capacitor voltage 1532, and $C$ represents the capacitance of the capacitor 1530.

In yet another embodiment, during the demagnetization period of the inductive winding 1142 (e.g., $T_{demag}$), the current 1522 is generated to flow from the capacitor 1530 to the current generator 1520 and discharge the capacitor 1530. For example, the current 1522 is determined in magnitude as follows:

$$I_{c2} = I_{th} \qquad \text{(Equation 69)}$$

where $I_{c2}$ represents the current 1522 during the demagnetization period of the inductive winding 1142 (e.g., $T_{demag}$), and $I_{th}$ represents the current signal 1516. In another example, during the demagnetization period of the inductive winding 1142 (e.g., $T_{demag}$), the current 1522 discharges the capacitor 1530, and the capacitor voltage 1532 (e.g., $V_c$) of the capacitor 1530 decreases by the following magnitude:

$$\Delta V_{c2} = I_{th} \times T_{demag} \times C \qquad \text{(Equation 70)}$$

where $\Delta V_{c2}$ represents a decrease of the capacitor voltage 1532, and $C$ represents the capacitance of the capacitor 1530.

In yet another embodiment, from the beginning of the on-time period of the drive signal 1156 (e.g., $T_{on}$) to the end of the demagnetization period of the inductive winding 1142 (e.g., $T_{demag}$), the change of the capacitor voltage 1532 is determined based on Equations 68 and 70 as follows:

$$\Delta V_{cd} = \Delta V_{c1} - \Delta V_{c2} = I_s \times T_{on} \times C - I_{th} \times T_{demag} \times C \qquad \text{(Equation 71)}$$

where $\Delta V_{cd}$ represents the change of the capacitor voltage 1532 from the beginning of the on-time period of the drive signal 1156 to the end of the demagnetization period of the inductive winding 1142.

According to one embodiment, if $\Delta V_{cd}$ is larger than zero, the capacitor voltage 1532 increases from the beginning of the on-time period of the drive signal 1156 to the end of the demagnetization period of the inductive winding 1142. In another embodiment, if $\Delta V_{cd}$ is smaller than zero, the capacitor voltage 1532 decreases from the beginning of the on-time period of the drive signal 1156 to the end of the demagnetization period of the inductive winding 1142.

According to another embodiment, if the capacitor voltage 1532 increases from the beginning of the on-time period of the drive signal 1156 to the end of the demagnetization period of the inductive winding 1142 (e.g., $\Delta V_{cd} > 0$), based on Equation 71, Equation 66 is obtained as reproduced below.

$$I_s \times T_{on} - I_{th} \times T_{demag} > 0 \qquad \text{(Equation 72)}$$

For example, if the capacitor voltage 1532 increases from the beginning of the on-time period of the drive signal 1156 to the end of the demagnetization period of the inductive winding 1142 (e.g., $\Delta V_{cd} > 0$), the overvoltage protection (OVP) is triggered and the power conversion system 1100 is shut down. In another example, if the capacitor voltage 1532 decreases from the beginning of the on-time period of the drive signal 1156 to the end of the demagnetization period of the inductive winding 1142 (e.g., $\Delta V_{cd} < 0$), the overvoltage protection (OVP) is not triggered, and the switch 1140 is turned on and off by the drive signal 1156, which changes between a logic high level and a logic low level.

According to yet another embodiment, if the capacitor voltage 1532 increases from the beginning of the on-time period of the drive signal 1156 to the end of the demagnetization period of the inductive winding 1142 by a predetermined amount (e.g., $\Delta V_{cd} > V_{ref}$), the overvoltage protection (OVP) is triggered and the power conversion system 1100 is shut down, where $V_{ref}$ represents the predetermined amount. In another example, if the capacitor voltage 1532 does not increase from the beginning of the on-time period of the drive signal 1156 to the end of the demagnetization period of the inductive winding 1142 by the predetermined amount (e.g., $\Delta V_{cd} < V_{ref}$), the overvoltage protection (OVP) is not triggered, and the switch 1140 is turned on and off by the drive signal 1156, which changes between a logic high level and a logic low level. In yet another example, the predetermined amount (e.g., $V_{ref}$) is equal to or larger than the chip ground (e.g., being equal to or larger than zero volts).

In one embodiment, the capacitor voltage 1532 is set to the chip ground (e.g., zero volts) at the beginning of each switching period (e.g., at the beginning of each on-time period of the drive signal 1156), so that at the end of each corresponding demagnetization period of the inductive winding 1142, the capacitor voltage 1532 is equal to the change of the capacitor voltage 1532 from the beginning of the on-time period of the drive signal 1156 to the end of the demagnetization period of the inductive winding 1142, as follows:

$$V_{ce} = \Delta V_{cd} \qquad \text{(Equation 73)}$$

where $V_{ce}$ represents the capacitor voltage 1532 at the end of the demagnetization period of the inductive winding 1142, and $\Delta V_{cd}$ represents the change of the capacitor voltage 1532 from the beginning of the on-time period of the drive signal 1156 to the end of the demagnetization period of the inductive winding 1142. For example, if the capacitor voltage 1532 is set to the chip ground (e.g., zero volts) at the beginning of each switching period (e.g., at the beginning of each on-time period of the drive signal 1156), based on Equations 71 and 73, the following is obtained.

$$V_{ce} = I_s \times T_{on} \times C - I_{th} \times T_{demag} \times C \qquad \text{(Equation 74)}$$

where $V_{ce}$ represents the capacitor voltage 1532 at the end of a demagnetization period of the inductive winding 1142. Additionally, $I_s$ represents the current signal 1512, and $I_{th}$ represents the current signal 1516. Moreover, $T_{on}$ represents the on-time period of the drive signal 1156 (e.g., the turn-on period of the switch 1140), and $T_{demag}$ represents the demagnetization period of the inductive winding 1142. Also, C represents the capacitance of the capacitor 1530.

For example, if the capacitor voltage 1532 at the end of a demagnetization period of the inductive winding 1142 is larger than a predetermined amount (e.g., $V_{ce} > V_{ref}$), the overvoltage protection (OVP) is triggered and the power conversion system 1100 is shut down, where $V_{ref}$ represents the predetermined amount. In another example, if the capacitor voltage 1532 at the end of the demagnetization period of the inductive winding 1142 is smaller than the predetermined amount (e.g., $V_{ce} < V_{ref}$), the overvoltage protection (OVP) is not triggered, and the switch 1140 is turned on and off by the drive signal 1156, which changes between a logic high level and a logic low level. In yet another example, the predetermined amount (e.g., $V_{ref}$) is equal to or larger than the chip ground (e.g., being equal to or larger than zero volts).

In another embodiment, the AC-to-DC power conversion system 1100 operates in the quasi-resonance mode, under which, $$T_{demag} \cong T_{off} \qquad \text{(Equation 75)}$$

where $T_{off}$ represents the off-time period of the drive signal 1156 (e.g., the turn-off period of the switch 1140). For example, under the quasi-resonance mode, $$T_{switch} = T_{on} + T_{off} \cong T_{on} + T_{demag} \qquad \text{(Equation 76)}$$

where $T_{switch}$ represents the switching period of the drive signal 1156 (e.g., the switching period of the switch 1140). In another example, under the quasi-resonance mode, from the beginning of a switching period to the end of the switching period, the change of the capacitor voltage 1532 is determined based on Equation 71 as follows.

$$\Delta V_{cp} \cong \Delta V_{cd} = I_s \times T_{on} \times C - I_{th} \times T_{demag} \times C \qquad \text{(Equation 77)}$$

where $\Delta V_{cp}$ represents the change of the capacitor voltage 1532 from the beginning of a switching period to the end of the switching period.

In yet another embodiment, the capacitor voltage 1532 is set to the chip ground (e.g., zero volts) at the beginning of each switching period (e.g., at the beginning of each on-time period of the drive signal 1156), so that at the end of the switching period, the capacitor voltage 1532 is equal to change of the capacitor voltage 1532 from the beginning of the switching period to the end of the switching period, as follows:

$$V_{cs} = \Delta V_{cp} \qquad \text{(Equation 78)}$$

where $V_{cs}$ represents the capacitor voltage 1532 at the end of the switching period, and $\Delta V_{cp}$ represents the change of the capacitor voltage 1532 from the beginning of the switching period to the end of the switching period. For example, if the capacitor voltage 1532 is set to the chip ground (e.g., zero volts) at the beginning of each switching period (e.g., at the beginning of each on-time period of the drive signal 1156), based on Equations 77 and 78, the following is obtained.

$$V_{cs} \cong I_s \times T_{on} \times C - I_{th} \times T_{demag} \times C \qquad \text{(Equation 79)}$$

where $V_{cs}$ represents the capacitor voltage 1532 at the end of the switching period. Additionally, $I_s$ represents the current signal 1512, and $I_{th}$ represents the current signal 1516. Moreover, $T_{on}$ represents the on-time period of the drive signal 1156 (e.g., the turn-on period of the switch 1140), and $T_{demag}$ represents the demagnetization period of the inductive winding 1142. Also, C represents the capacitance of the capacitor 1530.

As shown in FIG. 15, the capacitor voltage 1532 of the capacitor 1530 is received by the controlled comparator 1590, which also receives a comparator threshold 1592 (e.g., $V_{ref}$) and the demagnetization signal 1212 according to some embodiments. For example, at the end of a demagnetization period of the inductive winding 1142 as indicated by the demagnetization signal 1212, the controlled comparator 1590 compares the capacitor voltage 1532 and the comparator threshold 1592, generates the signal 1222, and keeps the signal 1222 unchanged until at least the end of the next demagnetization period. In another example, at the end of a demagnetization period of the inductive winding 1142, if $V_{ce} > V_{ref}$, the controlled comparator 1590 generates the signal 1222 at the logic high level. In yet another example, at the end of a demagnetization period of the inductive winding 1142, if $V_{ce} < V_{ref}$, the controlled comparator 1590 generates the signal 1222 at the logic low level. In yet another example, the comparator threshold 1592 (e.g., $V_{ref}$) is equal to or larger than the chip ground (e.g., being equal to or larger than zero volts).

As shown in FIG. 12, the signal 1222 is received by the logic controller 1240 according to certain embodiments. For example, if $V_{ce} > V_{ref}$ (e.g., if the signal 1222 is at the logic high level), the overvoltage protection (OVP) is triggered, and the power conversion system 1100 is shut down. In another example, if $V_{ce} < V_{ref}$ (e.g., if the signal 1222 is at the logic low level), the overvoltage protection (OVP) is not triggered, and the switch 1140 is turned on and off by the drive signal 1156 that changes between a logic high level and a logic low level. In yet another example, $V_{ref}$ is equal to or larger than the chip ground (e.g., being equal to or larger than zero volts).

Figure 16:
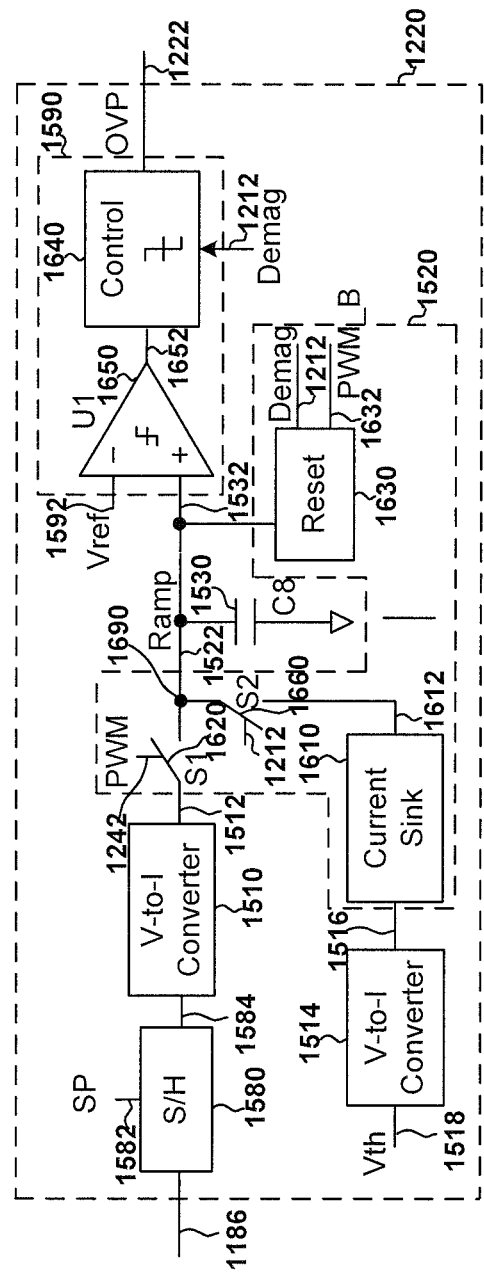
FIG. 16 is a simplified diagram showing the overvoltage-protection (OVP) detector of the pulse-width-modulation (PWM) controller as part of the AC-to-DC power conversion system as shown in FIG. 11 according to yet another embodiment of the present invention.

FIG. 16 is a simplified diagram showing the overvoltage-protection (OVP) detector 1220 of the pulse-width-modulation (PWM) controller 1120 as part of the AC-to-DC power conversion system 1100 according to yet another embodiment of the present invention. This diagram is merely an example, which should not unduly limit the scope of the claims. One of ordinary skill in the art would recognize many variations, alternatives, and modifications. The overvoltage-protection (OVP) detector 1220 includes the sample-and-hold component 1580, the voltage-to-current converters 1510 and 1514, the capacitor 1530, a current sink 1610, switches 1620 and 1660, a reset component 1630 (e.g., a reset circuit), a control component 1640 (e.g., an edge-triggered latch), and a comparator 1650. For example, referring to FIG. 15, the current generator 1520 includes the current sink 1610, the switches 1620 and 1660, and the reset component 1630. In another example, referring to FIG. 15, the controlled comparator 1590 includes the control component 1640 and the comparator 1650. In yet another example, the edge-triggered latch 1640 includes a flip-flop.

In one embodiment, the sample-and-hold component 1580 receives the voltage signal 1186 and the control signal 1582. For example, in response to the control signal 1582, the sample-and-hold component 1580 samples the voltage signal 1186 during the demagnetization period, holds the sampled voltage signal 1186, and outputs the sampled and held voltage signal 1186 as the voltage signal 1584. In another example, the voltage signal 1584 is received by the voltage-to-current converter 1510, which generates the current signal 1512.

As shown in FIG. 16, the voltage-to-current converter 1510 is coupled to the switch 1620 according to some embodiments. For example, the switch 1620 receives the pulse-width-modulation (PWM) signal 1242, which closes the switch 1620 during the on-time period of the drive signal 1156 (e.g., the turn-on period of the switch 1140) and opens the switch 1620 during the off-time period of the drive signal 1156 (e.g., the turn-off period of the switch 1140). In another example, during the on-time period of the drive signal 1156 (e.g., the turn-on period of the switch 1140), the switch 1620 is closed and the current signal 1512 flows out of the voltage-to-current converter 1510 through the switch 1620 to a node 1690. In yet another example, during the off-time period of the drive signal 1156 (e.g., the turn-off period of the switch 1140), the switch 1620 is opened, and the current signal 1512 does not flow between the voltage-to-current converter 1510 and the node 1690 through the switch 1620.

In another embodiment, the voltage-to-current converter 1514 receives the threshold voltage 1518 (e.g., $V_{th}$) and generates the current signal 1516. For example, the current signal 1516 is received by the current sink 1610, which in response generates a current signal 1612. In another example, the current signal 1612 is equal to the current signal 816 in magnitude. In yet another embodiment, the current sink 1610 is coupled to the switch 1660. For example, the switch 1660 receives the demagnetization signal 1212, which closes the switch 1620 during the demagnetization period of the inductive winding 1142 and opens the switch 1620 during outside of any demagnetization period of the inductive winding 1142 (e.g., during the on-time period of the drive signal 1156). In another example, during the demagnetization period of the inductive winding 1142, the switch 1620 is closed and the current signal 1612 flows from the node 1690 to the current sink 1610 through the switch 1660. In yet another example, during outside of any demagnetization period of the inductive winding 1142 (e.g., during the on-time period of the drive signal 1156), the switch 1660 is opened, and the current signal 1612 does not flow between the current sink 1610 and the node 1690 through the switch 1660.

As shown in FIG. 16, the reset component 1630 receives the demagnetization signal 1212 and a control signal 1632 according to certain embodiments. For example, the control signal 1632 is a complementary signal of the pulse-width-modulation (PWM) signal 1242, so that the control signal 1632 is at the logic low level if the PWM signal 1242 is at the logic high level, and the control signal 1632 is at the logic high level if the PWM signal 1242 is at the logic low level. In another example, the control signal 1632 is at the logic low level during the on-time period of the drive signal 1156 (e.g., the turn-on period of the switch 1140), and the control signal 1632 is at the logic high level during the off-time period of the drive signal 1156 (e.g., the turn-off period of the switch 1140). In yet another example, the demagnetization signal 1212 is the logic high level during a demagnetization period of the inductive winding 1142 and is at the logic low level during outside of any demagnetization period of the inductive winding 1142.

According to one embodiment, at the end of a demagnetization period of the inductive winding 1142 (e.g., at a falling edge of the demagnetization signal 1212 from the logic high level to the logic low level), the reset component 1630 resets the capacitor voltage 1532 to the chip ground (e.g., zero volts), and keeps the capacitor voltage 1532 at the chip ground (e.g., zero volts) until the end of the off-time period of the drive signal 1156 (e.g., at a falling edge of the control signal 1632 from the logic high level to the logic low level), which is also the beginning of the next switching period. For example, at the beginning of each switching period, the capacitor voltage 1532 is set to the chip ground (e.g., zero volts). In another example, under the quasi-resonance mode, the time duration between the end of the demagnetization period of the inductive winding 1142 and the end of the corresponding off-time period of the drive signal 1156 is approximately equal to zero.

According to another embodiment, the capacitor voltage 1532 is set to the chip ground (e.g., zero volts) at the beginning of each switching period (e.g., at the beginning of each on-time period of the drive signal 1156). In one embodiment, during the on-time period of the drive signal 1156, the current signal 1512 flows out of the voltage-to-current converter 1510 through the switch 1620 to the node 1690. For example, at the end of the on-time period of the drive signal 1156, the capacitor voltage 1532 is determined as follows.

$$V_{co} = I_s \times T_{on} \times C \quad \text{(Equation 80)}$$

where $V_{co}$ represents the capacitor voltage 1532 at the end of each on-time period of the drive signal 1156. Additionally, $I_s$ represents the current signal 1512, and $T_{on}$ represents the on-time period of the drive signal 1156 (e.g., the turn-on period of the switch 1140). Moreover, C represents the capacitance of the capacitor 1530.

In another embodiment, after the on-time period of the drive signal 1156, during the demagnetization period of the inductive winding 1142, the current signal 1612 that is equal to the current signal 1516 in magnitude flows from the node 1690 to the current sink 1610 through the switch 1660. For example, at the end of the demagnetization period of the inductive winding 1142, which is approximately equal to the off-time period of the drive signal 1156 under the quasi-resonance mode, the capacitor voltage 1532 is determined as follows.

$$V_{ce} = I_s \times T_{on} \times C - I_{th} \times T_{demag} \times C \quad \text{(Equation 81)}$$

where $V_{ce}$ represents the capacitor voltage 1532 at the end of a demagnetization period of the inductive winding 1142. Additionally, $I_s$ represents the current signal 1512, and $I_{th}$ represents the current signal 1516 and the current signal 1612. Moreover, $T_{on}$ represents the on-time period of the drive signal 1156 (e.g., the turn-on period of the switch 1140), and $T_{demag}$ represents the demagnetization period of the inductive winding 1142. Also, C represents the capacitance of the capacitor 1530. In another example, Equation 81 is the same as Equation 74.

As shown in FIG. 16, the capacitor voltage 1532 of the capacitor 1530 is received by the comparator 1650, which also receives the comparator threshold 1592 (e.g., $V_{th}$) according to some embodiments. For example, the comparator 1650 compares the capacitor voltage 1532 (e.g., the capacitor voltage 1532 at the end of a demagnetization period of the inductive winding 1142) and the comparator threshold 1592, and generate a comparison signal 1652, wherein the capacitor voltage 1532 is represented by $V_c$ and the comparator threshold 1592 is represented by $V_{ref}$. In another example, if $V_c > V_{ref}$, the comparator 1650 generates the comparison signal 1652 at the logic high level. In yet another example, if $V_c < V_{ref}$, the comparator 1650 generates the comparison signal 1652 at the logic low level.

According to one embodiment, the comparison signal 1652 is received by the control component 1640. For example, the control component 1640 also receives the demagnetization signal 1212. In another example, in response to the demagnetization signal 1212 indicating the end of a demagnetization period (e.g., the demagnetization signal 1212 changing from the logic high level to the logic low level), the control component 1640 generates the signal 1222 that is the same as the comparison signal 1652 at the end of the demagnetization period, and then keeps the signal 1222 unchanged until at least the end of the next demagnetization period. In yet another example, at the end of the demagnetization period, if $V_{ce} > V_{ref}$, the comparator 1650 generates the comparison signal 1652 at the logic high level, and in response, the control component 1640 generates the signal 1222 also at the logic high level. In yet another example, at the end of the demagnetization period, if $V_{ce} < V_{ref}$, the comparator 1650 generates the comparison signal 1652 at the logic low level, and in response, the control component 1640 generates the signal 1222 also at the logic low level.

As shown in FIG. 12, the signal 1222 is received by the logic controller 1240 according to certain embodiments. For example, if $V_{ce} > V_{ref}$ (e.g., if the signal 1222 is at the logic high level), the overvoltage protection (OVP) is triggered, and the power conversion system 1100 is shut down. In another example, if $V_{ce} < V_{ref}$ (e.g., if the signal 1222 is at the logic low level), the overvoltage protection (OVP) is not triggered, and the switch 1140 is turned on and off by the drive signal 1156 that changes between a logic high level and a logic low level.

Figure 17:
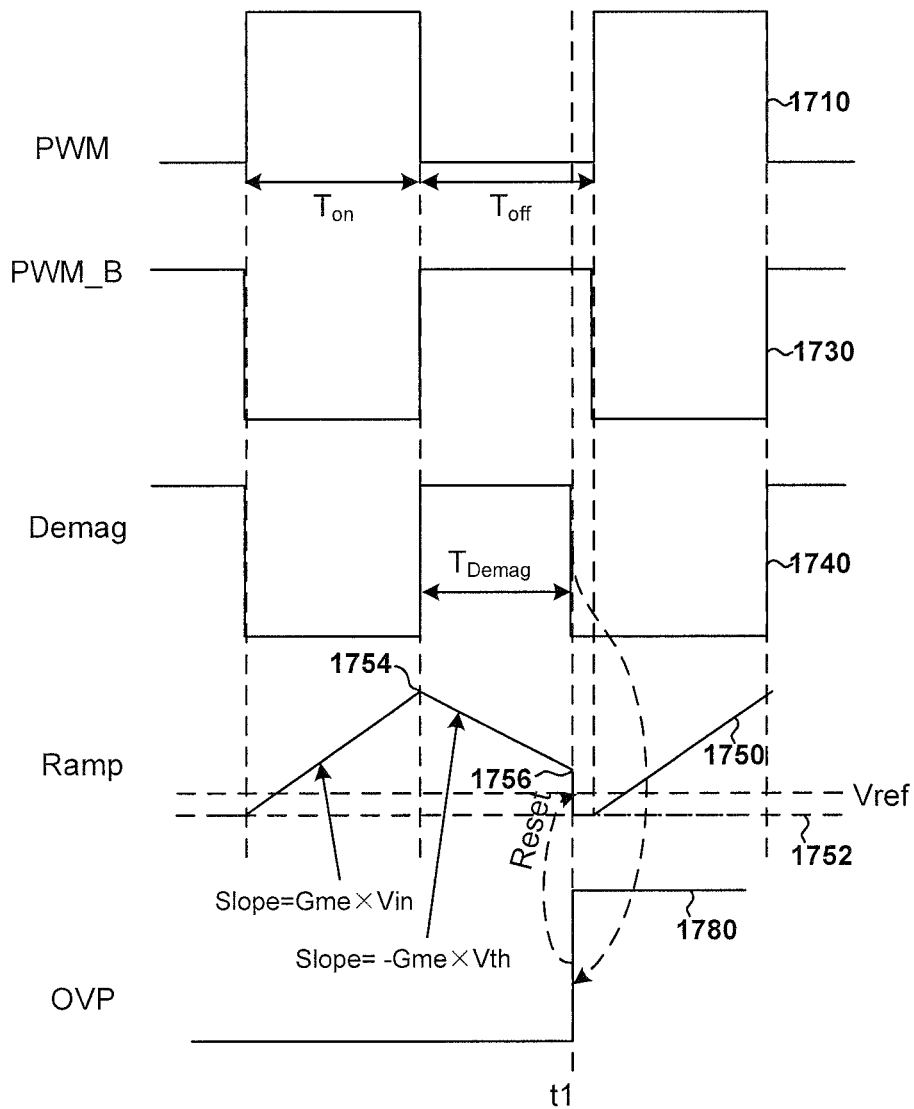
FIG. 17 is a simplified timing diagram for the overvoltage-protection (OVP) detector as shown in FIG. 15 and/or FIG. 16 as part of the AC-to-DC power conversion system as shown in FIG. 11 according to certain embodiments of the present invention.

FIG. 17 is a simplified timing diagram for the overvoltage-protection (OVP) detector 1220 as shown in FIG. 15 and/or FIG. 16 as part of the AC-to-DC power conversion system 1100 according to certain embodiments of the present invention. This diagram is merely an example, which should not unduly limit the scope of the claims. One of ordinary skill in the art would recognize many variations, alternatives, and modifications.

For example, the waveform 1710 represents the pulse-width-modulation (PWM) signal 1242 as a function of time, the waveform 1730 represents the control signal 1632 as a function of time, and the waveform 1740 represents the demagnetization signal 1212 as a function of time. Additionally, the waveform 1750 represents the capacitor voltage 1532, and the waveform 1780 represents the signal 1222 as a function of time.

In one embodiment, as shown by the waveform 1710, the pulse-width-modulation (PWM) signal 1242 is at a logic high level during a turn-on period (e.g., an on-time period $T_{on}$), and is at a logic low level during a turn-off period (e.g., an off-time period $T_{off}$). For example, the time duration of a switching cycle (e.g., $T_{switch}$) is equal to a sum of the turn-on period and the turn-off period. In another example, during the turn-on period, the switch 1140 is closed (e.g., turned on). In yet another example, during the turn-off period, the switch 1140 is open (e.g., turned off).

In another embodiment, as shown by the waveform 1730, the control signal 1632 is a complementary signal of the pulse-width-modulation (PWM) signal 1242 (e.g., as shown by the waveform 1710). For example, the control signal 1632 is at the logic low level if the PWM signal 1242 is at the logic high level, and the control signal 1632 is at the logic high level if the PWM signal 1242 is at the logic low level. In another example, the control signal 1632 is at the logic low level during the turn-on period (e.g., the on-time period of the drive signal 1156), and the control signal 1632 is at the logic high level during the turn-off period (e.g., the off-time period of the drive signal 1156). In yet another embodiment, as shown by the waveform 1740, the demagnetization signal 1212 is at the logic high level during a demagnetization period of the inductive winding 1142 and is at the logic low level during outside of any demagnetization period of the inductive winding 1142.

In yet another embodiment, as shown by the waveform 1750, at the beginning of a switching period (e.g., at the beginning of an on-time period of the drive signal 1156), the capacitor voltage 1532 is set to the chip ground that is equal to a magnitude 1752 (e.g., zero volts). For example, during the on-time period of the drive signal 1156, the capacitor voltage 1532 increases (e.g., increases linearly) from the magnitude 1752 to a magnitude 1754. In another example, during the demagnetization period, the capacitor voltage 1532 decreases (e.g., decreases linearly) from the magnitude 1754 to a magnitude 1756. In yet another example, at the end of the demagnetization period (e.g., at a falling edge of the demagnetization signal 1212 from the logic high level to the logic low level as shown by the waveform 1740), the capacitor voltage 1532 is reset by the reset component 1630 from the magnitude 1756 to the magnitude 1752 (e.g., the chip ground). In yet another example, the reset component 1630 keeps the capacitor voltage 1532 at the magnitude 1752 from the end of the demagnetization period to the end of the off-time period of the drive signal 1156 (e.g., at a falling edge of the control signal 1632 from the logic high level to the logic low level as shown by the waveform 1730). In yet another example, the end of the off-time period of the drive signal 1156 is also the beginning of the next switching period.

In yet another embodiment, as shown by the waveform 1780, the signal 1222 is at the logic low level before time $t_1$, where the time $t_1$ corresponds to the end of a demagnetization period. For example, before the time $t_1$, the overvoltage protection (OVP) is not triggered, and the switch 1140 is turned on and off by the drive signal 1156 that changes between a logic high level and a logic low level. In another example, at the time $t_1$, the demagnetization signal 1212 changes from the logic high level to the logic low level as shown by the waveform 1740. In yet another example, at the time $t_1$, the magnitude 1756 of the capacitor voltage 1532 is larger than the comparator threshold 1592 (e.g., $V_{ref}$) as shown by the waveform 1750, and in response, the signal 1222 changes from the logic low level to the logic high level. In yet another example, in response to the signal 1222 changing from the logic low level to the logic high level at the time $t_1$, the overvoltage protection (OVP) is triggered and the power conversion system 1100 is shut down.

Figure 18:
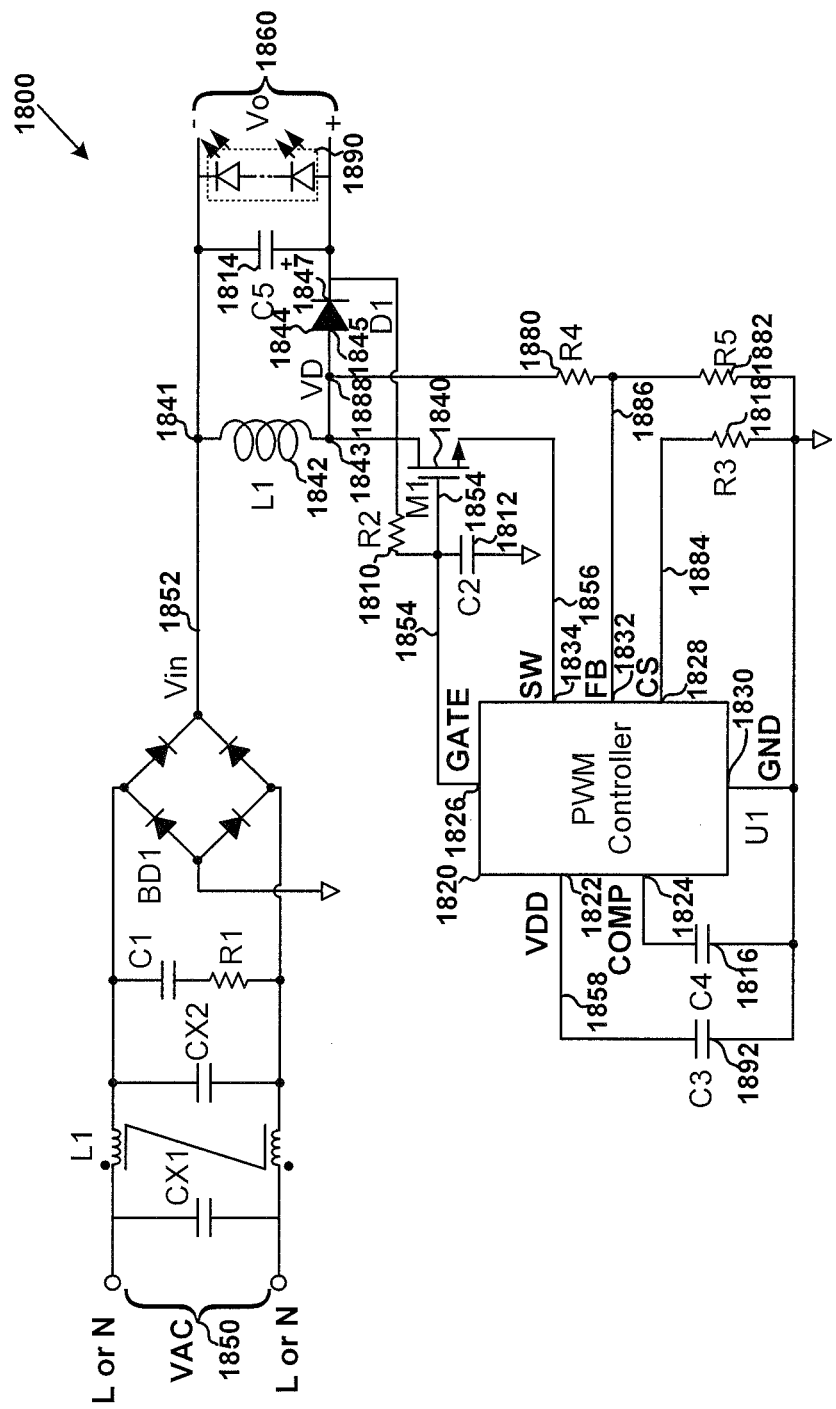
FIG. 18 is a simplified diagram showing an AC-to-DC power conversion system with primary-side regulation (PSR) and buck-boost mechanism for LED lighting according to yet another embodiment of the present invention.
Figure 19:
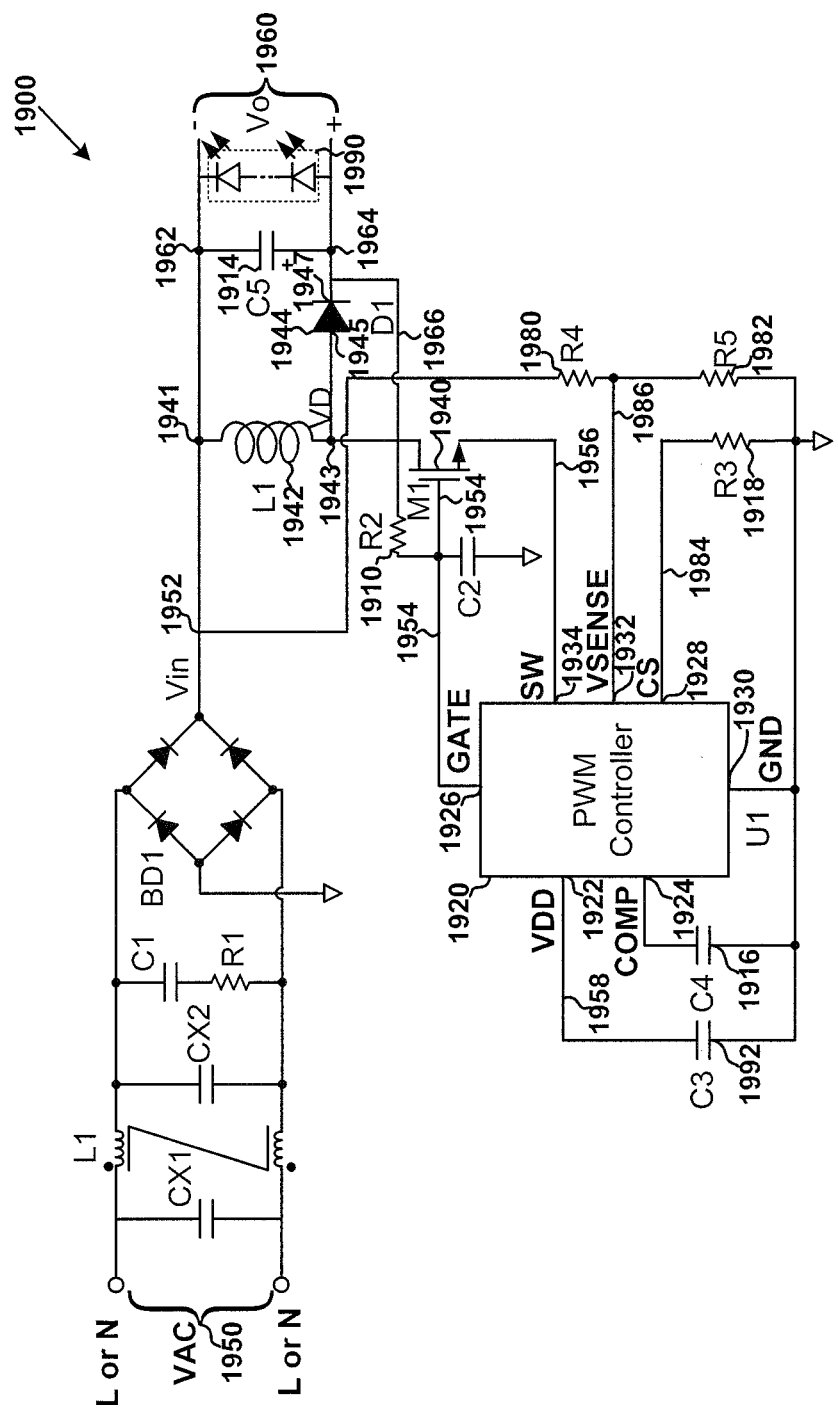
FIG. 19 is a simplified diagram showing an AC-to-DC power conversion system with primary-side regulation (PSR) and buck-boost mechanism for LED lighting according to yet another embodiment of the present invention.

As shown above and further emphasized here, FIG. 2 and FIG. 11 are merely examples, which should not unduly limit the scope of the claims. One of ordinary skill in the art would recognize many variations, alternatives, and modifications. For example, the overvoltage-protection (OVP) detector 320 (e.g., as shown in FIG. 3, FIG. 4, FIG. 5, FIG. 6, FIG. 8, and/or FIG. 9) is used in an AC-to-DC power conversion system as shown in FIG. 18. In another example, the overvoltage-protection (OVP) detector 1220 (e.g., as shown in FIG. 13, FIG. 14, FIG. 15, and FIG. 16) is used in an AC-to-DC power conversion system as shown in FIG. 19.

FIG. 18 is a simplified diagram showing an AC-to-DC power conversion system with primary-side regulation (PSR) and buck-boost mechanism for LED lighting according to yet another embodiment of the present invention. This diagram is merely an example, which should not unduly limit the scope of the claims. One of ordinary skill in the art would recognize many variations, alternatives, and modifications. The AC-to-DC power conversion system 1800 (e.g., a power converter) includes resistors 1810, 1818, 1880 and 1882, capacitors 1812, 1814, 1816, and 1892, a pulse-width-modulation (PWM) controller 1820, a switch 1840, an inductive winding 1842, and a diode 1844. For example, the AC-to-DC power conversion system 1800 includes only one inductive winding (e.g., the inductive winding 1842). In another example, the pulse-width-modulation (PWM) controller 1820 includes a terminal 1822 (e.g., pin VDD), a terminal 1824 (e.g., pin COMP), a terminal 1826 (e.g., pin GATE), a terminal 1828 (e.g., pin CS), a terminal 1830 (e.g., pin GND), a terminal 1832 (e.g., pin FB), and a terminal 1834 (e.g., pin SW). In yet another example, the pulse-width-modulation (PWM) controller 1820 further includes an overvoltage-protection (OVP) detector that is substantially similar to the overvoltage-protection (OVP) detector 320 (e.g., as shown in FIG. 4, FIG. 5, FIG. 6, FIG. 8, and/or FIG. 9).

As shown in FIG. 18, an AC input voltage 1850 (e.g., VAC) is received and rectified (e.g., with full-wave rectification) to generate a rectified voltage 1852 (e.g., $V_{in}$) according to one embodiment. For example, the rectified voltage 1852 does not fall below the chip ground (e.g., zero volts). In another example, the rectified voltage 1852 charges the capacitor 1812 (e.g., C2) through the inductive winding 1842, the diode 1844, and the resistor 1810 (e.g., R2) in order to increase a voltage 1854 in magnitude.

According to another embodiment, the voltage 1854 is received by the switch 1840 (e.g., by the gate of the transistor 1840), and by the PWM controller 1820 (e.g., by the terminal 1826 of the PWM controller 1820). For example, the voltage 1854 increases so that the switch 1840 is closed (e.g., the transistor 1840 is turned on). In another example, if the switch 1840 is closed (e.g., the transistor 1840 is turned on), a voltage 1858 of the terminal 1822 is raised through the switch 1840 and the internal circuit of the PWM controller 1820. According to yet another embodiment, if the voltage 1858 of the terminal 1822 becomes larger than an undervoltage-lockout (UVLO) threshold, the PWM controller 1820 starts the normal operation. For example, under normal operation, the PWM controller 1820 generates a drive signal 1856 with pulse-width modulation to perform the source switching to the switch 1840 (e.g., the transistor 1840). In yet another example, the resistor 1818 is used to sense the current flowing through the inductive winding 1842 and to generate the current-sensing voltage signal 1884.

According to yet another embodiment, the inductive winding 1842 includes winding terminals 1841 and 1843, and the diode 1844 includes diode terminals 1845 and 1847. For example, the winding terminal 1843 is biased at the voltage signal 1888 (e.g., VD) and is coupled to the diode terminal 1845. In another example, a voltage difference between the diode terminal 1847 and the winding terminal 1841 is equal to an output voltage 1860 (e.g., $V_o$) of the power converter 1800.

According to yet another embodiment, the power conversion system 1800 generates the output voltage 1860 (e.g., $V_o$). For example, the capacitor 1814 (e.g., C5) is used to support the output voltage 1860 (e.g., $V_o$) of the power conversion system 1800. In yet another example, the power conversion system 1800 provides a constant output current to one or more light emitting diodes (LEDs) 1890. As shown in FIG. 18, the resistor 1880 (e.g., R4) receives a voltage signal 1888 (e.g., VD), and in response, the resistor 1880 (e.g., R4) and the resistor 1882 (e.g., R5) generate a voltage signal 1886, which is received by the PWM controller 1820 through the terminal 1832, according to certain embodiments. For example, the voltage signal 1886 is received by the overvoltage-protection (OVP) detector of the pulse-width-modulation (PWM) controller 1820, and the overvoltage-protection (OVP) detector is substantially similar to the overvoltage-protection (OVP) detector 320 (e.g., as shown in FIG. 4, FIG. 5, FIG. 6, FIG. 8, and/or FIG. 9).

FIG. 19 is a simplified diagram showing an AC-to-DC power conversion system with primary-side regulation (PSR) and buck-boost mechanism for LED lighting according to yet another embodiment of the present invention. This diagram is merely an example, which should not unduly limit the scope of the claims. One of ordinary skill in the art would recognize many variations, alternatives, and modifications. The AC-to-DC power conversion system 1900 (e.g., a power converter) includes resistors 1910, 1918, 1980 and 1982, capacitors 1912, 1914, 1916, and 1992, a pulse-width-modulation (PWM) controller 1920, a switch 1940, an inductive winding 1942, and a diode 1944. For example, the AC-to-DC power conversion system 1900 includes only one inductive winding (e.g., the inductive winding 1942). In another example, the pulse-width-modulation (PWM) controller 1920 includes a terminal 1922 (e.g., pin VDD), a terminal 1924 (e.g., pin COMP), a terminal 1926 (e.g., pin GATE), a terminal 1928 (e.g., pin CS), a terminal 1930 (e.g., pin GND), a terminal 1932 (e.g., pin Vsense), and a terminal 1934 (e.g., pin SW). In yet another example, the pulse-width-modulation (PWM) controller 1920 further includes an overvoltage-protection (OVP) detector that is substantially similar to the overvoltage-protection (OVP) detector 1220 (e.g., as shown in FIG. 13, FIG. 14, FIG. 15, and FIG. 16).

As shown in FIG. 19, an AC input voltage 1950 (e.g., VAC) is received and rectified (e.g., with full-wave rectification) to generate a rectified voltage 1952 (e.g., $V_{in}$) according to one embodiment. For example, the rectified voltage 1952 does not fall below the chip ground (e.g., zero volts). In another example, the rectified voltage 1952 charges the capacitor 1912 (e.g., C2) through the inductive winding 1942, the diode 1944, and the resistor 1910 (e.g., R2) in order to increase a voltage 1954 in magnitude.

According to another embodiment, the voltage 1954 is received by the switch 1940 (e.g., by the gate of the transistor 1940), and by the PWM controller 1920 (e.g., by the terminal 1926 of the PWM controller 1920). For example, the voltage 1954 increases so that the switch 1940 is closed (e.g., the transistor 1940 is turned on). In another example, if the switch 1940 is closed (e.g., the transistor 1940 is turned on), a voltage 1958 of the terminal 1922 is raised through the switch 1940 and the internal circuit of the PWM controller 1920. According to yet another embodiment, if the voltage 1958 of the terminal 1922 becomes larger than an undervoltage-lockout (UVLO) threshold, the PWM controller 1920 starts the normal operation. For example, under normal operation, the PWM controller 1920 generates a drive signal 1956 with pulse-width modulation to perform the source switching to the switch 1940 (e.g., the transistor 1940). In yet another example, the resistor 1918 is used to sense the current flowing through the inductive winding 1942 and to generate the current-sensing voltage signal 1984.

According to yet another embodiment, the inductive winding 1942 includes winding terminals 1941 and 1943, and the diode 1944 includes diode terminals 1945 and 1947.

For example, the winding terminal 1941 is biased at the rectified voltage 1952 (e.g., $V_{in}$). In another example, the winding terminal 1943 is coupled to the diode terminal 1945. In yet another example, a voltage difference between the diode terminal 1947 and the winding terminal 1941 is equal to an output voltage 1960 (e.g., $V_o$) of the power converter 1900.

According to yet another embodiment, the power conversion system 1900 generates an output voltage 1960 (e.g., $V_o$). For example, the capacitor 1914 (e.g., C5) is used to support the output voltage 1960 (e.g., $V_o$) of the power conversion system 1900. In yet another example, the power conversion system 1900 provides a constant output current to one or more light emitting diodes (LEDs) 1990. As shown in FIG. 19, the resistor 1980 (e.g., R4) receives the rectified voltage 1952, and in response, the resistor 1980 (e.g., R4) and the resistor 1982 (e.g., R5) generate a voltage signal 1986, which is received by the PWM controller 1920 through the terminal 1932, according to certain embodiments. For example, the voltage signal 1986 is received by the overvoltage-protection (OVP) detector of the pulse-width-modulation (PWM) controller 1920, and the overvoltage-protection (OVP) detector is substantially similar to the overvoltage-protection (OVP) detector 1220 (e.g., as shown in FIG. 13, FIG. 14, FIG. 15, and FIG. 16).

According to some embodiments, an overvoltage-protection (OVP) detector of the pulse-width-modulation (PWM) controller as part of an AC-to-DC power conversion system is provided. For example, the overvoltage-protection (OVP) detector of the pulse-width-modulation (PWM) controller is applicable to various configurations of the AC-to-DC power conversion system. In another example, the overvoltage-protection (OVP) detector of the pulse-width-modulation (PWM) controller can reliably perform the overvoltage protection, even though the overvoltage-protection (OVP) detector does not directly detect the magnitude of the output voltage. In yet another example, in response to detecting the overvoltage occurrence, the overvoltage-protection (OVP) detector reduces the output voltage in magnitude and protects the output capacitor (e.g., the capacitor 214 and/or the capacitor 1114). In yet another example, the overvoltage-protection (OVP) detector of the pulse-width-modulation (PWM) controller can simplify structure of the AC-to-DC power conversion system with primary-side regulation (PSR) and buck-boost mechanism.

According to another embodiment, a system controller (e.g., the system controller 220) for a power converter (e.g., the power converter 200) includes a logic controller (e.g., the logic controller 340) configured to generate a modulation signal (e.g., the signal 342), and a driver (e.g., the driver 350) configured to receive the modulation signal, generate a drive signal (e.g., the signal 256) based at least in part on the modulation signal, and output the drive signal to a switch (e.g., the switch 240) to affect a current flowing through an inductive winding (e.g., the winding 242) for a power converter (e.g., the power converter 200). Additionally, the system controller (e.g., the system controller 220) includes a voltage-to-voltage converter (e.g., the converter 410 and/or the converter 510) configured to receive a first voltage signal (e.g., the signal 484 and/or the signal 584), the modulation signal (e.g., the signal 342), and a demagnetization signal (e.g., the signal 312), and to generate a second voltage signal (e.g., the signal 412 and/or the signal 512) based at least in part on the first voltage signal, the modulation signal, and the demagnetization signal. Moreover, the system controller (e.g., the system controller 220) includes a comparator (e.g., the comparator 430 and/or the comparator 590) configured to receive a first threshold signal (e.g., the signal 432 and/or the signal 592), generate a comparison signal (e.g., the signal 322) based on at least information associated with the second voltage signal and the first threshold signal, and output the comparison signal to the logic controller. The modulation signal indicates an on-time period for the switch, and the demagnetization signal indicates a demagnetization period for the inductive winding. The second voltage signal is approximately equal to the first voltage signal multiplied by a ratio of the on-time period to a sum of the on-time period and the demagnetization period in magnitude (e.g., as shown by Equation 8). For example, the system controller is implemented according to at least FIG. 2, FIG. 3, FIG. 4, and/or FIG. 5.

In another example, the second voltage signal is equal to the first voltage signal multiplied by the ratio of the on-time period to the sum of the on-time period and the demagnetization period in magnitude (e.g., as shown by Equation 8). In yet another example, the comparison signal indicates whether an overvoltage protection is triggered, and the logic controller (e.g., the controller 340) is configured to, in response to the comparison signal indicating the overvoltage protection is triggered, cause the power converter to shut down.

In yet another example, the system controller further includes a low-pass filter (e.g., the filter 420 and/or the filter 520) configured to receive the second voltage signal and generate a third voltage signal (e.g., the signal 422 and/or the signal 522) based at least in part on the second voltage signal. The comparator (e.g., the comparator 430 and/or the comparator 590) is further configured to generate the comparison signal (e.g., the signal 322) based on at least information associated with the third voltage signal and the first threshold signal. In yet another example, the comparator (e.g., the comparator 430) is further configured to receive the third voltage signal and generate the comparison signal (e.g., the signal 322) based at least in part on the third voltage signal and the first threshold signal. In yet another example, the system controller further includes an average-determination circuit (e.g., the average-determination circuit 530) configured to receive the third voltage signal and a second threshold signal (e.g., the signal 532) and generate a fourth voltage signal (e.g., the signal 534) based at least in part on the third voltage signal and the second threshold signal.

In yet another example, the average-determination circuit (e.g., the average-determination circuit 530) is further configured to compare the third voltage signal and the second threshold signal in magnitude, in response to the third voltage signal being larger than the second threshold signal in magnitude, increase the fourth voltage signal (e.g., the signal 534) in magnitude (e.g., as shown in FIG. 7), and in response to the third voltage signal being smaller than the second threshold signal in magnitude, decrease the fourth voltage signal (e.g., the signal 534) in magnitude (e.g., as shown in FIG. 7). In yet another example, the comparator (e.g., the comparator 590) is further configured to receive the fourth voltage signal and generate the comparison signal (e.g., the signal 322) based at least in part on the fourth voltage signal and the first threshold signal (e.g., the signal 592).

According to yet another embodiment, a system controller (e.g., the system controller 220) for a power converter (e.g., the power converter 200) includes a logic controller (e.g., the logic controller 340) configured to generate a modulation signal (e.g., the signal 342), and a driver (e.g., the driver 350) configured to receive the modulation signal, generate a drive signal (e.g., the signal 256) based at least in part on the modulation signal, and output the drive signal to a switch (e.g., the switch 240) to affect a current flowing through an inductive winding (e.g., the winding 242) of a power converter (e.g., the power converter 200). The inductive winding includes a first winding terminal and a second winding terminal. The second winding terminal is at a terminal voltage (e.g., the voltage 288) and coupled to a first diode terminal of a diode, and the diode further includes a second diode terminal. A voltage difference between the second diode terminal and the first winding terminal is, for example, an output voltage (e.g., the voltage 260) of the power converter (e.g., the power converter 200). Additionally, the system controller further includes an overvoltage-protection detector (e.g., the overvoltage-protection detector 320) configured to receive a feedback signal (e.g., the signal 286) and a demagnetization signal (e.g., the signal 312), generate a detection signal (e.g., the signal 322) based at least in part on the feedback signal and the demagnetization signal, and output the detection signal to the logic controller (e.g., the logic controller 340). The feedback signal is equal to the terminal voltage (e.g., the voltage 288) divided by a predetermined constant (e.g., as shown by Equation 2A and/or Equation 2B). The demagnetization signal indicates a demagnetization period for the inductive winding, and the detection signal indicates whether an overvoltage protection is triggered. The logic controller (e.g., the logic controller 340) is configured to, in response to the detection signal indicating the overvoltage protection is triggered, cause the power converter to shut down. For example, the system controller is implemented according to at least FIG. 2, FIG. 3, FIG. 4, FIG. 5, FIG. 8, and/or FIG. 18.

In another example, the overvoltage-protection detector (e.g., the overvoltage-protection detector 320) includes a sample-and-hold circuit (e.g., the sample-and-hold circuit 480 and/or the sample-and-hold circuit 580) configured to receive the feedback signal (e.g., the signal 286) and generate a sampled-and-held signal (e.g., the signal 484 and/or the signal 584) based at least in part on the feedback signal, a voltage-to-voltage converter (e.g., the voltage-to-voltage converter 410 and/or the voltage-to-voltage converter 510) configured to receive the sampled-and-held signal (e.g., the signal 484 and/or the signal 584) and the demagnetization signal (e.g., the signal 312) and generate a first voltage signal (e.g., the signal 412 and/or the signal 512) based at least in part on the sampled-and-held signal and the demagnetization signal, and a comparator (e.g., the comparator 430 and/or the comparator 590) configured to receive a first threshold signal (e.g., the signal 432 and/or the signal 592) and generate the detection signal (e.g., the signal 322) based on at least information associated with the first voltage signal and the first threshold signal. In yet another example, the first voltage signal is approximately equal to the output voltage of the power converter divided by the predetermined constant (e.g., as shown by Equation 10A). In yet another example, the overvoltage-protection detector (e.g., the overvoltage-protection detector 320) further includes a low-pass filter (e.g., the low-pass filter 420 and/or the low-pass filter 520) configured to receive the first voltage signal and generate a filtered signal (e.g., the signal 422 and/or the signal 522) based at least in part on the first voltage signal. The comparator (e.g., the comparator 430 and/or the comparator 590) is further configured to generate the detection signal (e.g., the signal 322) based on at least information associated with the filtered signal and the first threshold signal.

In yet another example, the comparator (e.g., comparator 430) is further configured to receive the filtered signal (e.g., the signal 422) and generate the detection signal (e.g., the signal 322) based at least in part on the filtered signal and the first threshold signal (e.g., as shown in FIG. 4). In yet another example, the overvoltage-protection detector (e.g., the overvoltage-protection detector 320) further includes an average-determination circuit (e.g., the average-determination circuit 530) configured to receive the filtered signal and a second threshold signal (e.g., the signal 532) and generate a second voltage signal (e.g., the signal 534) based at least in part on the filtered signal and the second threshold signal (e.g., as shown in FIG. 5). In yet another example, the average-determination circuit (e.g., the average-determination circuit 530) is further configured to compare the filtered signal and the second threshold signal in magnitude, in response to the filtered signal being larger than the second threshold signal in magnitude, increase the second voltage signal (e.g., the signal 534) in magnitude, and in response to the filtered signal being smaller than the second threshold signal in magnitude, decrease the second voltage signal (e.g., the signal 534) in magnitude (e.g., as shown in FIG. 7). In yet another example, the comparator (e.g., the comparator 590) is further configured to receive the second voltage signal and generate the detection signal (e.g., the signal 322) based at least in part on the second voltage signal and the first threshold signal (e.g., the signal 592) (e.g., as shown in FIG. 5).

In yet another example, the overvoltage-protection detector (e.g., the overvoltage-protection detector 320) is further configured to receive the feedback signal (e.g., the signal 286) from a first resistor terminal of a first resistor (e.g., the resistor 282) and a second resistor terminal of a second resistor (e.g., the resistor 280), the first resistor terminal being coupled to the second resistor terminal. The second resistor (e.g., the resistor 280) further includes a third resistor terminal biased at the terminal voltage (e.g., the voltage 288).

In yet another example, the overvoltage-protection detector (e.g., the overvoltage-protection detector 320) includes a sample-and-hold circuit (e.g., the sample-and-hold circuit 880) configured to receive the feedback signal (e.g., the signal 286) and generate a sampled-and-held signal (e.g., the signal 884) based at least in part on the feedback signal, a first voltage-to-current converter (e.g., the voltage-to-current converter 810) configured to receive the sampled-and-held signal (e.g., the signal 884) and generate a first current signal (e.g., the signal 812) based at least in part on the sampled-and-held signal, and a second voltage-to-current converter (e.g., the voltage-to-current converter 814) configured to receive a first threshold signal (e.g., the signal 818) and generate a second current signal (e.g., the signal 816) based at least in part on the first threshold signal (e.g., as shown in FIG. 8). The overvoltage-protection detector (e.g., the overvoltage-protection detector 320) further includes a current generator (e.g., the current generator 820) configured to receive the first current signal and the second current signal and generate a third current signal (e.g., the signal 822) based at least in part on the first current signal and the second current signal, a capacitor (e.g., the capacitor 830) configured to receive the third current signal and generate a voltage signal (e.g., the signal 832) based at least in part on the third current signal, and a controlled comparator (e.g., the controlled comparator 890) configured to receive the voltage signal, a second threshold signal (e.g., the signal 892) and the demagnetization signal (e.g., the signal 312) and generate the detection signal (e.g., the signal 322) based at least in part on the voltage signal, the second threshold signal, and the demagnetization signal (e.g., as shown in FIG. 8).

In yet another example, the current generator is further configured to receive the modulation signal (e.g., the signal 342) and the demagnetization signal (e.g., the signal 312) and generate the third current signal (e.g., the signal 822) based at least in part on the first current signal, the second current signal, the modulation signal, and the demagnetization signal. In yet another example, the controlled comparator (e.g., the controlled comparator 890) includes a first comparator (e.g., the comparator 950) configured to receive the voltage signal and the second threshold signal and generate a comparison signal (e.g., the signal 952) based at least in part on the voltage signal and the second threshold signal, and an edge-triggered latch (e.g., the edge-triggered latch 940) configured to receive the comparison signal and the demagnetization signal (e.g., the signal 312) and generate the detection signal (e.g., the signal 322) based at least in part on the comparison signal and the demagnetization signal.

According to yet another embodiment, a system controller (e.g., the system controller 1120) for a power converter (e.g., the power converter 1100) includes a logic controller (e.g., the logic controller 1240) configured to generate a modulation signal (e.g., the signal 1242), and a driver (e.g., the driver 1250) configured to receive the modulation signal, generate a drive signal (e.g., the signal 1156) based at least in part on the modulation signal, and output the drive signal to a switch (e.g., the switch 1140) to affect a current flowing through an inductive winding (e.g., the winding 1142) of a power converter (e.g., the power converter 1100). The inductive winding includes a first winding terminal (e.g., the terminal 1141) and a second winding terminal (e.g., the terminal 1143). The first winding terminal is at a terminal voltage (e.g., the voltage 1152), and the second winding terminal is coupled to a first diode terminal (e.g., the terminal 1145) of a diode (e.g., the diode 1144). The diode further includes a second diode terminal (e.g., the terminal 1147). A voltage difference between the second diode terminal and the first winding terminal is, for example, an output voltage (e.g., the voltage 1160) of the power converter (e.g., the power converter 1100). Additionally, the system controller (e.g., the system controller 1120) includes an overvoltage-protection detector (e.g., the overvoltage-protection detector 1220) configured to receive an input signal (e.g., the signal 1186) and a demagnetization signal (e.g., the signal 1212), generate a detection signal (e.g., the signal 1222) based at least in part on the input signal and the demagnetization signal, and output the detection signal to the logic controller (e.g., the logic controller 1240). The input signal is equal to the terminal voltage (e.g., the voltage 1152) divided by a predetermined constant (e.g., as shown by Equation 45A and/or Equation 45B). The demagnetization signal indicates a demagnetization period for the inductive winding, and the detection signal indicates whether an overvoltage protection is triggered. The logic controller (e.g., the logic controller 1240) is configured to, in response to the detection signal indicating the overvoltage protection is triggered, cause the power converter to shut down. For example, the power converter (e.g., the power converter 1100) is implemented according to at least FIG. 11, FIG. 12, FIG. 13, FIG. 14, FIG. 15, and/or FIG. 19).

In another example, the overvoltage-protection detector (e.g., the overvoltage-protection detector 1220) includes a sample-and-hold circuit (e.g., the sample-and-hold circuit 1380 and/or the sample-and-hold circuit 1480) configured to receive the input signal (e.g., the signal 1186) and generate a sampled-and-held signal (e.g., the signal 1384 and/or the signal 1484) based at least in part on the input signal, a voltage-to-voltage converter (e.g., the voltage-to-voltage converter 1310 and/or the voltage-to-voltage converter 1410) configured to receive the sampled-and-held signal (e.g., the signal 1384 and/or the signal 1484) and the demagnetization signal (e.g., the signal 1212) and generate a first voltage signal (e.g., the signal 1312 and/or the signal 1412) based at least in part on the sampled-and-held signal and the demagnetization signal, and a comparator (e.g., the comparator 1330 and/or the comparator 1490) configured to receive a first threshold signal (e.g., the signal 1332 and/or the signal 1492) and generate the detection signal (e.g., the signal 1222) based on at least information associated with the first voltage signal and the first threshold signal.

In yet another example, the first voltage signal is approximately equal to the output voltage of the power converter divided by the predetermined constant (e.g., as shown by Equation 48A). In yet another example, the overvoltage-protection detector (e.g., the overvoltage-protection detector 1220) further includes a low-pass filter (e.g., the low-pass filter 1320 and/or the low-pass filter 1420) configured to receive the first voltage signal and generate a filtered signal (e.g., the filtered signal 1322 and/or the filtered signal 1422) based at least in part on the first voltage signal. The comparator (e.g., the comparator 1330 and/or the comparator 1490) is further configured to generate the detection signal (e.g., the signal 1222) based on at least information associated with the filtered signal and the first threshold signal.

In yet another example, the comparator (e.g., the comparator 1330) is further configured to receive the filtered signal (e.g., the signal 1322) and generate the detection signal (e.g., the signal 1222) based at least in part on the filtered signal and the first threshold signal (e.g., as shown in FIG. 13). In yet another example, the overvoltage-protection detector (e.g., the overvoltage-protection detector 1220) further includes an average-determination circuit (e.g., the average-determination circuit 1430) configured to receive the filtered signal and a second threshold signal (e.g., the signal 1432) and generate a second voltage signal (e.g., the signal 1434) based at least in part on the filtered signal and the second threshold signal (e.g., as shown in FIG. 14).

In yet another example, the average-determination circuit (e.g., the average-determination circuit 1430) is further configured to compare the filtered signal and the second threshold signal in magnitude, in response to the filtered signal being larger than the second threshold signal in magnitude, increase the second voltage signal (e.g., the signal 1434) in magnitude, and in response to the filtered signal being smaller than the second threshold signal in magnitude, decrease the second voltage signal (e.g., the signal 1434) in magnitude. In yet another example, the comparator (e.g., the comparator 1490) is further configured to receive the second voltage signal and generate the detection signal (e.g., the signal 1222) based at least in part on the second voltage signal and the first threshold signal (e.g., the signal 1492) (e.g., as shown in FIG. 14).

In yet another example, the overvoltage-protection detector (e.g., the overvoltage-protection detector 1220) is further configured to receive the input signal (e.g., the signal 1186) from a first resistor terminal of a first resistor (e.g., the resistor 1182) and a second resistor terminal of a second resistor (e.g., the resistor 1180). The first resistor terminal is coupled to the second resistor terminal. The second resistor (e.g., the resistor 1180) further includes a third resistor terminal biased at the terminal voltage (e.g., the voltage 1152). In yet another example, the overvoltage-protection detector (e.g., the overvoltage-protection detector 1220) includes a sample-and-hold circuit (e.g., the sample-and-hold circuit 1580) configured to receive the input signal (e.g., the signal 1186) and generate a sampled-and-held signal (e.g., the signal 1584) based at least in part on the input signal, a first voltage-to-current converter (e.g., the first voltage-to-current converter 1510) configured to receive the sampled-and-held signal (e.g., the signal 1584) and generate a first current signal (e.g., the signal 1512) based at least in part on the sampled-and-held signal, and a second voltage-to-current converter (e.g., the voltage-to-current converter 1514) configured to receive a first threshold signal (e.g., the signal 1518) and generate a second current signal (e.g., the signal 1516) based at least in part on the first threshold signal (e.g., as show in FIG. 15). Additionally, the overvoltage-protection detector (e.g., the overvoltage-protection detector 1220) includes a current generator (e.g., the current generator 1520) configured to receive the first current signal and the second current signal and generate a third current signal (e.g., the signal 1522) based at least in part on the first current signal and the second current signal, a capacitor (e.g., the capacitor 1530) configured to receive the third current signal and generate a voltage signal (e.g., the signal 1532) based at least in part on the third current signal, and a controlled comparator (e.g., the controlled comparator 1590) configured to receive the voltage signal, a second threshold signal (e.g., the signal 1592) and the demagnetization signal (e.g., the signal 1212) and generate the detection signal (e.g., the signal 1222) based at least in part on the voltage signal, the second threshold signal, and the demagnetization signal (e.g., as show in FIG. 15).

In yet another example, the current generator is further configured to receive the modulation signal (e.g., the signal 1242) and the demagnetization signal (e.g., the signal 1212) and generate the third current signal (e.g., the signal 1522) based at least in part on the first current signal, the second current signal, the modulation signal, and the demagnetization signal. In yet another example, the controlled comparator (e.g., the controlled comparator 1590) includes a first comparator (e.g., the comparator 1650) configured to receive the voltage signal and the second threshold signal and generate a comparison signal (e.g., the signal 1652) based at least in part on the voltage signal and the second threshold signal, and an edge-triggered latch (e.g., the edge-triggered latch 1640) configured to receive the comparison signal and the demagnetization signal (e.g., the signal 1212) and generate the detection signal (e.g., the signal 1222) based at least in part on the comparison signal and the demagnetization signal.

According to yet another embodiment, a method for a power converter (e.g., the power converter 200) includes generating a modulation signal (e.g., the signal 342), receiving the modulation signal, generating a drive signal (e.g., the signal 256) based at least in part on the modulation signal, and outputting the drive signal to a switch (e.g., the switch 240) to affect a current flowing through an inductive winding (e.g., the winding 242) for a power converter (e.g., the power converter 242). Additionally, the method includes receiving a first voltage signal (e.g., the signal 484 and/or the signal 584), the modulation signal (e.g., the signal 342), and a demagnetization signal (e.g., the signal 312), generating a second voltage signal (e.g., the signal 412 and/or the signal 512) based at least in part on the first voltage signal, the modulation signal, and the demagnetization signal, receiving a first threshold signal (e.g., the signal 432 and/or the signal 592), generating a comparison signal (e.g., the signal 322) based on at least information associated with the second voltage signal and the first threshold signal, and outputting the comparison signal. The modulation signal indicates an on-time period for the switch, and the demagnetization signal indicates a demagnetization period for the inductive winding. The second voltage signal is approximately equal to the first voltage signal multiplied by a ratio of the on-time period to a sum of the on-time period and the demagnetization period in magnitude (e.g., as shown by Equation 8). For example, the method is implemented according to at least FIG. 2, FIG. 3, FIG. 4, and/or FIG. 5).

In another example, the second voltage signal is equal to the first voltage signal multiplied by the ratio of the on-time period to the sum of the on-time period and the demagnetization period in magnitude (e.g., as shown by Equation 8). In yet another example, the method further includes, in response to the comparison signal indicating the overvoltage protection is triggered, causing the power converter to shut down. In yet another example, the method further includes receiving the second voltage signal, performing low-pass filtering to the second voltage signal, and generating a third voltage signal (e.g., the signal 422 and/or the signal 522) based at least in part on the second voltage signal. The generating a comparison signal (e.g., the signal 322) based on at least information associated with the second voltage signal and the first threshold signal includes generating the comparison signal (e.g., the signal 322) based on at least information associated with the third voltage signal and the first threshold signal.

According to yet another embodiment, a method for a power converter (e.g., the power converter 200) includes generating a modulation signal (e.g., the signal 342), receiving the modulation signal, generating a drive signal (e.g., the signal 256) based at least in part on the modulation signal, and outputting the drive signal to a switch (e.g., the switch 240) to affect a current flowing through an inductive winding (e.g., the winding 242) of a power converter (e.g., the power converter 200). The inductive winding includes a first winding terminal (e.g., the terminal 241) and a second winding terminal (e.g., the terminal 243). The second winding terminal is at a terminal voltage (e.g., the voltage 288) and coupled to a first diode terminal (e.g., the terminal 245) of a diode (e.g., the diode 244). The diode further includes a second diode terminal (e.g., the terminal 247). A voltage difference between the second diode terminal and the first winding terminal is, for example, an output voltage (e.g., the voltage 260) of the power converter. Additionally, the method includes receiving a feedback signal (e.g., the signal 286) and a demagnetization signal (e.g., the signal 312). The feedback signal is equal to the terminal voltage (e.g., the voltage 288) divided by a predetermined constant (e.g., as shown by Equation 2A and/or Equation 2B). The demagnetization signal indicates a demagnetization period for the inductive winding. Moreover, the method includes generating a detection signal (e.g., the signal 322) based at least in part on the feedback signal and the demagnetization signal, and outputting the detection signal. The detection signal indicates whether an overvoltage protection is triggered. Also, the method includes, in response to the detection signal indicating the overvoltage protection is triggered, causing the power converter to shut down. For example, the method is implemented according to at least FIG. 2, FIG. 3, FIG. 4, FIG. 5, FIG. 8, and/or FIG. 18).

In another example, the generating a detection signal (e.g., the signal 322) based at least in part on the feedback signal and the demagnetization signal includes generating a sampled-and-held signal (e.g., the signal 484 and/or the signal 584) based at least in part on the feedback signal, receiving the sampled-and-held signal (e.g., the signal 484 and/or the signal 584), and generating a voltage signal (e.g., the signal 412 and/or the signal 512) based at least in part on the sampled-and-held signal and the demagnetization signal. Additionally, the method includes receiving a first threshold signal (e.g., the signal 432 and/or the signal 592), and generating the detection signal (e.g., the signal 322) based on at least information associated with the voltage signal and the first threshold signal. In yet another example, the voltage signal is approximately equal to the output voltage of the power converter divided by the predetermined constant (e.g., as shown by Equation 10A).

In yet another example, the generating a detection signal (e.g., the signal 322) based at least in part on the feedback signal and the demagnetization signal includes generating a sampled-and-held signal (e.g., the signal 884) based at least in part on the feedback signal, receiving the sampled-and-held signal (e.g., the signal 884), generating a first current signal (e.g., the signal 812) based at least in part on the sampled-and-held signal, receiving a first threshold signal (e.g., the signal 818), and generating a second current signal (e.g., the signal 816) based at least in part on the first threshold signal (e.g., as shown in FIG. 8). Additionally, the generating a detection signal (e.g., the signal 322) based at least in part on the feedback signal and the demagnetization signal includes receiving the first current signal and the second current signal, generating a third current signal (e.g., the signal 822) based at least in part on the first current signal and the second current signal, receiving the third current signal, and generating a voltage signal (e.g., the signal 832) based at least in part on the third current signal (e.g., as shown in FIG. 8). Moreover, the generating a detection signal (e.g., the signal 322) based at least in part on the feedback signal and the demagnetization signal includes receiving the voltage signal, a second threshold signal (e.g., the signal 892) and the demagnetization signal (e.g., 312), and generating the detection signal (e.g., the signal 322) based at least in part on the voltage signal, the second threshold signal, and the demagnetization signal (e.g., as shown in FIG. 8). In yet another example, the receiving the first current signal and the second current signal includes receiving the first current signal, the second current signal, the modulation signal (e.g., the signal 342), and the demagnetization signal (e.g., the signal 312), and the generating a third current signal (e.g., the signal 822) based at least in part on the first current signal and the second current signal includes generating the third current signal (e.g., the signal 822) based at least in part on the first current signal, the second current signal, the modulation signal, and the demagnetization signal.

According to yet another embodiment, a method for a power converter (e.g., the power converter 1100) includes generating a modulation signal (e.g., the signal 1242), receiving the modulation signal, generating a drive signal (e.g., the signal 1156) based at least in part on the modulation signal, and outputting the drive signal to a switch (e.g., the switch 1140) to affect a current flowing through an inductive winding (e.g., the winding 1142) of a power converter (e.g., the power converter 1100). The inductive winding including a first winding terminal (e.g., the terminal 1141) and a second winding terminal (e.g., the terminal 1143). The first winding terminal is at a terminal voltage (e.g., the voltage 1152), and the second winding terminal is coupled to a first diode terminal (e.g., the terminal 1145) of a diode (e.g., the diode 1144). The diode (e.g., the diode 1144) further includes a second diode terminal (e.g., the terminal 1147). A voltage difference between the second diode terminal and the first winding terminal is, for example, an output voltage (e.g., the voltage 1160) of the power converter (e.g., the power converter 1100). Additionally, the method includes receiving an input signal (e.g., the signal 1186) and a demagnetization signal (e.g., the signal 1212). The input signal is equal to the terminal voltage (e.g., the signal 1152) divided by a predetermined constant (e.g., as shown by Equation 45A and/or Equation 45B). The demagnetization signal indicates a demagnetization period for the inductive winding. Moreover, the method includes generating a detection signal (e.g., the signal 1222) based at least in part on the input signal and the demagnetization signal, and outputting the detection signal. The detection signal indicates whether an overvoltage protection is triggered. Also, the method includes, in response to the detection signal indicating the overvoltage protection is triggered, causing the power converter to shut down. For example, the method is implemented according to at least FIG. 11, FIG. 12, FIG. 13, FIG. 14, FIG. 15, and/or FIG. 19.

In another example, the generating a detection signal (e.g., the signal 1222) based at least in part on the input signal and the demagnetization signal includes generating a sampled-and-held signal (e.g., the signal 1384 and/or the signal 1484) based at least in part on the input signal, receiving the sampled-and-held signal (e.g., the signal 1384 and/or the signal 1484), generating a voltage signal (e.g., the signal 1312 and/or the signal 1412) based at least in part on the sampled-and-held signal and the demagnetization signal, receiving a first threshold signal (e.g., the signal 1332 and/or the signal 1492), and generating the detection signal (e.g., the signal 1222) based on at least information associated with the voltage signal and the first threshold signal. In yet another example, the voltage signal is approximately equal to the output voltage of the power converter divided by the predetermined constant (e.g., as shown by Equation 48A).

In yet another example, the generating a detection signal (e.g., the signal 1222) based at least in part on the input signal and the demagnetization signal includes generating a sampled-and-held signal (e.g., the signal 1584) based at least in part on the input signal, receiving the sampled-and-held signal (e.g., the signal 1584), and generating a first current signal (e.g., the signal 1512) based at least in part on the sampled-and-held signal (e.g., as shown in FIG. 15). Additionally, the generating a detection signal (e.g., the signal 1222) based at least in part on the input signal and the demagnetization signal includes receiving a first threshold signal (e.g., the signal 1518), generating a second current signal (e.g., the signal 1516) based at least in part on the first threshold signal, receiving the first current signal and the second current signal, and generating a third current signal (e.g., the signal 1522) based at least in part on the first current signal and the second current signal (e.g., as shown in FIG. 15). Moreover, the generating a detection signal (e.g., the signal 1222) based at least in part on the input signal and the demagnetization signal includes receiving the third current signal, generating a voltage signal (e.g., the signal 1532) based at least in part on the third current signal, receiving the voltage signal, a second threshold signal (e.g., the signal 1592) and the demagnetization signal (e.g., the signal 1212), and generating the detection signal (e.g., the signal 1222) based at least in part on the voltage signal, the second threshold signal, and the demagnetization signal (e.g., as shown in FIG. 15). In yet another example, the receiving the first current signal and the second current signal includes receiving the first current signal, the second current signal, the modulation signal (e.g., the signal 1242), and the demagnetization signal (e.g., the signal 1212), and the generating a third current signal (e.g., the signal 1522) based at least in part on the first current signal and the second current signal includes generating the third current signal (e.g., the signal 1522) based at least in part on the first current signal, the second current signal, the modulation signal, and the demagnetization signal.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a power converter, the system controller comprising:
    a logic controller configured to generate a modulation signal;
    a driver configured to receive the modulation signal, generate a drive signal based at least in part on the modulation signal, and output the drive signal to a switch to affect a current flowing through an inductive winding of a power converter, the inductive winding including a first winding terminal and a second winding terminal, the second winding terminal being at a terminal voltage and coupled to a first diode terminal of a diode, the diode further including a second diode terminal, a voltage difference between the second diode terminal and the first winding terminal being an output voltage of the power converter; and
    an overvoltage-protection detector configured to receive a feedback signal and a demagnetization signal, generate a detection signal based at least in part on the feedback signal and the demagnetization signal, and output the detection signal to the logic controller, the feedback signal being equal to the terminal voltage divided by a predetermined constant, the demagnetization signal indicating a demagnetization period for the inductive winding, the detection signal indicating whether an overvoltage protection is triggered;
    wherein the logic controller is configured to, in response to the detection signal indicating the overvoltage protection is triggered, cause the power converter to shut down;
    wherein the overvoltage-protection detector includes:
        a sample-and-hold circuit configured to receive the feedback signal and generate a sampled-and-held signal based at least in part on the feedback signal;
        a voltage-to-voltage converter configured to receive the sampled-and-held signal and the demagnetization signal and generate a first voltage signal based at least in part on the sampled-and-held signal and the demagnetization signal; and
        a comparator configured to receive a first threshold signal and generate the detection signal based on at least information associated with the first voltage signal and the first threshold signal.

2. The system controller of claim 1 wherein the first voltage signal is approximately equal to the output voltage of the power converter divided by the predetermined constant.

3. The system controller of claim 1 wherein the overvoltage-protection detector further includes:
    a low-pass filter configured to receive the first voltage signal and generate a filtered signal based at least in part on the first voltage signal;
    wherein the comparator is further configured to generate the detection signal based on at least information associated with the filtered signal and the first threshold signal.

4. The system controller of claim 3 wherein the comparator is further configured to receive the filtered signal and generate the detection signal based at least in part on the filtered signal and the first threshold signal.

5. The system controller of claim 3 wherein the overvoltage-protection detector further includes an average-determination circuit configured to receive the filtered signal and a second threshold signal and generate a second voltage signal based at least in part on the filtered signal and the second threshold signal.

6. The system controller of claim 5 wherein the average-determination circuit is further configured to:
    compare the filtered signal and the second threshold signal in magnitude;
    in response to the filtered signal being larger than the second threshold signal in magnitude, increase the second voltage signal in magnitude; and
    in response to the filtered signal being smaller than the second threshold signal in magnitude, decrease the second voltage signal in magnitude.

7. The system controller of claim 6 wherein the comparator is further configured to receive the second voltage signal and generate the detection signal based at least in part on the second voltage signal and the first threshold signal.

8. The system controller of claim 1 wherein the overvoltage-protection detector is further configured to receive the feedback signal from a first resistor terminal of a first resistor and a second resistor terminal of a second resistor, the first resistor terminal being coupled to the second resistor terminal, the second resistor further including a third resistor terminal biased at the terminal voltage.

9. A system controller for a power converter, the system controller comprising:
    a logic controller configured to generate a modulation signal;
    a driver configured to receive the modulation signal, generate a drive signal based at least in part on the modulation signal, and output the drive signal to a switch to affect a current flowing through an inductive winding of a power converter, the inductive winding including a first winding terminal and a second winding terminal, the second winding terminal being at a terminal voltage and coupled to a first diode terminal of a diode, the diode further including a second diode terminal, a voltage difference between the second diode terminal and the first winding terminal being an output voltage of the power converter; and an overvoltage-protection detector configured to receive a feedback signal and a demagnetization signal, generate a detection signal based at least in part on the feedback signal and the demagnetization signal, and output the detection signal to the logic controller, the feedback signal being equal to the terminal voltage divided by a predetermined constant, the demagnetization signal indicating a demagnetization period for the inductive winding, the detection signal indicating whether an overvoltage protection is triggered;

wherein the logic controller is configured to, in response to the detection signal indicating the overvoltage protection is triggered, cause the power converter to shut down;

wherein the overvoltage-protection detector includes:
- a sample-and-hold circuit configured to receive the feedback signal and generate a sampled-and-held signal based at least in part on the feedback signal;
- a first voltage-to-current converter configured to receive the sampled-and-held signal and generate a first current signal based at least in part on the sampled-and-held signal;
- a second voltage-to-current converter configured to receive a first threshold signal and generate a second current signal based at least in part on the first threshold signal;
- a current generator configured to receive the first current signal and the second current signal and generate a third current signal based at least in part on the first current signal and the second current signal;
- a capacitor configured to receive the third current signal and generate a voltage signal based at least in part on the third current signal; and
- a controlled comparator configured to receive the voltage signal, a second threshold signal and the demagnetization signal and generate the detection signal based at least in part on the voltage signal, the second threshold signal, and the demagnetization signal.

10. The system controller of claim 9 wherein the current generator is further configured to receive the modulation signal and the demagnetization signal and generate the third current signal based at least in part on the first current signal, the second current signal, the modulation signal, and the demagnetization signal.

11. The system controller of claim 9 wherein the controlled comparator includes:
- a first comparator configured to receive the voltage signal and the second threshold signal and generate a comparison signal based at least in part on the voltage signal and the second threshold signal; and
- an edge-triggered latch configured to receive the comparison signal and the demagnetization signal and generate the detection signal based at least in part on the comparison signal and the demagnetization signal.

12. A system controller for a power converter, the system controller comprising:
- a logic controller configured to generate a modulation signal;
- a driver configured to receive the modulation signal, generate a drive signal based at least in part on the modulation signal, and output the drive signal to a switch to affect a current flowing through an inductive winding of a power converter, the inductive winding including a first winding terminal and a second winding terminal, the first winding terminal being at a terminal voltage, the second winding terminal being coupled to a first diode terminal of a diode, the diode further including a second diode terminal, a voltage difference between the second diode terminal and the first winding terminal being an output voltage of the power converter; and
- an overvoltage-protection detector configured to receive an input signal and a demagnetization signal, generate a detection signal based at least in part on the input signal and the demagnetization signal, and output the detection signal to the logic controller, the input signal being equal to the terminal voltage divided by a predetermined constant, the demagnetization signal indicating a demagnetization period for the inductive winding, the detection signal indicating whether an overvoltage protection is triggered;

wherein the logic controller is configured to, in response to the detection signal indicating the overvoltage protection is triggered, cause the power converter to shut down;

wherein the overvoltage-protection detector includes:
- a sample-and-hold circuit configured to receive the input signal and generate a sampled-and-held signal based at least in part on the input signal;
- a voltage-to-voltage converter configured to receive the sampled-and-held signal and the demagnetization signal and generate a first voltage signal based at least in part on the sampled-and-held signal and the demagnetization signal; and
- a comparator configured to receive a first threshold signal and generate the detection signal based on at least information associated with the first voltage signal and the first threshold signal.

13. The system controller of claim 12 wherein the first voltage signal is approximately equal to the output voltage of the power converter divided by the predetermined constant.

14. The system controller of claim 12 wherein the overvoltage-protection detector further includes:
- a low-pass filter configured to receive the first voltage signal and generate a filtered signal based at least in part on the first voltage signal;
- wherein the comparator is further configured to generate the detection signal based on at least information associated with the filtered signal and the first threshold signal.

15. The system controller of claim 14 wherein the comparator is further configured to receive the filtered signal and generate the detection signal based at least in part on the filtered signal and the first threshold signal.

16. The system controller of claim 14 wherein the overvoltage-protection detector further includes an average-determination circuit configured to receive the filtered signal and a second threshold signal and generate a second voltage signal based at least in part on the filtered signal and the second threshold signal.

17. The system controller of claim 16 wherein the average-determination circuit is further configured to:
- compare the filtered signal and the second threshold signal in magnitude;
- in response to the filtered signal being larger than the second threshold signal in magnitude, increase the second voltage signal in magnitude; and
- in response to the filtered signal being smaller than the second threshold signal in magnitude, decrease the second voltage signal in magnitude.

18. The system controller of claim 17 wherein the comparator is further configured to receive the second voltage signal and generate the detection signal based at least in part on the second voltage signal and the first threshold signal.

19. The system controller of claim 12 wherein the overvoltage-protection detector is further configured to receive the input signal from a first resistor terminal of a first resistor and a second resistor terminal of a second resistor, the first resistor terminal being coupled to the second resistor terminal, the second resistor further including a third resistor terminal biased at the terminal voltage.

20. A system controller for a power converter, the system controller comprising:
   a logic controller configured to generate a modulation signal;
   a driver configured to receive the modulation signal, generate a drive signal based at least in part on the modulation signal, and output the drive signal to a switch to affect a current flowing through an inductive winding of a power converter, the inductive winding including a first winding terminal and a second winding terminal, the first winding terminal being at a terminal voltage, the second winding terminal being coupled to a first diode terminal of a diode, the diode further including a second diode terminal, a voltage difference between the second diode terminal and the first winding terminal being an output voltage of the power converter; and
   an overvoltage-protection detector configured to receive an input signal and a demagnetization signal, generate a detection signal based at least in part on the input signal and the demagnetization signal, and output the detection signal to the logic controller, the input signal being equal to the terminal voltage divided by a predetermined constant, the demagnetization signal indicating a demagnetization period for the inductive winding, the detection signal indicating whether an overvoltage protection is triggered;
   wherein the logic controller is configured to, in response to the detection signal indicating the overvoltage protection is triggered, cause the power converter to shut down;
   wherein the overvoltage-protection detector includes:
      a sample-and-hold circuit configured to receive the input signal and generate a sampled-and-held signal based at least in part on the input signal;
      a first voltage-to-current converter configured to receive the sampled-and-held signal and generate a first current signal based at least in part on the sampled-and-held signal;
      a second voltage-to-current converter configured to receive a first threshold signal and generate a second current signal based at least in part on the first threshold signal;
      a current generator configured to receive the first current signal and the second current signal and generate a third current signal based at least in part on the first current signal and the second current signal;
      a capacitor configured to receive the third current signal and generate a voltage signal based at least in part on the third current signal; and
      a controlled comparator configured to receive the voltage signal, a second threshold signal and the demagnetization signal and generate the detection signal based at least in part on the voltage signal, the second threshold signal, and the demagnetization signal.

21. The system controller of claim 20 wherein the current generator is further configured to receive the modulation signal and the demagnetization signal and generate the third current signal based at least in part on the first current signal, the second current signal, the modulation signal, and the demagnetization signal.

22. The system controller of claim 20 wherein the controlled comparator includes:
   a first comparator configured to receive the voltage signal and the second threshold signal and generate a comparison signal based at least in part on the voltage signal and the second threshold signal; and
   an edge-triggered latch configured to receive the comparison signal and the demagnetization signal and generate the detection signal based at least in part on the comparison signal and the demagnetization signal.

23. A method for a power converter, the method comprising:
   generating a modulation signal;
   receiving the modulation signal;
   generating a drive signal based at least in part on the modulation signal;
   outputting the drive signal to a switch to affect a current flowing through an inductive winding of a power converter, the inductive winding including a first winding terminal and a second winding terminal, the second winding terminal being at a terminal voltage and coupled to a first diode terminal of a diode, the diode further including a second diode terminal, a voltage difference between the second diode terminal and the first winding terminal being an output voltage of the power converter;
   receiving a feedback signal and a demagnetization signal, the feedback signal being equal to the terminal voltage divided by a predetermined constant, the demagnetization signal indicating a demagnetization period for the inductive winding;
   generating a detection signal based at least in part on the feedback signal and the demagnetization signal;
   outputting the detection signal, the detection signal indicating whether an overvoltage protection is triggered; and
   in response to the detection signal indicating the overvoltage protection is triggered, causing the power converter to shut down;
   wherein the generating a detection signal based at least in part on the feedback signal and the demagnetization signal includes:
      generating a sampled-and-held signal based at least in part on the feedback signal;
      receiving the sampled-and-held signal;
      generating a voltage signal based at least in part on the sampled-and-held signal and the demagnetization signal;
      receiving a first threshold signal; and
      generating the detection signal based on at least information associated with the voltage signal and the first threshold signal.

24. The method of claim 23 wherein the voltage signal is approximately equal to the output voltage of the power converter divided by the predetermined constant.

25. A method for a power converter, the method comprising:
   generating a modulation signal;
   receiving the modulation signal;
   generating a drive signal based at least in part on the modulation signal;
   outputting the drive signal to a switch to affect a current flowing through an inductive winding of a power converter, the inductive winding including a first winding terminal and a second winding terminal, the second winding terminal being at a terminal voltage and coupled to a first diode terminal of a diode, the diode further including a second diode terminal, a voltage difference between the second diode terminal and the first winding terminal being an output voltage of the power converter;

receiving a feedback signal and a demagnetization signal, the feedback signal being equal to the terminal voltage divided by a predetermined constant, the demagnetization signal indicating a demagnetization period for the inductive winding;

generating a detection signal based at least in part on the feedback signal and the demagnetization signal;

outputting the detection signal, the detection signal indicating whether an overvoltage protection is triggered; and in response to the detection signal indicating the overvoltage protection is triggered, causing the power converter to shut down;

wherein the generating a detection signal based at least in part on the feedback signal and the demagnetization signal includes:
generating a sampled-and-held signal based at least in part on the feedback signal;
receiving the sampled-and-held signal;
generating a first current signal based at least in part on the sampled-and-held signal;
receiving a first threshold signal;
generating a second current signal based at least in part on the first threshold signal;
receiving the first current signal and the second current signal;
generating a third current signal based at least in part on the first current signal and the second current signal;
receiving the third current signal;
generating a voltage signal based at least in part on the third current signal;
receiving the voltage signal, a second threshold signal and the demagnetization signal; and
generating the detection signal based at least in part on the voltage signal, the second threshold signal, and the demagnetization signal.

26. The method of claim 25 wherein:
the receiving the first current signal and the second current signal includes receiving the first current signal, the second current signal, the modulation signal, and the demagnetization signal; and
the generating a third current signal based at least in part on the first current signal and the second current signal includes generating the third current signal based at least in part on the first current signal, the second current signal, the modulation signal, and the demagnetization signal.

27. A method for a power converter, the method comprising:
generating a modulation signal;
receiving the modulation signal;
generating a drive signal based at least in part on the modulation signal;
outputting the drive signal to a switch to affect a current flowing through an inductive winding of a power converter, the inductive winding including a first winding terminal and a second winding terminal, the first winding terminal being at a terminal voltage, the second winding terminal being coupled to a first diode terminal of a diode, the diode further including a second diode terminal, a voltage difference between the second diode terminal and the first winding terminal being an output voltage of the power converter;

receiving an input signal and a demagnetization signal, the input signal being equal to the terminal voltage divided by a predetermined constant, the demagnetization signal indicating a demagnetization period for the inductive winding;

generating a detection signal based at least in part on the input signal and the demagnetization signal;

outputting the detection signal, the detection signal indicating whether an overvoltage protection is triggered; and in response to the detection signal indicating the overvoltage protection is triggered, causing the power converter to shut down;

wherein the generating a detection signal based at least in part on the input signal and the demagnetization signal includes:
generating a sampled-and-held signal based at least in part on the input signal;
receiving the sampled-and-held signal;
generating a voltage signal based at least in part on the sampled-and-held signal and the demagnetization signal;
receiving a first threshold signal; and
generating the detection signal based on at least information associated with the voltage signal and the first threshold signal.

28. The method of claim 27 wherein the voltage signal is approximately equal to the output voltage of the power converter divided by the predetermined constant.

29. A method for a power converter, the method comprising:
generating a modulation signal;
receiving the modulation signal;
generating a drive signal based at least in part on the modulation signal;
outputting the drive signal to a switch to affect a current flowing through an inductive winding of a power converter, the inductive winding including a first winding terminal and a second winding terminal, the first winding terminal being at a terminal voltage, the second winding terminal being coupled to a first diode terminal of a diode, the diode further including a second diode terminal, a voltage difference between the second diode terminal and the first winding terminal being an output voltage of the power converter;

receiving an input signal and a demagnetization signal, the input signal being equal to the terminal voltage divided by a predetermined constant, the demagnetization signal indicating a demagnetization period for the inductive winding;

generating a detection signal based at least in part on the input signal and the demagnetization signal;

outputting the detection signal, the detection signal indicating whether an overvoltage protection is triggered; and in response to the detection signal indicating the overvoltage protection is triggered, causing the power converter to shut down;

wherein the generating a detection signal based at least in part on the input signal and the demagnetization signal includes:
generating a sampled-and-held signal based at least in part on the input signal;
receiving the sampled-and-held signal;

generating a first current signal based at least in part on the sampled-and-held signal;
receiving a first threshold signal;
generating a second current signal based at least in part on the first threshold signal;
receiving the first current signal and the second current signal;
generating a third current signal based at least in part on the first current signal and the second current signal;
receiving the third current signal;
generating a voltage signal based at least in part on the third current signal;
receiving the voltage signal, a second threshold signal and the demagnetization signal; and
generating the detection signal based at least in part on the voltage signal, the second threshold signal, and the demagnetization signal.

30. The method of claim 29 wherein:
the receiving the first current signal and the second current signal includes receiving the first current signal, the second current signal, the modulation signal, and the demagnetization signal; and
the generating a third current signal based at least in part on the first current signal and the second current signal includes generating the third current signal based at least in part on the first current signal, the second current signal, the modulation signal, and the demagnetization signal.

* * * * *